US012811624B2

(12) United States Patent
Jang et al.

(10) Patent No.: US 12,811,624 B2
(45) Date of Patent: Nov. 24, 2026

(54) METHOD AND DEVICE FOR UPLINK PRECODING IN WIRELESS COMMUNICATION SYSTEM

(71) Applicant: Samsung Electronics Co., Ltd., Suwon-si (KR)

(72) Inventors: Youngrok Jang, Suwon-si (KR); Ameha Tsegaye Abebe, Suwon-si (KR); Seongmok Lim, Suwon-si (KR); Hyoungju Ji, Suwon-si (KR); Kyungjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 18/829,800

(22) Filed: Sep. 10, 2024

(65) Prior Publication Data

US 2025/0105871 A1 Mar. 27, 2025

(30) Foreign Application Priority Data

Sep. 14, 2023 (KR) ........................ 10-2023-0122570

(51) Int. Cl.

*H04B 1/713* (2011.01)
*H04W 72/0453* (2023.01)
*H04W 72/21* (2023.01)

(52) U.S. Cl.

CPC ........ *H04B 1/713* (2013.01); *H04W 72/0453* (2013.01); *H04W 72/21* (2023.01)

(58) Field of Classification Search

CPC ... H04B 1/713; H04W 72/21; H04W 72/0453

(Continued)

(56) References Cited

U.S. PATENT DOCUMENTS 12,471,108 B2 * 11/2025 Elshafie ............ H04W 72/0446
2021/0092720 A1 3/2021 Haghighat et al.

(Continued)

FOREIGN PATENT DOCUMENTS

EP 4329409 A1 2/2024
KR 10-2023-0012294 A 1/2023

(Continued)

OTHER PUBLICATIONS

International Search Report dated Dec. 20, 2024, issued in International Application No. PCT/KR2024/096130.

*Primary Examiner* — Dominic D Saltarelli
(74) *Attorney, Agent, or Firm* — Jefferson IP Law, LLP

(57) ABSTRACT

A method performed by a user equipment (UE) in a wireless communication system is provided. The method includes receiving, from a base station, downlink control information (DCI) scheduling a physical uplink shared channel (PUSCH) transmission, the DCI including information on a frequency resource for the PUSCH transmission and information indicating whether frequency hopping to be applied to the PUSCH transmission, and transmitting, to the base station, a PUSCH, based on precoding applied according to a predetermined resource unit based on the frequency resource for the PUSCH transmission, wherein, in case that the information indicating whether the frequency hopping to be applied for the PUSCH transmission indicates a value indicating that the frequency hopping is applied and the precoding is a wideband based precoding for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined (Continued)

resource unit configured to a size equal to the frequency resource which is frequency hopped.

8 Claims, 30 Drawing Sheets

(58) Field of Classification Search
USPC .......................................................... 375/132
See application file for complete search history.

(56) References Cited

U.S. PATENT DOCUMENTS

| | | | |
|---|---|---|---|
| 2022/0070856 | A1 | 3/2022 | Lin |
| 2022/0248431 | A1 | 8/2022 | Li et al. |

FOREIGN PATENT DOCUMENTS

| | | | |
|---|---|---|---|
| WO | 2022/226972 | A1 | 11/2022 |
| WO | 2023/039704 | A1 | 3/2023 |

* cited by examiner

METHOD AND DEVICE FOR UPLINK PRECODING IN WIRELESS COMMUNICATION SYSTEM

CROSS-REFERENCE TO RELATED APPLICATION(S)

This application is based on and claims priority under 35 U.S.C. § 119 (a) of a Korean patent application number 10-2023-0122570, filed on Sep. 14, 2023, in the Korean Intellectual Property Office, the disclosure of which is incorporated by reference herein in its entirety.

BACKGROUND

1. Field

The disclosure relates to operations of a terminal and a base station in a wireless communication system. Specifically, the disclosure relates to a method for frequency hopping-based uplink subband precoding in a wireless communication system, and a device capable of performing the same.

2. Description of Related Art $5^{th}$ generation (5G) mobile communications technology defines a wide range of frequency bands to enable faster transmission speeds and new services, and can be implemented in the sub-6 GHz ("Sub 6 GHz") bands, such as 3.5 gigahertz (3.5 GHz), as well as in the ultra-high frequency bands called millimeter wave ("Above 6 GHz"), such as 28 GHz and 39 GHz. In addition; for $6^{th}$ generation (6G) mobile communications technology, also referred to as Beyond 5G systems, implementations in the Terahertz band (e.g., the 3 Terahertz (3 THz) band at 95 GHz) are being considered to achieve 50 times faster transmission speeds and ultra-low latency of one-tenth that of 5G mobile communications technology.

In the early stages of 5G mobile communications technology, beamforming and massive array multiple input multiple output (Massive MIMO) to mitigate path loss and increase the propagation distance of radio waves in the ultra-high frequency band, with the goal of supporting services and meeting performance requirements for enhanced mobile broadband (eMBB), ultra-reliable low-latency communications (URLLC), and massive machine-type communications (mMTC), support for various pneumatologies for efficient utilization of ultra-high frequency resources (such as multiple subcarrier spacing operations) and dynamic operations for slot formats, early access technologies to support multi-beam transmission and broadband, and the definition and operation of band-width parts (BWPs), standardization of new channel coding methods, such as low density parity check (LDPC) coding for large data transfers and polar code for reliable transmission of control information, layer 2 (L2) pre-processing, and Network Slicing, which provides dedicated networks for specific services.

Currently, discussions are underway to improve and enhance the initial 5G mobile communications technology in light of the services it was intended to support, such as vehicle-to-everything (V2X) to help autonomous vehicles make driving decisions based on their own location and status information transmitted by the vehicle and increase user convenience, physical (PHY) layer standardization is underway for technologies, such as new radio unlicensed (NR-U), NR terminal low power consumption technology (UE power saving), non-terrestrial network (NTN), which is a direct terminal-to-satellite communication for coverage in areas where communication with terrestrial networks is not possible, and Positioning.

In addition, intelligent factories (industrial Internet of things (IIoT)) to support new services through connectivity and convergence with other industries, integrated access and backhaul (IAB) to provide nodes for network coverage area expansion by integrating wireless backhaul links and access links, and mobility enhancement technologies, including conditional handover and dual active protocol stack (DAPS) handover, standardization is also underway in the area of air interface architecture/protocols for technologies, such as 2-step random access channel (RACH) for NR, which simplifies the random access process, 5G baseline architecture (e.g., service based architecture, service based Interface) for the convergence of network functions virtualization (NFV) and software-defined networking (SDN) technologies, and system architecture/services for mobile edge computing (MEC), where services are delivered based on the location of the terminal.

Once these 5G mobile communication systems are commercialized, an explosive growth of connected devices will be connected to the communication network, which is expected to require enhancement of the functions and performance of 5G mobile communication systems and integrated operation of connected devices. To this end, new research will be conducted on improving 5G performance and reducing complexity by utilizing extended reality (XR), artificial intelligence (AI), and machine learning (ML) to efficiently support augmented reality (AR), virtual reality (VR), and mixed reality (MR), supporting AI services, supporting Metaverse services, and drone communication.

In addition, these advances in 5G mobile communications systems will be supported by new waveforms to ensure coverage in the terahertz band of 6G mobile communications technology, and multi-antenna transmission technologies, such as full dimensional MIMO (FD-MIMO), array antenna, and large scale antenna, metamaterial-based lenses and antennas, high-dimensional spatial multiplexing techniques using orbital angular momentum (OAM), and reconfigurable intelligent surface (RIS) technologies to improve coverage of terahertz band signals, full duplex technology to improve frequency efficiency and system network of 6G mobile communication technology, AI-based communication technology that utilizes satellite and artificial intelligence (AI) from the design stage and realizes system optimization by embedding end-to-end AI support functions, and next-generation distributed computing technology that realizes complex services beyond the limits of terminal computing power by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method capable of effectively providing a service in a mobile communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving, from a base station, downlink control information (DCI) scheduling a physical uplink shared channel (PUSCH) transmission, the DCI including information on a frequency resource for the PUSCH transmission and information indicating whether frequency hopping to be applied to the PUSCH transmission, and transmitting, to the base station, a PUSCH, based on precoding applied according to a predetermined resource unit based on the frequency resource for the PUSCH transmission, wherein, in case that the information indicating whether the frequency hopping to be applied for the PUSCH transmission indicates a value indicating that the frequency hopping is applied and the precoding is a wideband based precoding for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined resource unit configured to a size equal to the frequency resource which is frequency hopped.

In accordance with another aspect of the disclosure, a method performed by a base station in a wireless communication system is provided. The method includes transmitting, to a user equipment (UE), downlink control information (DCI) scheduling a physical uplink shared channel (PUSCH) transmission, the DCI including information on a frequency resource for the PUSCH transmission and information indicating whether frequency hopping to be applied to the PUSCH transmission, and receiving, from the UE, a PUSCH, based on precoding applied according to a predetermined resource unit based on the frequency resource for the PUSCH transmission, wherein, in case that the information indicating whether the frequency hopping to be applied for the PUSCH transmission indicates a value indicating that the frequency hopping is applied and the precoding is a wideband based precoding for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined resource unit configured to a size equal to the frequency resource which is frequency hopped.

In accordance with another aspect of the disclosure, a user equipment (UE) in a wireless communication system is provided. The UE includes a transceiver, and a controller coupled with the transceiver and configured to receive, from a base station, downlink control information (DCI) scheduling a physical uplink shared channel (PUSCH) transmission, the DCI including information on a frequency resource for the PUSCH transmission and information indicating whether frequency hopping to be applied to the PUSCH transmission, and transmit, to the base station, a PUSCH, based on precoding applied according to a predetermined resource unit based on the frequency resource for the PUSCH transmission, wherein, in case that the information indicating whether the frequency hopping to be applied for the PUSCH transmission indicates a value indicating that the frequency hopping is applied and the precoding is a wideband based precoding for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined resource unit configured to a size equal to the frequency resource which is frequency hopped.

In accordance with another aspect of the disclosure, a base station in a wireless communication system is provided. The base station includes a transceiver, and a controller coupled with the transceiver and configured to transmit, to a user equipment (UE), downlink control information (DCI) scheduling a physical uplink shared channel (PUSCH) transmission, the DCI including information on a frequency resource for the PUSCH transmission and information indicating whether frequency hopping to be applied to the PUSCH transmission, and receive, from the UE, a PUSCH, based on precoding applied according to a predetermined resource unit based on the frequency resource for the PUSCH transmission, wherein, in case that the information indicating whether the frequency hopping to be applied for the PUSCH transmission indicates a value indicating that the frequency hopping is applied and the precoding is a wideband based precoding for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined resource unit configured to a size equal to the frequency resource which is frequency hopped.

The disclosed embodiment provides a device and a method capable of effectively providing a service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
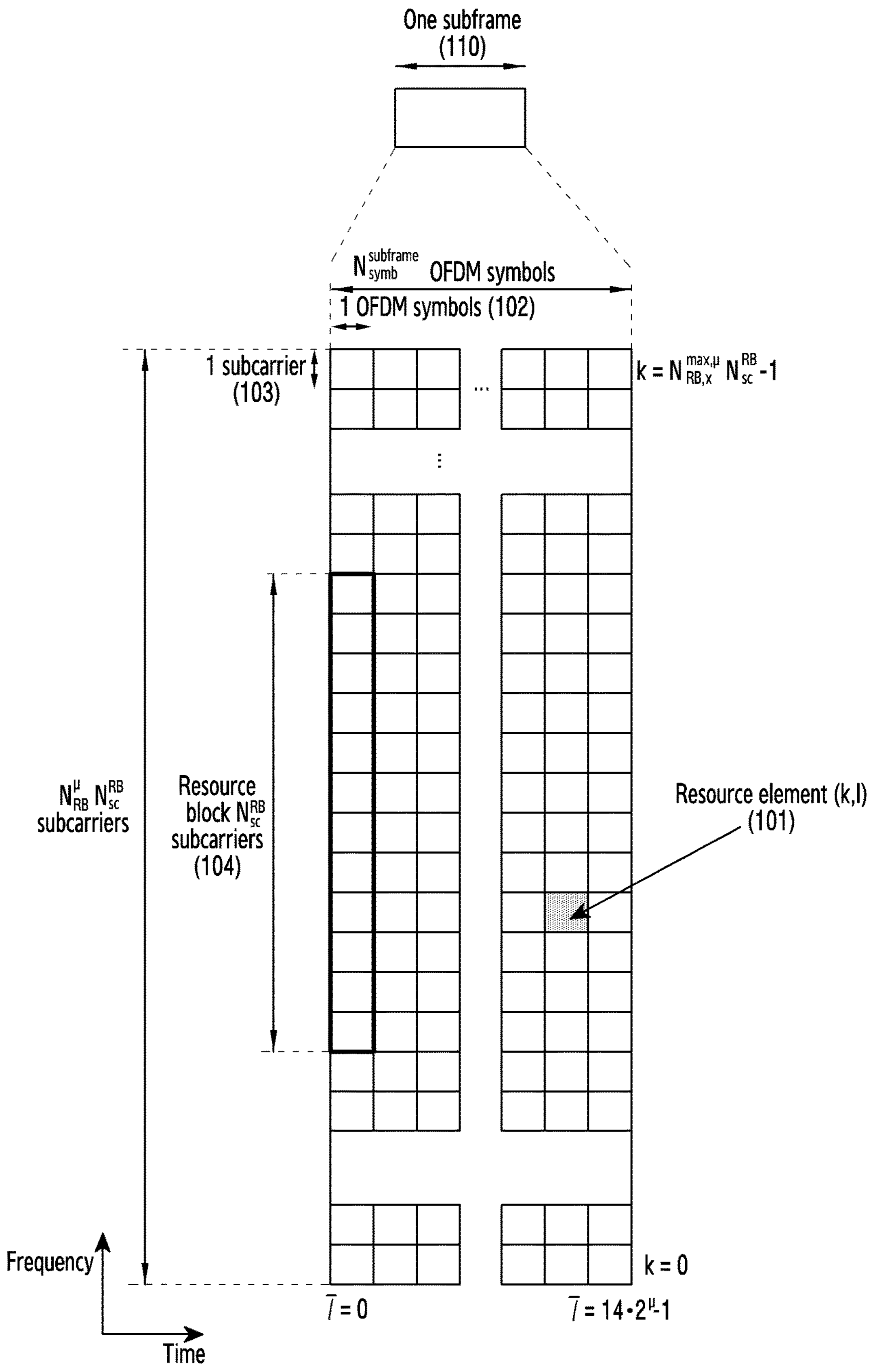
FIG. 1 illustrates a basic structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context; clearly dictates otherwise. Thus, for example, reference to "a component surface" includes reference to one or more of such surfaces.

In describing the embodiments of the disclosure, descriptions related to technical contents well-known in the relevant art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the respective drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms, and the embodiments of the disclosure are provided merely to completely disclose the disclosure and inform those skilled in the art of the scope of the disclosure. The disclosure is defined only by the scope of the appended claims. Throughout the specification, the same or like reference signs indicate the same or like elements. In describing the disclosure below, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include at least one of a user equipment (UE), a mobile station (MS), a cellular phone, a smartphone, a computer, or a multimedia system capable of performing a communication function. In the disclosure, a "downlink (DL)" may refer to a radio link via which a base station transmits a signal to a terminal, and an "uplink (UL)" may refer to a radio link via which a terminal transmits a signal to a base station. Furthermore, in the following description, long term evolution (LTE) or long term evolution advanced (LTE-A) systems may be described by way of example, but the embodiments of the disclosure may also be applied to other communication systems having similar technical backgrounds or channel types. Examples of such communication systems may include $5^{th}$ generation mobile communication technologies (5G, new radio, and NR) developed beyond LTE-A, and in the following description, the "5G" may be the concept that covers the exiting LTE, LTE-A, and other similar services. In addition, based on determinations by those skilled in the art, the disclosure may also be applied to other communication systems through some modifications without significantly departing from the scope of the disclosure.

It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

According to an embodiment of the disclosure, as used in the disclosure, the "unit" may refer to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more central processing units (CPUs) within a device or a security multimedia card. Furthermore, the "unit" in the disclosure may include one or more processors.

A wireless communication system is advancing to a broadband wireless communication system for providing high-speed and high-quality packet data services using communication standards, such as high-speed packet access (HSPA) of 3GPP, LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services.

According to an embodiment of the disclosure, as a typical example of the broadband wireless communication system, an LTE system employs an orthogonal frequency division multiplexing (OFDM) scheme in a downlink (DL). In an uplink (UL), a single carrier frequency division multiple access (SC-FDMA) scheme may be employed. The uplink may refer to a radio link via which a user equipment (UE) or a mobile station (MS) transmits data or control signals to a base station (BS) or eNode B, and the downlink may refer to a radio link via which the base station transmits data or control signals to the UE. The multiple access scheme may separate data or control information of respective users by allocating and operating time-frequency resources for transmitting the data or control information for each user so as to avoid overlapping each other, that is, so as to establish orthogonality.

According to an embodiment of the disclosure, since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to an embodiment of the disclosure, e MBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, various transmission/reception technologies including a further enhanced multi-input multi-output (MIMO) transmission technique may be required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services, such as the Internet of things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of things. Since the Internet of things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 15 years because it is difficult to frequently replace the battery of the UE.

Lastly, URLLC is a cellular-based mission-critical wireless communication service. For example, URLLC may be used for services, such as remote control for robots or machines, industrial automation, unmanned aerial vehicles, remote health care, and emergency alert. Thus, URLLC must provide communication with ultra-low latency and ultra-high reliability. For example, a service supporting URLLC must satisfy an air interface latency of less than 0.5 ms, and may also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

According to an embodiment of the disclosure, the three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

In the following description, the term “a/b” may be understood as at least one of a and b.

[NR Time-Frequency Resources]

Hereinafter, a frame structure of a 5G system will be described with reference to the accompanying drawings.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a basic structure of a time-frequency domain, which is a radio resource domain used to transmit data or control channels, in a 5G system according to an embodiment of the disclosure.

Referring to FIG. 1, the horizontal axis in FIG. 1 represents a time domain, and the vertical axis in FIG. 1 represents a frequency domain. The basic unit of resources in the time-frequency domain is a resource element (RE) 101, which may be defined as one orthogonal frequency division multiplexing (OFDM) symbol 102 on the time axis and one subcarrier 103 on the frequency axis. In the frequency domain, $$N_{SC}^{RB}$$

(for example, 12) consecutive REs may constitute one resource block (RB) 104. In the time domain, one subframe 110 may include multiple OFDM symbols 102. For example, the length of one subframe may be 1 ms.

Figure 2:
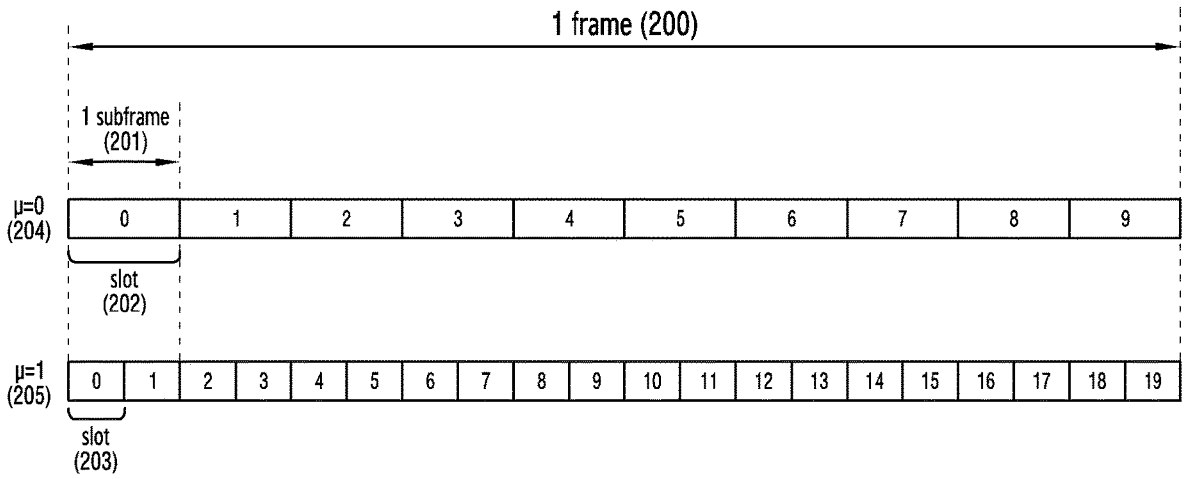
FIG. 2 illustrates a structure of a frame, a subframe, and a slot in a wireless communication system according to an embodiment of the disclosure.

FIG. 2 illustrates a structure of a frame, a subframe, and a slot in a wireless communication system according to an embodiment of the disclosure.

Referring to FIG. 2, it illustrates a structure of a frame 200, a subframe 201, and a slot 202. One frame 200 may be defined as 10 ms. One subframe 201 may be defined as 1 millisecond (ms), and thus one frame 200 may include a total of ten subframes 201.

According to an embodiment of the disclosure, one slot 202 or 203 may be defined as 14 OFDM symbols. For example, the number of symbols per one slot may be referred to as $$N_{symb}^{slot} = 14.$$

One subframe 201 may include one or multiple slots 202 and 203, and the number of slots 202 and 203 per one subframe 201 may vary depending on configuration values μ 204 or 205 for the subcarrier spacing.

The example of FIG. 2 shows the case of μ=0 (204) and the case of μ=1 (205) as a configuration value for a subcarrier spacing. In the case of u-0 (204), one subframe 201 may include one slot 202, and in the case of μ=1 (205), one subframe 201 may include two slots 203. For example, the number of slots per one subframe $$N_{slot}^{subframe,\mu}$$

may differ depending on the subcarrier spacing configuration value u, and the number of slots per one frame $$N_{slot}^{frame,\mu}$$

may differ accordingly.

$$N_{slot}^{subframe,\mu} \text{ and } N_{slot}^{frame,\mu}$$

may be defined according to each subcarrier spacing configuration u as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Hereinafter, a bandwidth part (BWP) configuration in a 5G communication system will be described with reference to the drawings.

Figure 3:
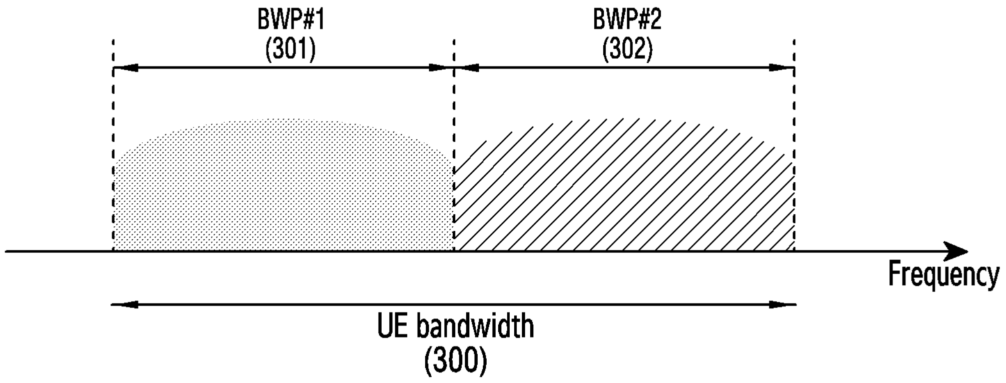
FIG. 3 illustrates a bandwidth part configuration in a wireless communication system according to an embodiment of the disclosure.

FIG. 3 illustrates a bandwidth part configuration in a wireless communication system according to an embodiment of the disclosure.

Referring to FIG. 3, it illustrates a UE bandwidth 300 is configured to include two bandwidth parts, that is, bandwidth part #1 (BWP #1) 301 and bandwidth part #2 (BWP #2) 302. A base station may configure one or multiple bandwidth parts for a UE, and may configure the following pieces of information with regard to each bandwidth part as given in Table 2 below.

TABLE 2

```
BWP ::=                        SEQUENCE {
  bwp-Id                         BWP-Id,
 (bandwidth part identifier)
  locationAndBandwidth           INTEGER (1..65536),
  (bandwidth part location)
  subcarrierSpacing              ENUMERATED {n0, n1, n2, n3, n4, n5},
  (subcarrier spacing)
  cyclicPrefix                   ENUMERATED { extended }
  (cyclic prefix)
}
```

The information configured for the UE is not limited to the above example, and in addition to the configuration information in Table 2, various parameters related to the bandwidth part may be configured for the UE. The base station may transfer the configuration information to the UE through upper layer signaling (for example, radio resource control (RRC) signaling). At least one of the one or more bandwidth parts configured for the UE may be activated. Whether or not the configured bandwidth part is activated may be transferred from the base station to the UE semi-statically through RRC signaling, or dynamically through downlink control information (DCI).

According to an embodiment of the disclosure, before a radio resource control (RRC) connection, an initial bandwidth part (BWP) for initial access may be configured for the UE by the base station through a master information block (MIB). For example, the UE may receive configuration information regarding a control resource set (CORESET) and a search space which may be used to transmit a PDCCH for receiving system information (which may correspond to remaining system information (RMSI) or system information block 1 (SIB1) necessary for initial access through the MIB in the initial access step.

According to an embodiment of the disclosure, each of the control resource set and the search space configured through the MIB may be considered identity (ID) 0 or identified thereby. The base station may notify the UE of configuration information, such as frequency allocation information, time allocation information, and/or numerology, regarding CORESET #0 through the MIB. In addition, the base station may notify the UE of configuration information regarding the monitoring cycle and occasion with regard to CORESET #0, that is, configuration information regarding search space #0, through the MIB. The UE may identify or consider a frequency domain configured by CORESET #0 acquired from the MIB as an initial bandwidth part for initial access. The ID of the initial bandwidth part may be considered to be 0.

According to an embodiment of the disclosure, the bandwidth part-related configuration supported by 5G may be used for various purposes.

According to an embodiment of the disclosure, if the bandwidth supported by the UE is smaller than the system bandwidth, the base station may support data communication of the UE through the bandwidth part configuration. For example, the base station may configure the frequency location of the bandwidth part (configuration information 2) for the UE, so that the UE can transmit/receive data at a specific frequency location (for example, a configured frequency location) within the system bandwidth.

According to an embodiment of the disclosure, the base station may configure multiple bandwidth parts for the UE for the purpose of supporting different numerologies. For example, in order to support a designated UE's data transmission/reception using both a subcarrier spacing of 15 kHz and a subcarrier spacing of 30 kHz, the base station may configure, for the designated UE, two bandwidth parts as subcarrier spacings of 15 kHz and 30 kHz, respectively. Different bandwidth parts may be subjected to frequency division multiplexing (FDM), and if data is to be transmitted/received at a specific subcarrier spacing, the bandwidth part configured as the corresponding subcarrier spacing may be activated.

According to an embodiment of the disclosure, the base station may configure bandwidth parts having different sizes of bandwidths for the UE for the purpose of reducing power consumed by the UE. For example, if the UE supports a substantially large bandwidth (for example, 100 MHz) and always transmits/receives data with the supported bandwidth, a substantially large amount of power consumption may occur. More particularly, it may be substantially inefficient from the viewpoint of power consumption to unnecessarily monitor the downlink control channel with a large bandwidth of 100 MHz in the absence of traffic. In order to reduce power consumed by the UE, the base station may configure a bandwidth part of a relatively small bandwidth (for example, a bandwidth part of 20 MHz) for the UE. The UE may perform a monitoring operation in the 20 MHz bandwidth part in the absence of traffic, and may transmit/receive data with the 100 MHz bandwidth part as indicated by the base station if data has occurred.

According to an embodiment of the disclosure, in connection with the bandwidth part configuring method, UEs, before RRC-connected, may receive configuration information regarding the initial bandwidth part (initial BWP) through an MIB in the initial access step. For example, a UE may have a control resource set (i.e., CORESET) configured for a downlink control channel which may be used to transmit DCI for scheduling a system information block (SIB) from the MIB of a physical broadcast channel (PBCH). The bandwidth of the control resource set configured by the MIB may be considered the initial bandwidth part, and the UE may receive, through the configured initial bandwidth part, a physical downlink shared channel (PDSCH) through which an SIB is transmitted. The initial bandwidth part may be used not only for the purpose of receiving the SIB, but also for other system information (OSI), paging, and/or random access.

According to an embodiment of the disclosure, if one or more bandwidth parts are configured for the UE, the base station may indicate, to the UE, to change (or switch or transition) the bandwidth parts by using a bandwidth part indicator field inside DCI. For example, if the currently activated bandwidth part of the UE is bandwidth part #1 301 in FIG. 3, the base station may indicate bandwidth part #2 302 with a bandwidth part indicator inside DCI, and the UE may change (or switch) the bandwidth part to bandwidth part #2 302 indicated by the bandwidth part indicator inside the received DCI.

As described above, DCI-based bandwidth part changing may be indicated by DCI for scheduling a PDSCH or a PUSCH, and thus, upon receiving a bandwidth part change request, the UE needs to be able to receive or transmit the PDSCH or PUSCH scheduled by the corresponding DCI in the changed bandwidth part with no problem. To this end, requirements for the delay time (TBWP) required during a bandwidth part change are specified in standards, and may be defined as given in Table 3 below, for example.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

[Note 1] Depends on UE capability.
Note 2:
If the BWP switch involves changing of SCS, the BWP switch delay is determined by the larger one between the SCS before BWP switch and the SCS after BWP switch.

According to an embodiment of the disclosure, the requirements for the bandwidth part change delay time may support type 1 or type 2, depending on the capability of the UE. The UE may report the supportable bandwidth part change delay time type to the base station. For example, the bandwidth part delay time may differ depending on the capability of the UE, and the UE may report the bandwidth part change delay time type, determined based on the capability of the UE, to the base station. The bandwidth part change delay time type may indicate a bandwidth part change delay time.

According to an embodiment of the disclosure, if the UE has received DCI including a bandwidth part change indicator in slot n, according to (or based on) the requirement for the bandwidth part change delay time, the UE may complete a change to the new bandwidth part indicated by the bandwidth part change indicator at a timepoint not later than slot n+TBWP, and the UE may transmit and/or receive a data channel scheduled by the corresponding DCI in the changed new bandwidth part.

According to an embodiment of the disclosure, if the base station wants to schedule a data channel by using the new bandwidth part, the base station may determine time domain resource allocation regarding the data channel, based on the UE's bandwidth part change delay time (TBWP). For example, when scheduling a data channel by using the new bandwidth part, the base station may schedule the corresponding data channel at a timepoint after the bandwidth part change delay time, in connection with the determination of time domain resource allocation regarding the data channel. Accordingly, the UE may not expect that the DCI indicating a bandwidth part change will indicate a slot offset (K0 or K2) value smaller than the bandwidth part change delay time (TBWP).

According to an embodiment of the disclosure, in case that the UE has received DCI (for example, DCI format 1_1 or 0_1) indicating a bandwidth part change, the UE may perform no transmission or reception during a time interval from the third symbol of the slot used to receive a PDCCH including the corresponding DCI indicating the bandwidth part change to the start point of the slot indicated by a slot offset (K0 or K2) value. For example, the slot offset (K0 or K2) value may be indicated by a time domain resource allocation indicator field in the corresponding DCI.

For example, if the UE has received DCI indicating a bandwidth part change in slot n, and the slot offset value indicated by the corresponding DCI is K, the UE may perform no transmission or reception from the third symbol of slot n to the symbol before slot n+K (i.e., the last symbol of slot n+K−1).

[Regarding CA/DC]

Figure 4:
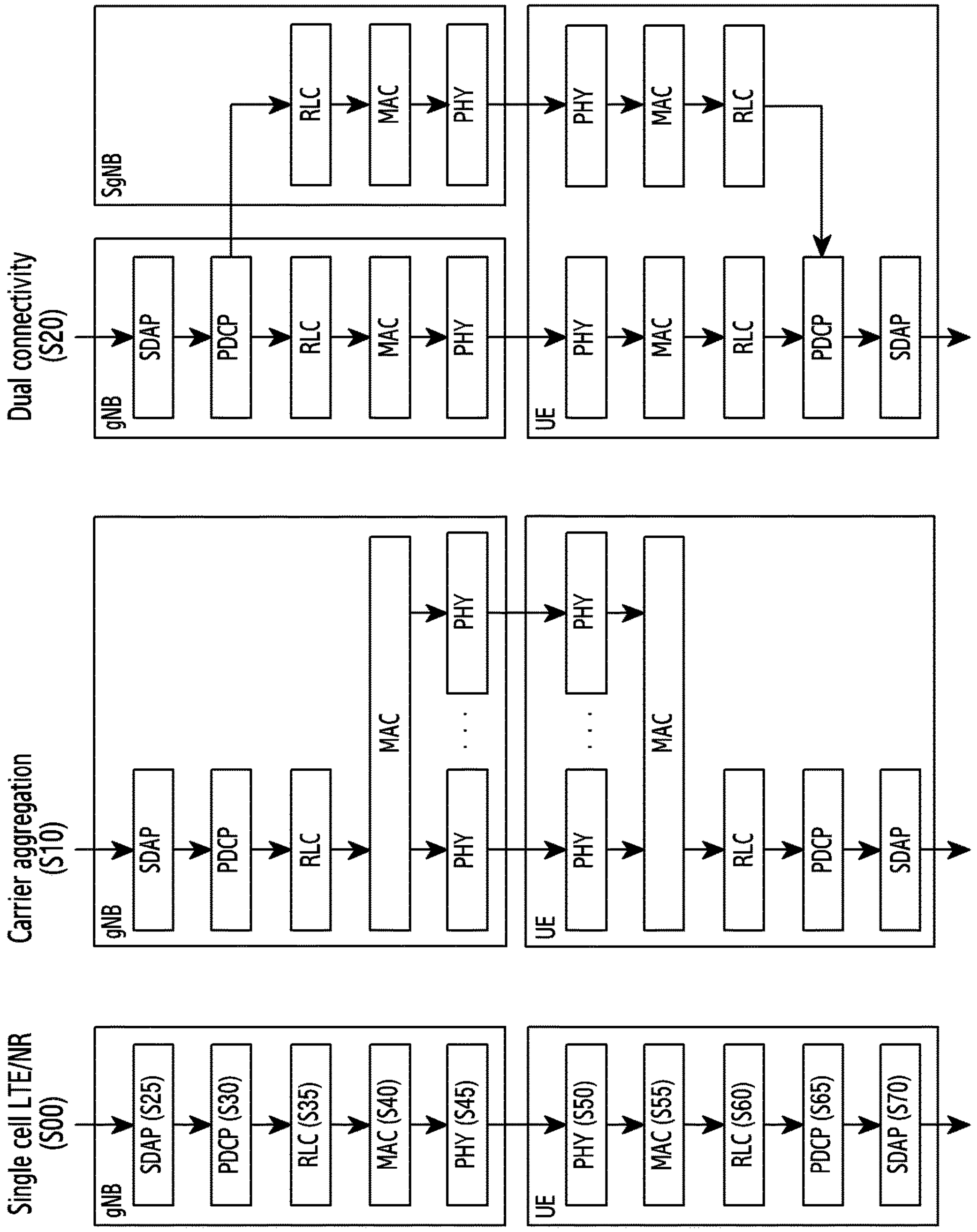
FIG. 4 illustrates radio protocol structures of a base station and a user equipment (UE) in single cell, carrier aggregation, and dual connectivity situations in a wireless communication system according to an embodiment of the disclosure.

FIG. 4 illustrates radio protocol structures of a base station and a UE in single cell, carrier aggregation, and dual connectivity situations according to an embodiment of the disclosure.

Referring to FIG. 4, a radio protocol of a mobile communication system includes an NR service data adaptation protocol (SDAP) S25 or S70, an NR packet data convergence protocol (PDCP) S30 or S65, an NR radio link control (RLC) S35 or S60, and/or an NR medium access controls (MAC) S40 or S55, on each of UE and NR base station sides.

According to an embodiment of the disclosure, the main functions of the NR SDAP S25 or S70 may include at least some of functions below.

- Transfer of user plane data
- Mapping between a quality of service (QoS) flow and a data radio bearer (DRB) for both DL and UL
- Marking QoS flow ID in both DL and UL packets
- Reflective QoS flow to DRB mapping for the UL SDAP protocol data units (PDUs)

According to an embodiment of the disclosure, with regard to the SDAP layer device, whether to use the header of the SDAP layer device or whether to use functions of the SDAP layer device may be configured for the UE through an RRC message according to PDCP layer devices or according to bearers or according to logical channels. If an SDAP header is configured, the non-access stratum (NAS) quality of service (QoS) reflection configuration 1-bit indicator (NAS reflective QoS) of the SDAP header and the access stratum (AS) QoS reflection configuration 1-bit indicator (AS reflective QoS) may indicate, to the UE, that the UE can update or reconfigure mapping information regarding the QoS flow and data bearer of the uplink and downlink. For example, the SDAP header may include QoS flow ID information indicating the QoS. For example, the QoS information may be used as data processing priority for smoothly supporting services and/or or scheduling information, or the like.

The main functions of the NR PDCP S30 or S65 may include at least some of functions below.

- Header compression and decompression: robust header compression (ROHC) only
- Transfer of user data
- In-sequence delivery of upper layer PDUs
- Out-of-sequence delivery of upper layer PDUs
- PDCP PDU reordering for reception
- Duplicate detection of lower layer service data units (SDUs)
- Retransmission of PDCP SDUs
- Ciphering and deciphering
- Timer-based SDU discard in uplink According to an embodiment of the disclosure, the reordering of the NR PDCP device may refer to a function of reordering PDCP PDUs received from a lower layer in an order based on the PDCP sequence number (SN), and may include a function of transferring data to an upper layer in the reordered sequence.

According to an embodiment of the disclosure, the reordering of the NR PDCP device may include a function of instantly transferring data without considering the order, and may include a function of recording PDCP PDUs lost as a result of reordering. The reordering of the NR PDCP device may include a function of reporting the state of the lost PDCP PDUs to the transmitting side, and may include a function of requesting retransmission of the lost PDCP PDUs.

The main functions of the NR RLC S35 or S60 may include at least some of functions below.

- Transfer of upper layer PDUs
- In-sequence delivery of upper layer PDUs
- Out-of-sequence delivery of upper layer PDUs
- Error Correction through automatic repeat request (ARQ)
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment According to an embodiment of the disclosure, the in-sequence delivery of the NR RLC device may refer to a function of successively delivering RLC SDUs received from the lower layer to the upper layer. The in-sequence delivery of the NR RLC device may include a function of, if one original RLC SDU is segmented into multiple RLC SDUs and the segmented RLC SDUs are received, reassembling the RLC SDUs and delivering the reassembled RLC SDUs. The in-sequence delivery of the NR RLC device may include a function of reordering the received RLC PDUs with reference to the RLC sequence number (SN) or PDCP sequence number (SN), and may include a function of recording RLC PDUs lost as a result of reordering. The in-sequence delivery of the NR RLC device may include a function of reporting the state of the lost RLC PDUs to the transmitting side, and may include a function of requesting retransmission of the lost RLC PDUs.

According to an embodiment of the disclosure, the in-sequence delivery of the NR RLC device may include a function of, if there is a lost RLC SDU, successively delivering only RLC SDUs before the lost RLC SDU to the upper layer, and may include a function of, if a predetermined timer has expired although there is a lost RLC SDU, successively delivering all RLC SDUs received before the timer was started to the upper layer. Alternatively, the in-sequence delivery of the NR RLC device may include a function of, if a predetermined timer has expired although there is a lost RLC SDU, successively delivering all RLC SDUs received until now to the upper layer. In addition, the in-sequence delivery of the NR RLC device may process RLC PDUs in the received order (regardless of the sequence number order, in the order of arrival) and deliver same to the PDCP device regardless of the order (out-of-sequence delivery). The in-sequence delivery of the NR RLC device may, in the case of segments, receive segments which are stored in a buffer or which are to be received later, reconfigure same into one complete RLC PDU, and then process and deliver same to the PDCP device. The NR RLC layer may include no concatenation function, which may be performed in the NR MAC layer or replaced with a multiplexing function of the NR MAC layer.

According to an embodiment of the disclosure, the out-of-sequence delivery of the NR RLC device may refer to a function of instantly delivering RLC SDUs received from the lower layer to the upper layer regardless of the order. The out-of-sequence delivery of the NR RLC device may include a function of, if one original RLC SDU is segmented into multiple RLC SDUs and the segmented RLC SDUs are received, reassembling the RLC SDUs and delivering the reassembled RLC SDUs, and may include a function of storing the RLC SN or PDCP SN of received RLC PDUs, and recording RLC PDUs lost as a result of reordering.

According to an embodiment of the disclosure, the NR MAC S40 or S55 may be connected to multiple NR RLC layer devices configured in one UE, and the main functions of the NR MAC may include at least some of functions below.

- Mapping between logical channels and transport channels
- Multiplexing/demultiplexing of MAC SDUs
- Scheduling information reporting
- Error correction through hybrid automatic repeat request (HARQ)
- Priority handling between logical channels of one UE
- Priority handling between UEs by means of dynamic scheduling
- MBMS service identification
- Transport format selection
- Padding According to an embodiment of the disclosure, an NR PHY layer S45 or S50 may perform operations of channel-coding and modulating upper layer data, thereby obtaining OFDM symbols, and delivering the same through a radio channel, or demodulating OFDM symbols received through the radio channel, channel-decoding the same, and delivering the same to the upper layer.

According to an embodiment of the disclosure, the detailed structure of the radio protocol structure may be variously changed according to the carrier (or cell) operating scheme. For example, in case that the base station transmits data to the UE, based on a single carrier (or cell), the base station and the UE may use a protocol structure having a single structure with regard to each layer, such as S00. On the other hand, in case that the base station transmits data to the UE, based on carrier aggregation (CA) which uses multiple carriers in a single TRP, the base station and the UE may use a protocol structure which has a single structure up to the RLC, but multiplexes the PHY layer through a MAC layer, such as S10. For example, in case that the base station transmits data to the UE, based on dual connectivity (DC) which uses multiple carriers in multiple TRPs, the base station and the UE may use a protocol structure which has a single structure up to the RLC, but multiplexes the PHY layer through a MAC layer, such as S20.

[Unified TCI State]

Hereinafter, a method for indicating and activating a single TCI state based on a unified TCI scheme is provided. The unified TCI scheme may refer to a scheme of unifying a transmission/reception beam management scheme, which is distinguished by a spatial relation info scheme used in uplink transmission and a TCI state scheme used in downlink reception by a UE in existing Rel-15 and Rel-16, into the TCI state scheme and managing the same. Therefore, when the UE receives an indication of a TCI state from a base station, based on the unified TCI scheme, beam management may be performed using the TCI state even for UL transmission. If the UE has received a configuration of TCI-State which is higher-layer signaling having tci-stateld-r17 which is higher-layer signaling from the base station, the UE may perform an operation based on the unified TCI scheme by using the corresponding TCI-State. The TCI-State may exist in two types of a joint TCI state and a separate TCI state.

The first type is a joint TCI state, and the UE may receive an indication of, from the base station through one TCI-State, both TCI-States to be applied to uplink transmission and downlink reception. If the UE has received an indication of a joint TCI state-based TCI-State, the UE may receive an indication of a parameter to be used for downlink channel estimation by using an RS corresponding to qcl-Type1 in the corresponding joint TCI state-based TCI-State and a parameter to be used as a downlink reception beam or reception filter by using an RS corresponding to qcl-Type2. If the UE has received an indication of the joint TCI state-based TCI-State, the UE may receive an indication of a parameter to be used as an uplink transmission beam or transmission filter by using an RS corresponding to qcl-Type2 in a corresponding joint DL/UL TCI state-based TCI-State. In this case, if the UE has received an indication of the joint TCI state, the UE may apply the same beam to both uplink transmission and downlink reception.

The second type is a separate TCI state, and the UE may individually receive an indication of, from the base station, a UL TCI state to be applied to uplink transmission and a DL TCI state to be applied to downlink reception. If the UE has received an indication of a UL TCI state, the UE may receive an indication of a parameter to be used as an uplink transmission beam or transmission filter by using a reference RS or a source RS configured within the corresponding UL TCI state. If the UE has received an indication of a DL TCI state, the UE may receive an indication of a parameter to be used for downlink channel estimation by using an RS corresponding to qcl-Type1 and a parameter to be used as a downlink reception beam or reception filter by using an RS corresponding to qcl-Type2, the parameters being configured in the corresponding DL TCI state.

If the UE has received an indication of both a DL TCI state and a UL TCI state, the UE may receive an indication of a parameter to be used as an uplink transmission beam or transmission filter by using a reference RS or a source RS configured within the corresponding UL TCI state, and may receive an indication of a parameter to be used for downlink channel estimation by using an RS corresponding to qcl-Type1 and a parameter to be used as a downlink reception beam or reception filter by using an RS corresponding to qcl-Type2, the parameters being configured in the corresponding DL TCI state. In this case, if the DL TCI state indicated to the UE and the reference RS or source RS configured within the UL TCI state are different, the UE may apply individually apply beams to uplink transmission and downlink reception, respectively, based on the indicated UL TCI state and DL TCI state.

The UE may receive a configuration of up to 128 joint TCI states for each specific bandwidth part in a specific cell via higher-layer signaling from the base station, and may receive a configuration of up to 64 or 128 DL TCI states among separate TCI states, for each specific bandwidth part in a specific cell, based on a UE capability report, via higher-layer signaling, and the DL TCI states and the joint TCI states among the separate TCI states may use the same higher-layer signaling structure. For example, if 128 joint TCI states are configured, and 64 DL TCI states among the separate TCI states are configured, the 64 DL TCI states may be included in the 128 joint TCI states.

Up to 32 or 64 UL TCI states among the separate TCI states may be configured for each specific bandwidth part in a specific cell, based on the UE capability report, via higher-layer signaling, and like the relationship between the joint TCI states and the DL TCI states among the separate TCI states, the joint TCI states and the UL TCI states among the separate TCI states may also use the same higher-layer signaling structure, or the UL TCI states among the separate TCI states may use a higher-layer signaling structure different from that of the DL TCI states among the separate TCI states and the joint TCI states.

As such, using different higher-layer signaling structures or using the same higher-layer signaling structure may be defined in the standard, and may be distinguished through another higher-layer signaling configured by the base station, based on the UE capability report including information on whether there is a use scheme supportable by the UE among the two types.

The UE may receive a transmission/reception beam-related indication in a unified TCI scheme by using one scheme among the joint TCI state and the separate TCI state configured by the base station. The UE may receive a configuration of whether to use one of the joint TCI state and the separate TCI state, from the base station through higher-layer signaling.

The UE may receive a transmission/reception beam-related indication by using one scheme selected from among the joint TCI state and the separate TCI state through higher-layer signaling, and in this case, a method of transmission/reception beam indication from the base station may include two methods of an MAC-CE-based indication method and an MAC-CE-based activation and DCI-based indication method.

If the UE receives a transmission/reception beam-related indication through higher-layer signaling by using the joint TCI state scheme, the UE may receive an MAC-CE indicating the joint TCI state from the base station and perform a transmission/reception beam application operation, and the base station may schedule, for the UE, reception of a PDSCH including the corresponding MAC-CE through a PDCCH. If there is one joint TCI state included in the MAC-CE, the UE may determine an uplink transmission beam or transmission filter and a downlink reception beam or reception filter by using the indicated joint TCI state from 3 ms after transmission of a PUCCH including HARQ-ACK information indicating whether reception of the PDSCH including the corresponding MAC-CE is successful. If there are two or more joint TCI states included in the MAC-CE, the UE may identify that multiple joint TCI states indicated by the MAC-CE from 3 ms after transmission of a PUCCH including HARQ-ACK information indicating whether reception of the PDSCH including the corresponding MAC-CE is successful correspond to each code point of a TCI state field of DCI format 1_1 or 1_2, and activate the indicated joint TCI states. Thereafter, the UE may receive DCI format 1_1 or 1_2 and apply one joint TCI state indicated by a TCI state field in the corresponding DCI to uplink transmission and downlink reception beams. Here, DCI format 1_1 or 1_2 may include downlink data channel scheduling information (with DL assignment) or may not include the information (without DL assignment).

If the UE receives a transmission/reception beam-related indication through higher-layer signaling by using the separate TCI state scheme, the UE may receive an MAC-CE indicating the separate TCI state from the base station and perform a transmission/reception beam application operation, and the base station may schedule, for the UE, reception of a PDSCH including the corresponding MAC-CE through a PDCCH. If there is one separate TCI state set included in the MAC-CE, the UE may determine an uplink transmission beam or transmission filter and a downlink reception beam or reception filter by using separate TCI states included in the indicated separate TCI state set from 3 ms after transmission of a PUCCH including HARQ-ACK information indicating whether reception of the corresponding PDSCH is successful. In this case, the separate TCI state set may refer to a single separate TCI state or multiple separate TCI states that one code point of a TCI state field in DCI format 1_1 or 1_2 may have, and one separate TCI state set may include one DL TCI state, include one UL TCI state, or include one DL TCI state and one UL TCI state. If there are two or more separate TCI state sets included in the MAC-CE, the UE may identify that multiple separate TCI state sets indicated by the MAC-CE from 3 ms after transmission of a PUCCH including HARQ-ACK information indicating whether reception of the corresponding PDSCH is successful correspond to each code point of a TCI state field of DCI format 1_1 or 1_2, and activate the indicated separate TCI state sets. In this case, each code point of the TCI state field of DCI format 1_1 or 1_2 may indicate one DL TCI state, indicate one UL TCI state, or indicate one DL TCI state and one UL TCI state. Thereafter, the UE may receive DCI format 1_1 or 1_2 and apply a separate TCI state set indicated by a TCI state field in the corresponding DCI to uplink transmission and downlink reception beams. Here, DCI format 1_1 or 1_2 may include downlink data channel scheduling information (with DL assignment) or may not include the information (without DL assignment).

Figure 5:
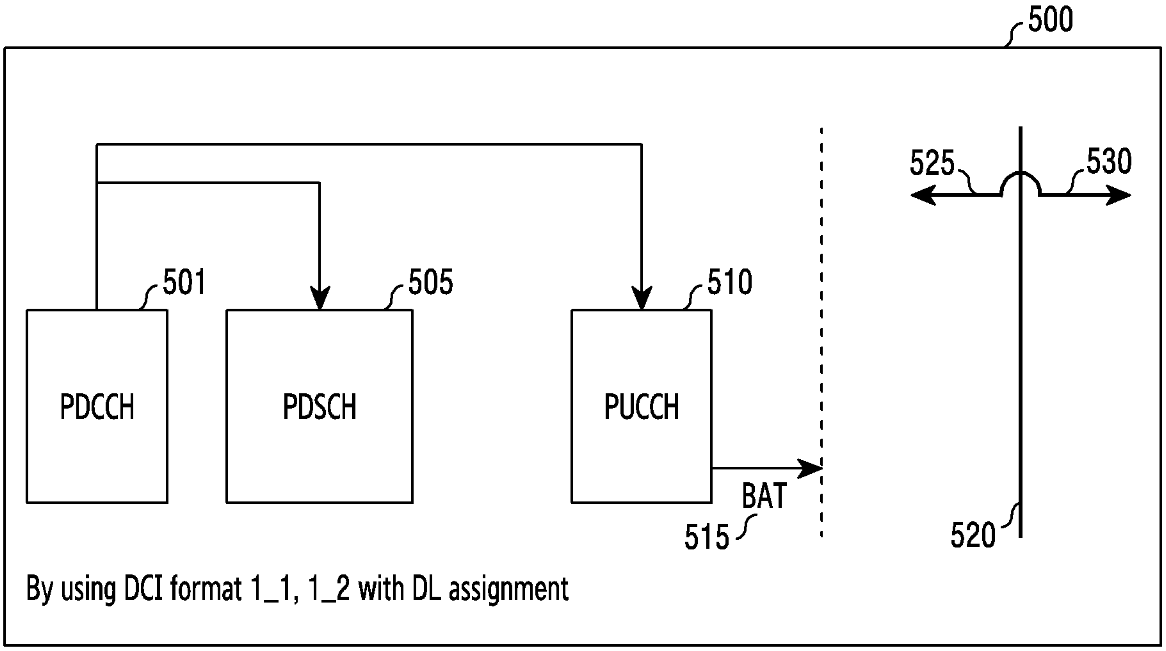
FIG. 5 illustrates a beam application time which may be considered in a case where a unified transmission configuration indication (TCI) scheme is used in a wireless communication system according to an embodiment of the disclosure.
Figure 5:
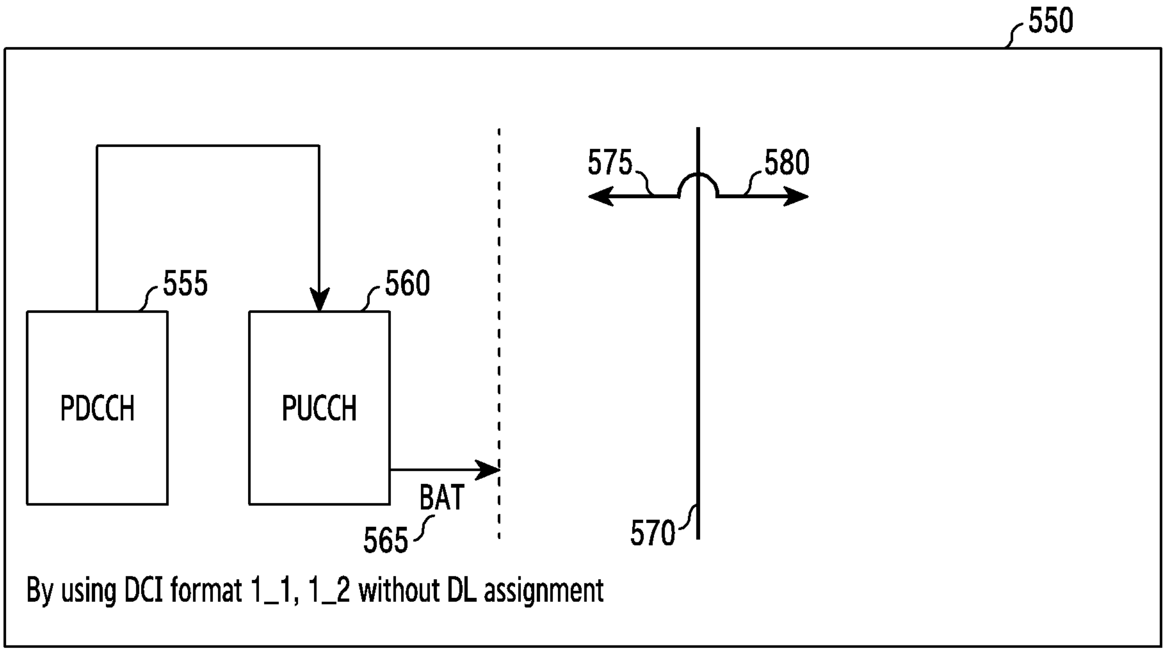

FIG. 5 illustrates a beam application time that may be considered when a unified TCI scheme is used in a wireless communication system according to an embodiment of the disclosure.

Referring to FIG. 5, as described above, a UE may receive DCI format 1_1 or 1_2 which includes downlink data channel scheduling information (with DL assignment) or does not include the information (without DL assignment) from a base station, and apply one joint TCI state or separate TCI state set indicated by a TCI state field in corresponding DCI to uplink transmission and downlink reception beams.

DCI format 1_1 or 1_2 with DL assignment 500: If the UE receives DCI format 1_1 or 1_2 including downlink data channel scheduling information from the base station (indicated by reference numeral 501) and indicates one joint TCI state or separate TCI state set based on a unified TCI scheme, the UE may receive a PDSCH scheduled based on the received DCI (indicated by reference numeral 505), and transmit a PUCCH including HARQ-ACK indicating whether reception of the DCI and the PDSCH is successful (indicated by reference numeral 510). In this case, the HARQ-ACK may include both meanings of whether reception of the DCI and the PDSCH is successful, the UE may transmit NACK when at least one of the DCI and the PDSCH is not received, and the UE may transmit ACK when both are successfully received.

DCI format 1_1 or 1_2 without DL assignment 550: If the UE receives DCI format 1_1 or 1_2 including no downlink data channel scheduling information from the base station (indicated by reference numeral 555) and indicates one joint TCI state or separate TCI state set based on the unified TCI scheme, the UE may assume at least one combination of the following for the corresponding DCI.

CRC scrambled using CS-RNTI is included.

Values of all bits assigned to all fields used as a redundancy version (RV) field are 1.

Values of all bits assigned to all fields used as a modulation and coding scheme (MCS) field are 1.

Values of all bits assigned to all fields used as a new data indication (NDI) field are 0.

Values of all bits assigned to a frequency domain resource allocation (FDRA) field are 0 for FDRA type 0, values of all bits assigned to the FDRA field are 1 for FDRA type 1, and if an FDRA scheme is dynamicSwitch, values of all bits assigned to the FDRA field are 0.

The UE may transmit a PUCCH including HARQ-ACK indicating the success or failure in reception of DCI format 1_1 or 1_2 for which the above matters have been assumed (indicated by reference numeral 560).

With respect to both DCI format 1_1 or 1_2 with DL assignment 500 and without DL assignment 550, if a new TCI state indicated through the DCI 501 or 555 is the same as the TCI state previously indicated and applied to uplink transmission and downlink reception beams, the UE may maintain the previously applied TCI state, and if the new TCI state is different from the previously indicated TCI state, the UE may determine a time point of applying the joint TCI state or separate TCI state set, which may be indicated from the TCI state field included in the DCI, to be an interval 530 or 580 after a first slot 520 or 570 after the time equivalent to a beam application time (BAT) 515 or 565 subsequent to PUCCH transmission, and may use the previously indicated TCI-state until an interval 525 or 575 before the corresponding slot 520 or 570.

With respect to both DCI format 1_1 or 1_2 with DL assignment 500 and without DL assignment 550, a BAT is a specific number of OFDM symbols and may be configured via higher-layer signaling based on UE capability report information. The BAT and a numerology for the first slot after the BAT may be determined based on a smallest numerology among all cells to which the joint TCI state or separate TCI state set indicated through the DCI is applied.

The UE may apply one joint TCI state indicated through the MAC-CE or DCI to reception of control resource sets linked to all UE-specific search spaces, reception of a PDSCH scheduled through a PDCCH transmitted from a corresponding control resource set, transmission of a PUSCH, and transmission of all PUCCH resources.

If one separate TCI state set indicated through the MAC-CE or DCI includes one DL TCI state, the UE may apply the one separate TCI state set to reception of control resource sets linked to all UE-specific search spaces and reception of a PDSCH scheduled through a PDCCH transmitted from a corresponding control resource set, and may apply the same to all PUSCH and PUCCH resources, based on a previously indicated UL TCI state.

If one separate TCI state set indicated through the MAC-CE or DCI includes one UL TCI state, the UE may apply the one separate TCI state set to all PUSCH and PUCCH resources, and may apply the same to reception of control resource sets linked to all UE-specific search spaces and reception of a PDSCH scheduled through a PDCCH transmitted from a corresponding control resource set, based on a previously indicated DL TCI state.

If one separate TCI state set indicated through the MAC-CE or DCI includes one DL TCI state and one UL TCI state, the UE may apply the DL TCI state to reception of control resource sets linked to all UE-specific search spaces and reception of a PDSCH scheduled through a PDCCH transmitted from a corresponding control resource set, and may apply the UL TCI state to all PUSCH and PUCCH resources.

[Unified TCI State MAC-CE]

Hereinafter, a method for indicating and activating a single TCI state based on a unified TCI scheme is provided. A UE may receive scheduling of a PDSCH including the following MAC-CE from a base station, and from a point after 3 slots after transmitting HARQ-ACK for the corresponding PDSCH to the base station, may start to interpret each code point of a TCI state field in DCI format 1_1 or 1_2, based on information in the MAC-CE received from the base station. For example, the UE may activate each entry of the MAC-CE received from the base station at each code point of the TCI state field in DCI format 1_1 or 1_2.

Figure 6:
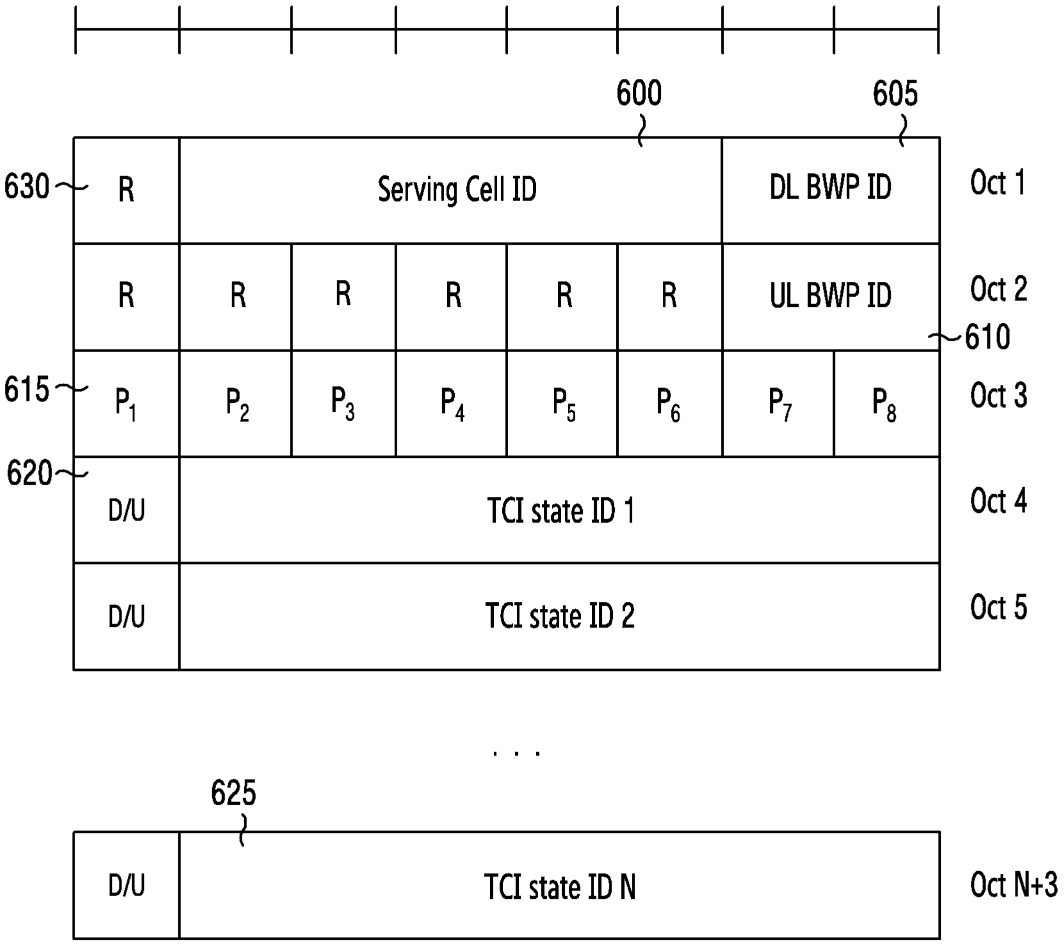
FIG. 6 illustrates a medium access control (MAC)-control element (CE) structure for activation and indication of a joint TCI state or a separate downlink (DL) or uplink (UL) TCI state in a wireless communication system according to an embodiment of the disclosure.

FIG. 6 illustrates a MAC-CE structure for activation and indication of a joint TCI state or a separate DL or UL TCI state in a wireless communication system according to an embodiment of the disclosure.

Referring to FIG. 6, the meaning of each field in a corresponding MAC-CE structure may be as follows.

- Serving Cell ID 600: This field may indicate a serving cell to which a corresponding MAC-CE is to be applied. This field may have a length of 5 bits. If a serving cell indicated by this field is included in one or more of simultaneousU-TCI-UpdateList1, simultaneousU-TCI-UpdateList2, simultaneousU-TCI-UpdateList3, and simultaneousU-TCI-UpdateList4, which are higher-layer signaling, the corresponding MAC-CE may be applied to all serving cells included in one or more lists among simultaneousU-TCI-UpdateList1, simultaneousU-TCI-UpdateList2, simultaneousU-TCI-UpdateList3, and simultaneousU-TCI-UpdateList4 which include the serving cell indicated by this field.
- DL BWP ID 605: This field may indicate a DL BWP to which a corresponding MAC-CE is to be applied, and the meaning of each code point of this field may correspond to each code point of a bandwidth part indicator in DCI. This field may have a length of 2 bits.
- DL BWP ID 610: This field may indicate a UL BWP to which a corresponding MAC-CE is to be applied, and the meaning of each code point of this field may correspond to each code point of a bandwidth part indicator in DCI. This field may have a length of 2 bits.
- Pi 615: This field may indicate whether each code point of a TCI state field in DCI format 1_1 or 1_2 has multiple TCI states or one TCI state. A case in which Pi has a value of 1 indicates that a corresponding i-th code point has multiple TCI states, which may indicate that the corresponding code point may include a separate DL TCI state and a separate UL TCI state. A case in which Pi has a value of 0 indicates that a corresponding i-th code point has a single TCI state, which may indicate that the corresponding code point may include one of a joint TCI state, a separate DCI TCI state, and a separate UL TCI state.
- D/U 620: This field may indicate whether a TCI state ID field in the same octet is a joint TCI state, a separate DL TCI state, or a separate UL TCI state. If this field is 1, the TCI state ID field in the same octet may be a joint TCI state or a separate DL TCI state, and if this field is 0, the TCI state ID field in the same octet may be a separate UL TCI state.
- TCI state ID 625: This field may indicate a TCI state that may be identified by TCI-StateID which is higher-layer signaling. If a D/U field is configured to be 1, this field may be used to represent TCI-StateID which may be expressed in 7 bits. If the D/U field is configured to be 0, a most significant bit (MSB) of this field may be considered as a reserved bit and the remaining 6 bits may be used to represent UL-TCIState-ID which is higher-layer signaling. The maximum number of TCI states that may be activated may be 8 for a joint TCI state and may be 16 for a separate DL or UL TCI state.
- R: R indicates a reserved bit and may be configured to be 0.

With respect to the MAC-CE structure of FIG. 6 described above, regardless of whether unifiedTCI-StateType-r17 in MIMOparam-r17 in ServingCellConfig, which is higher-layer signaling, is configured as joint or separate, the UE may include a third octet including P1, P2, . . . , P8 fields in the corresponding MAC-CE structure in FIG. 6. In this case, regardless of higher-layer signaling configured by the base station, the UE may perform TCI state activation by using a fixed MAC-CE structure. As another example, with respect to the MAC-CE structure of FIG. 6 described above, when unifiedTCI-StateType-r17 in MIMOparam-r17 in ServingCellConfig, which is higher-layer signaling, is configured as joint, the UE may omit the third octet including P1, P2, . . . , P8 fields in FIG. 6. In this case, the UE may save up to 8 bits of the payload of a corresponding MAC-CE according to higher-layer signaling configured by the base station. Further, all D/U fields located at a first bit from a fourth octet in FIG. 6 may be considered to be R fields and all the R fields may be configured to be 0 bits.

[CSI Resource Configuration]

According to an embodiment of the disclosure, in NR, a base station has a channel state information (CSI) framework for indicating CSI measurement and report of a UE. For example, a CSI framework of the NR may be configured by at least two elements including resource setting and report setting. For example, the report setting refers to at least one ID of the resource setting and thus they have correlation.

According to an embodiment of the disclosure, the resource setting may include information related to a reference signal (RS) for measuring channel state information by the UE. For example, the base station may configure at least one resource setting for the UE. For example, the base station and the UE may exchange at least a part of signaling information included in Table 4 in order to transmit information on the resource setting.

TABLE 4

```
-- ASN1START
-- TAG-CSI-RESOURCECONFIG-START
CSI-ResourceConfig ::=           SEQUENCE {
   csi-ResourceConfigId             CSI-ResourceConfigId,
   csi-RS-ResourceSetList           CHOICE {
      nzp-CSI-RS-SSB                   SEQUENCE {
         nzp-CSI-RS-ResourceSetList  SEQUENCE (SIZE (1..maxNrofNZP-CSI-
RS-ResourceSetsPerConfig)) OF NZP-CSI-RS-ResourceSetID
                                                         OPTIONAL,
-- Need R
         csi-SSB-ResourceSetList   SEQUENCE (SIZE (1..maxNrofCSI-SSB-
ResourceSetsPerConfig)) OF CSI-SSB-ResourceSetId
                                                         OPTIONAL
-- Need R
      },
      csi-IM-ResourceSetList   SEQUENCE (SIZE (1..maxNrofCSI-IM-
ResourceSetsPerConfig)) OF CSI-IM-ResourceSetId
   },
   bwp-ID                       BWP-Id,
   resourceType                    ENUMERATED { aperiodic, semiPersistent, periodic },
   ...
}
-- TAG-CSI-RESOURCECONFIG-STOP
-- ASN1STOP
```

According to an embodiment of the disclosure, signaling information CSI-ResourceConfig in Table 4 may include information on each resource setting. Based on the signaling information in Table 4, each resource setting may include a resource setting index (csi-ResourceConfigID), a BWP index (bwp-ID), a time domain transmission configuration (resourceType) of a resource, or a resource set list (csi-RS-ResourceSetList) including at least one resource set.

According to an embodiment of the disclosure, the time domain transmission configuration of the resource may be configured to be aperiodic transmission, semi-persistent transmission, or periodic transmission.

According to an embodiment of the disclosure, the resource set list may be a set including resource sets for channel measurement or a set including resource sets for interference measurement. For example, when the resource set list is a set including resource sets for channel measurement, each resource set may include at least one resource. The at least one resource may correspond to an index of a CSI reference signal (CSI-RS) resource or a synchronization/broadcast channel block (SS/PBCH block (SSB)). For example, when the resource set list is a set including resource sets for interference measurement, each resource set may include at least one interference measurement resource (CSI interference measurement (CSI-IM)).

According to an embodiment of the disclosure, when a resource set includes a CSI-RS, the base station and the UE may exchange at least a part of signaling information included in Table 5 in order to transmit information on the resource set.

TABLE 5

```
-- ASN1START
-- TAG-NZP-CSI-RS-RESOURCESET-START
NZP-CSI-RS-ResourceSet ::=          SEQUENCE {
   nzp-CSI-ResourceSetID               NZP-CSI-RS-ResourceSetID,
   nzp-CSI-RS-Resources               SEQUENCE (SIZE (1..maxNrofNZP-CSI-RS-
ResourcesPerSet)) OF NZP-CSI-RS-ResourceID,
   repetition                         ENUMERATED { on, off }
OPTIONAL,   -- Need S
   aperiodicTriggeringOffset          INTEGER(0..6)
OPTIONAL,   -- Need S
   trs-Info                           ENUMERATED {true}
OPTIONAL,   -- Need R
   ...
}
-- TAG-NZP-CSI-RS-RESOURCESET-STOP
-- ASN1STOP
```

According to an embodiment of the disclosure, signaling information NZP-CSI-RS-ResourceSet in Table 5 may include information on each resource set. Based on the signaling information in Table 5, each resource set may include at least information about a resource set index (nzp-CSI-ResourceSetID) or an index set (nzp-CSI-RS-Resources) of a CSI-RS included in a resource set, and may include a part of information (repetition) about a spatial domain transmission filter of a CSI-RS resource included in the resource set or information (trs-Info) about whether the CSI-RS resource included in the resource set has a tracking purpose.

According to an embodiment of the disclosure, the CSI-RS may be the most representative reference signal included in the resource set. The base station and the UE may exchange at least a part of signaling information included in Table 6 in order to transmit information on the CSI-RS resource.

TABLE 6

```
-- ASN1START
-- TAG-NZP-CSI-RS-RESOURCE-START
NZP-CSI-RS-Resource ::=               SEQUENCE {
   nzp-CSI-RS-ResourceID                  NZP-CSI-RS-ResourceID,
   resourceMapping                    CSI-RS-ResourceMapping,
   powerControlOffset                  INTEGER (-8..15),
   powerControlOffsetSS                  ENUMERATED{db-3, db0, db3, db6}
OPTIONAL,   -- Need R
   scramblingID                      ScramblingID,
   periodicityAndOffset                 CSI-ResourcePeriodicityAndOffset
OPTIONAL,   -- Cond PeriodicOrSemiPersistent
   qcl-InfoPeriodicCSI-RS              TCI-StateID              OPTIONAL,
-- Cond Periodic
   ...
}
-- TAG-NZP-CSI-RS-RESOURCE-STOP
-- ASN1STOP
```

According to an embodiment of the disclosure, signaling information NZP-CSI-RS-Resource in Table 6 may include information on each CSI-RS. The information included in the signaling information NZP-CSI-RS-Resource in Table 6 may have the following meanings, or may include the following information.

nzp-CSI-RS-ResourceID: a CSI-RS resource index resourceMapping: resource mapping information of a CSI-RS resource powerControlOffset: a ratio between PDSCH EPRE (Energy Per RE) and CSI-RS EPRE powerControlOffsetSS: a ratio between SS/PBCH block EPRE and CSI-RS EPRE scramblingID: a scrambling index of a CSI-RS sequence periodicityAndOffset: a transmission period and a slot offset of a CSI-RS resource qcl-InfoPeriodicCSI-RS: TCI-state information when a corresponding CSI-RS is a periodic CSI-RS According to an embodiment of the disclosure, resourceMapping included in the signaling information NZP-CSI-RS-Resource may indicate resource mapping information of the CSI-RS resource, and the signaling information NZP-CSI-RS-Resource may include resource element (RE) mapping for a frequency resource, the number of ports, symbol mapping, a CDM type, frequency resource density, and/or frequency band mapping information. Each of the number of ports, frequency resource density, a CDM type, and/or time-frequency domain RE mapping, which may be configured through the signaling information NZP-CSI-RS-Resource, may have a value determined in one of the rows shown in Tables 7A and 7B below.

TABLE 7

| Row | Ports X | Density ρ | cdm-Type | $(\bar{k}, \bar{l})$ | CDM group index j | k' | l' |
|---|---|---|---|---|---|---|---|
| 1 | 1 | 3 | No CDM | $(k_0, l_0)$, $(k_0 + 4, l_0)$, $(k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0)$, $(k_0 + 2, l_0)$ | 0, 1 | 0, 1 | 0 |
| 5 | 4 | 1 | FD-CDM2 | $(k_0, l_0)$, $(k_0, l_0 + 1)$ | 0, 1 | 0, 1 | 0 |
| 6 | 8 | 1 | FD-CDM2 | $(k_0, l_0)$, $(k_1, l_0)$, $(k_2, l_0)$, $(k_3, l_0)$ | 0, 1, 2, 3 | 0, 1 | 0 |
| 7 | 8 | 1 | FD-CDM2 | $(k_0, l_0)$, $(k_1, l_0)$, $(k_0, l_0 + 1)$, $(k_1, l_0 + 1)$ | 0, 1, 2, 3 | 0, 1 | 0 |
| 8 | 8 | 1 | CDM4 (FD2, TD2) | $(k_0, l_0)$, $(k_1, l_0)$ | 0, 1 | 0, 1 | 0, 1 |

TABLE 7-continued

| Row | Ports X | Density ρ | cdm-Type | $(\bar{k}, \bar{l})$ | CDM group index j | k' | l' |
|---|---|---|---|---|---|---|---|
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1), (k_0, l_1), (k_1, l_1), (k_2, l_1), (k_3, l_1), (k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

TABLE 7B

| Row | Ports X | Density ρ | cdm-Type | CDM group index j | k' | l' |
|---|---|---|---|---|---|---|
| 1 | 1 | 3 | No CDM | 0, 0, 0 | 0 | 0 |
| 2 | 1 | 1, 0.5 | No CDM | 0 | 0 | 0 |
| 3 | 2 | 1, 0.5 | FD-CDM2 | 0 | 0, 1 | 0 |
| 4 | 4 | 1 | FD-CDM2 | 0, 1 | 0, 1 | 0 |
| 5 | 4 | 1 | FD-CDM2 | 0, 1 | 0, 1 | 0 |
| 6 | 8 | 1 | FD-CDM2 | 0, 1, 2, 3 | 0, 1 | 0 |
| 7 | 8 | 1 | FD-CDM2 | 0, 1, 2, 3 | 0, 1 | 0 |
| 8 | 8 | 1 | CDM4 (FD2, TD2) | 0, 1 | 0, 1 | 0, 1 |
| 9 | 12 | 1 | FD-CDM2 | 0, 1, 2, 3, 4 ,5 | 0, 1 | 0 |
| 10 | 12 | 1 | CDM4 (FD2, TD2) | 0, 1, 2 | 0, 1 | 0, 1 |
| 11 | 16 | 1, 0.5 | FD-CDM2 | 0, 1, 2, 3, 4, 5, 6, 7 | 0, 1 | 0 |
| 12 | 16 | 1, 0.5 | CDM4 (FD2, TD2) | 0, 1, 2, 3 | 0, 1 | 0, 1 |
| 13 | 24 | 1, 0.5 | FD-CDM2 | 0, 1, 2, 3, 4, 5, 6, 7, 8, 9, 10, 11 | 0, 1 | 0 |
| 14 | 24 | 1, 0.5 | CDM4 (FD2, TD2) | 0, 1, 2, 3, 4, 5 | 0, 1 | 0, 1 |
| 15 | 24 | 1, 0.5 | CDM8 (FD2, TD4) | 0, 1, 2 | 0, 1 | 0, 1 2, 3 |
| 16 | 32 | 1, 0.5 | FD-CDM2 | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | 0, 1, 2, 3, 4, 5, 6, 7 | 0, 1 | 0, 1 |
| 18 | 32 | 1, 0.5 | CDM8 (FD2, TD4) | 0, 1, 2, 3 | 0, 1 | 0, 1, 2, 3 |

According to an embodiment of the disclosure, Tables 7A and 7B may show a frequency resource density, a CDM type, frequency and time domain starting positions $(\bar{k}, \bar{l})$ of a CSI-RS component RE pattern, and the number (k') of frequency domain REs and/or the number (l') of time domain REs of the CSI-RS component RE pattern, which are configurable according to the number (X) of CSI-RS ports. The above-described CSI-RS component RE pattern may be a basic unit for configuring a CSI-RS resource. Through Y=1+max(k') number of frequency domain REs and Z=1+max(l') number of time domain REs, the CSI-RS component RE pattern may include YZ number of REs.

For example, when the number of CSI-RS ports is 1, the position of a CSI-RS RE may be designated in a physical resource block (PRB) without restriction on subcarriers, and may be designated by a bitmap having 12 bits.

For example, when the number of CSI-RS ports is {2, 4, 8, 12, 16, 24, 32} and Y=2, the position of a CSI-RS RE may be designated for every two subcarriers in a PRB, and may be designated by a bitmap having 6 bits. For example, when the number of CSI-RS ports is 4 and Y=4, the position of a CSI-RS RE may be designated for every four subcarriers in a PRB, and may be designated by a bitmap having 3 bits. Similarly, the position of a time domain RE may be designated by a bitmap having a total of 14 bits.

[CSI Report Configuration]

According to an embodiment of the disclosure, report setting may refer to at least one ID of resource setting and thus the report setting and resource setting have correlation, and resource setting(s) having correlation with report setting may provide configuration information including information on a reference signal for measuring channel information. For example, when the resource setting(s) having correlation (or mapping relationship) with the report setting is used for measuring channel information, the measured channel information may be used for channel information reporting according to a reporting method configured in the report setting having correlation.

According to an embodiment of the disclosure, the report setting may include configuration information related to a CSI reporting method. For example, the base station and the UE may exchange at least a part of signaling information included in Table 8 in order to transmit information on the report setting.

TABLE 8

```
-- ASN1START
-- TAG-CSI-REPORTCONFIG-START
CSI-ReportConfig ::=                SEQUENCE {
   reportConfigID                      CSI-ReportConfigID,
   carrier                          ServCellIndex          OPTIONAL,   -- Need S
   resourcesForChannelMeasurement      CSI-ResourceConfigId,
   csi-IM-ResourcesForInterference     CSI-ResourceConfigId
OPTIONAL,   -- Need R
   nzp-CSI-RS-ResourcesForInterference   CSI-ResourceConfigId
OPTIONAL,   -- Need R
   reportConfigType                    CHOICE {
      periodic                         SEQUENCE {
         reportSlotConfig                    CSI-ReportPeriodicityAndOffset,
         pucch-CSI-ResourceList                  SEQUENCE (SIZE
(1..maxNrofBWPs)) OF PUCCH-CSI-Resource
      },
      semiPersistentOnPUCCH                   SEQUENCE {
         reportSlotConfig                    CSI-ReportPeriodicityAndOffset,
         pucch-CSI-ResourceList                  SEQUENCE (SIZE
(1..maxNrofBWPs)) OF PUCCH-CSI-Resource
      },
      semiPersistentOnPUSCH                  SEQUENCE {
         reportSlotConfig                    ENUMERATED {sl5, sl10, sl20, sl40, sl80,
sl160, sl320},
         reportSlotOffsetList              SEQUENCE (SIZE (1.. maxNrofUL-
Allocations)) OF INTEGER(0..32),
         p0alpha                         P0-PUSCH-AlphaSetId
      },
      aperiodic                        SEQUENCE {
         reportSlotOffsetList              SEQUENCE (SIZE (1..maxNrofUL-
Allocations)) OF INTEGER(0..32)
      }
   },
   reportQuantity                    CHOICE {
      none                          NULL,
      cri-RI-PMI-CQI                      NULL,
      cri-RI-i1                      NULL,
      cri-RI-i1-CQI                    SEQUENCE {
         pdsch-BundleSizeForCSI                  ENUMERATED {n2, n4}
OPTIONAL    -- Need S
      },
      cri-RI-CQI                       NULL,
      cri-RSRP                         NULL,
      ssb-Index-RSRP                      NULL,
      cri-RI-LI-PMI-CQI                    NULL
   },
   reportFreqConfiguration               SEQUENCE {
      cqi-FormatIndicator                 ENUMERATED { widebandCQI,
subbandCQI }                  OPTIONAL,   -- Need R
      pmi-FormatIndicator                   ENUMERATED { widebandPMI,
subbandPMI }                  OPTIONAL,   -- Need R
      csi-ReportingBand                    CHOICE {
         subbands3                     BIT STRING(SIZE(3)),
         subbands4                     BIT STRING(SIZE(4)),
         subbands5                     BIT STRING(SIZE(5)),
         subbands6                     BIT STRING(SIZE(6)),
         subbands7                     BIT STRING(SIZE(7)),
         subbands8                     BIT STRING(SIZE(8)),
         subbands9                     BIT STRING(SIZE(9)),
         subbands10                     BIT STRING(SIZE(10)),
         subbands11                     BIT STRING(SIZE(11)),
         subbands12                     BIT STRING(SIZE(12)),
         subbands13                     BIT STRING(SIZE(13)),
         subbands14                     BIT STRING(SIZE(14)),
         subbands15                     BIT STRING(SIZE(15)),
         subbands16                     BIT STRING(SIZE(16)),
         subbands17                     BIT STRING(SIZE(17)),
         subbands18                     BIT STRING(SIZE(18)),
         ...,
         subbands19-v1530                   BIT STRING(SIZE(19))
      } OPTIONAL   -- Need S
   }                                         OPTIONAL,
-- Need R
   timeRestrictionForChannelMeasurements      ENUMERATED {configured,
notConfigured},
   timeRestrictionForInterferenceMeasurements   ENUMERATED {configured,
notConfigured},
   codebookConfig                        CodebookConfig
OPTIONAL,   -- Need R
   dummy                          ENUMERATED {n1, n2}
```

TABLE 8-continued

```
OPTIONAL,    -- Need R
      groupBasedBeamReporting                                    CHOICE {
         enabled                                         NULL,
         disabled                                        SEQUENCE {
            nrofReportedRS                                      ENUMERATED {n1, n2, n3, n4}
OPTIONAL     -- Need S
         }
      },
      cqi-Table                         ENUMERATED {table1, table2, table3, spare1}
OPTIONAL,    -- Need R
      subbandSize                         ENUMERATED {value1, value2},
      non-PMI-PortIndication    SEQUENCE (SIZE (1..maxNrofNZP-CSI-RS-
ResourcesPerConfig)) OF PortIndexFor8Ranks OPTIONAL,    -- Need R
      ...,
      [[
      semiPersistentOnPUSCH-v1530                          SEQUENCE {
         reportSlotConfig-v1530                         ENUMERATED {sl4, sl8, sl16}
      }                                                                OPTIONAL
-- Need R
      ]]
   }
```

According to an embodiment of the disclosure, signaling information CSI-ReportConfig included in Table 8 may include information on each report setting. The information included in the signaling information CSI-ReportConfig may have the following meanings, or may include the following information.

reportConfigID: a report setting index carrier: a serving cell index resourcesForChannelMeasurement: a resource setting index for channel measurement having correlation (or mapping relationship) with report setting csi-IM-ResourcesForInterference: a resource setting index having a CSI-IM resource for interference measurement having correlation with report setting nzp-CSI-RS-ResourcesForInterference: a resource setting index having a CSI-RS resource for interference measurement having correlation with report setting reportConfigType: it may indicate a time domain transmission configuration and transmission channel of a channel report and may have an aperiodic transmission, semi-persistent physical uplink control channel (PUCCH) transmission, semi-periodic PUSCH transmission, or periodic transmission configuration reportQuantity: it may indicate the type of channel information to be reported and may have the type of channel information ("cri-RI-PMI-CQI", "cri-RI-il", "cri-RI-il-CQI", "cri-RI-CQI", "cri-RSRP", "ssb-Index-RSRP", and "cri-RI-LI-PMI-CQI") when a channel report is not transmitted ("none") and when a channel report is transmitted. Herein, elements included in the type of channel information may mean a channel quality indicator (CQI), a precoding matric indicator (PMI), a CSI-RS resource indicator (CRI), an SS/PBCH block resource indicator (SSBRI), a layer indicator (LI), a rank indicator (RI), and/or layer 1 (L1)-reference signal received power (RSRP).

reportFreqConfiguration: it may indicate whether channel information to be reported includes only information on the entire band (wideband) or includes information on each subband, and may have configuration information for a subband, which includes the channel information, when the information on each subband is included.

timeRestrictionForChannelMeasurements: whether the time domain is restricted for a reference signal for channel measurement among reference signals referred to by channel information to be reported timeRestrictionForInterferenceMeasurements: whether the time domain is restricted for a reference signal for interference measurement among reference signals referred to by channel information to be reported codebookConfig: codebook information referred to by channel information to be reported groupBasedBeamReporting: whether to perform beam-grouping of a channel report cqi-Table: a CQI table index referred to by channel information to be reported subbandSize: an index indicating the subband size of channel information non-PMI-PortIndication: port mapping information referred to when non-PMI channel information is reported According to an embodiment of the disclosure, when the base station indicates channel information reporting through higher-layer signaling or L1 signaling, the UE may perform channel information reporting, based on the configuration information included in the indicated report setting.

According to an embodiment of the disclosure, the base station may indicate a channel state information (CSI) report to the UE through higher-layer signaling including radio resource control (RRC) signaling or medium access control (MAC) control element (CE) signaling, or L1 signaling (e.g., common DCI, group-common DCI, and UE-specific DCI).

For example, the base station may indicate an aperiodic channel information report (CSI report) to the UE through higher-layer signaling or DCI using DCI format 0_1. The base station may configure multiple CSI report trigger states including a parameter for a CSI report or a parameter for an aperiodic CSI report of the UE, through higher-layer signaling. For example, the parameter for the CSI report or a CSI report trigger state may include a set including a slot interval or a possible slot interval between a PDCCH including DCI and a PUSCH including a CSI report, a reference signal ID for channel state measurement, and/or the type of channel information.

As an example, when the base station indicates some of the multiple CSI report trigger states to the UE through the DCI, the UE reports channel information according to a CSI report configuration of report setting configured in the indicated CSI report trigger state. For example, channel information reporting of the UE may be performed through a PUSCH scheduled in DCI format 0_1. For example, time domain resource allocation of the PUSCH including the CSI report of the UE may be performed based on a slot interval with a PDCCH indicated through the DCI, an indication of a start symbol and/or a symbol length within a slot for the time domain resource allocation of the PUSCH, and the like. For example, the position of a slot in which the PUSCH including the CSI report of the UE is transmitted may be indicated through the slot interval with the PDCCH indicated through the DCI, and the start symbol and the symbol length within the slot may be indicated through a time domain resource assignment field of the above-described DCI.

For example, the base station may indicate, to the UE, a semi-persistent CSI report transmitted on a PUSCH, through DCI using DCI format 0_1. The base station may activate or deactivate the semi-persistent CSI report transmitted on the PUSCH through DCI scrambled by an SP-CSI-RNTI. When the semi-persistent CSI report is activated, the UE may periodically report channel information according to a configured slot interval. When the semi-persistent CSI report is deactivated, the UE may stop the activated periodic channel information reporting. The base station may configure a parameter for a semi-persistent CSI report of the UE or multiple CSI report trigger states including the parameter for the semi-persistent CSI report through higher-layer signaling.

According to an embodiment of the disclosure, the parameter for the CSI report or a CSI report trigger state may include a set including a slot interval or a possible slot interval between a PDCCH including DCI indicating a CSI report and a PUSCH including a CSI report, a slot interval between a slot in which higher-layer signaling indicating a CSI report is activated and a PUSCH including a CSI report, a slot interval period of a CSI report, and/or the type of included channel information. When the base station activates some of the multiple CSI report trigger states or some of multiple report settings to the UE through higher-layer signaling or DCI, the UE may report channel information according to report setting included in the indicated CSI report trigger state or a CSI report configuration configured in the activated report setting. The channel information reporting may be performed through a PUSCH semi-persistently scheduled in DCI format 0_1 scrambled by an SP-CSI-RNTI. Time domain resource allocation of the PUSCH including the CSI report of the UE may be performed through a slot interval period of the CSI report, a slot interval with a slot in which higher-layer signaling is activated or a slot interval with a PDCCH indicated through DCI, and/or an indication of a start symbol and a symbol length within a slot for the time domain resource allocation of the PUSCH. For example, the position of a slot in which the PUSCH including the CSI report of the UE is transmitted may be indicated through the slot interval with the PDCCH indicated through the DCI, and the start symbol and the symbol length within the slot may be indicated through a time domain resource assignment field of the above-described DCI format 0_1.

For example, the base station may indicate, to the UE, a semi-persistent CSI report transmitted on a PUCCH, through higher-layer signaling, such as MAC-CE. Through MAC-CE signaling, the base station may activate or deactivate the semi-persistent CSI report transmitted on the PUCCH.

In an example, when the semi-persistent CSI report is activated, the UE may periodically report channel information according to a configured slot interval. When the semi-persistent CSI report is deactivated, the UE may stop the activated periodic channel information reporting. The base station may configure a parameter for a semi-persistent CSI report of the UE through higher-layer signaling. The parameter for the CSI report may include a PUCCH resource in which the CSI report is transmitted, a slot interval period of the CSI report, and/or the type of channel information. The UE may transmit the CSI report through the PUCCH. Alternatively, when the PUCCH for the CSI report overlaps a PUSCH, the UE may transmit the CSI report through the PUSCH.

For example, the position of a slot in which the PUCCH including the CSI report is transmitted may be indicated through a slot interval period of the CSI report configured through higher-layer signaling and/or a slot interval between a slot in which higher-layer signaling is activated and the PUCCH including the CSI report. A start symbol and a symbol length within the slot may be indicated through a start symbol and a symbol length for allocation of a PUCCH resource configured through higher-layer signaling.

For example, the base station may indicate a periodic CSI report to the UE through higher-layer signaling. The base station may activate or deactivate the periodic CSI report through higher-layer signaling including RRC signaling. When the periodic CSI report is activated, the UE may periodically report channel information according to a configured slot interval. When the periodic CSI report is deactivated, the UE may stop the activated periodic channel information reporting. The base station may configure report setting including a parameter for a periodic CSI report of the UE through higher-layer signaling.

For example, the parameter for the CSI report may include a PUCCH resource configuration for a CSI report, a slot interval between a slot in which higher-layer signaling indicating a CSI report is activated and a PUCCH including a CSI report, a slot interval period of a CSI report, a reference signal ID for channel state measurement, and/or the type of channel information.

According to an embodiment of the disclosure, the UE may transmit the CSI report through the PUCCH. Alternatively, when the PUCCH for the CSI report overlaps a PUSCH, the UE may transmit the CSI report through the PUSCH. For example, the position of a slot in which the PUCCH including the CSI report is transmitted may be indicated through a slot interval period of the CSI report configured through higher-layer signaling and a slot interval between a slot in which higher-layer signaling is activated and the PUCCH including the CSI report. A start symbol and a symbol length within the slot may be indicated through a start symbol and a symbol length for allocation of a PUCCH resource configured through higher-layer signaling.

According to an embodiment of the disclosure, regarding CSI report setting (CSI-ReportConfig), each CSI report setting CSI-ReportConfig may be associated with one downlink (DL) bandwidth part identified by a higher layer parameter bandwidth part identifier (bwp-id) provided via CSI resource setting associated with the report setting and/or CSI-ResourceConfig.

According to an embodiment of the disclosure, aperiodic, semi-persistent, and periodic manners may be supported for a time domain reporting operation regarding each report setting CSI-ReportConfig, and a reporting manner (e.g., aperiodic, semi-persistent, or periodic) may be configured by the base station for the UE through a parameter, reportConfigType, configured from a higher layer.

For example, a semi-persistent CSI reporting method may support or include "semi-PersistentOnPUCCH" and "semi-PersistentOnPUSCH". For example, in the case of a periodic or semi-persistent CSI reporting method, the UE may receive a configuration of a PUCCH or PUSCH resource for transmitting CSI from the base station through higher-layer signaling. A period and a slot offset of the PUCCH or PUSCH resource for transmitting the CSI may be given as a numerology of an uplink (UL) bandwidth part in which a CSI report is configured to be transmitted. For example, in the case of an aperiodic CSI reporting method, the UE may receive, from the base station, scheduling of the PUSCH resource for transmitting the CSI through L1 signaling (DCI format 0_1 described above).

According to an embodiment of the disclosure, regarding CSI resource setting (CSI-ResourceConfig), each CSI resource setting CSI-ReportConfig may include S (≥1) number of CSI resource sets (given by a higher layer parameter, csi-RS-ResourceSetList). For example, a CSI resource set list may include a non-zero power (NZP) CSI-RS resource set and an SS/PBCH block set or may include a CSI-interference measurement (CSI-IM) resource set.

According to an embodiment of the disclosure, each CSI resource setting may be located in a downlink (DL) bandwidth part identified by a higher layer parameter, bwp-id, and the CSI resource settings may be associated with (or, mapped to or correspond to) CSI report setting of the same downlink bandwidth part.

According to an embodiment of the disclosure, a time domain operation of a CSI-RS resource in CSI resource setting may be configured as one of "aperiodic", "periodic", or "semi-persistent" from a higher layer parameter, resourceType. For periodic or semi-persistent CSI resource setting, the number of CSI-RS resource sets may be limited to S=1, and a configured period and slot offset may be given by a numerology of the downlink bandwidth part identified by bwp-id. The UE may receive a configuration of one or more CSI resource settings for channel or interference measurement from the base station through higher-layer signaling. For example, the CSI resource setting configured for the UE may include at least one of the following CSI resources.

CSI-IM resource for interference measurement

NZP CSI-RS resource for interference measurement

NZP CSI-RS resource for channel measurement

According to an embodiment of the disclosure, for CSI-RS resource sets associated with resource setting in which a higher layer parameter, resourceType, is configured as "aperiodic", "periodic", or "semi-persistent", a trigger state for CSI report setting in which reportType is configured as "aperiodic" and resource setting for channel or interference measurement on one or more component cells (CCs) may be configured by a higher layer parameter, CSI-AperiodicTriggerStateList.

According to an embodiment of the disclosure, the UE may use a PUSCH when performing aperiodic CSI reporting, the UE may use a PUCCH when performing periodic CSI reporting, the UE may use a PUSCH when triggered or activated by DCI when performing semi-persistent CSI reporting, and the UE may use a PUCCH after being activated by an MAC control element (MAC CE) when performing semi-persistent CSI reporting. As described above, CSI resource setting may also be configured as "aperiodic", "periodic", or "semi-persistent". A combination of CSI report setting and a CSI resource configuration may be supported based on Table 9 below.

TABLE 9

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

According to an embodiment of the disclosure, aperiodic CSI reporting may be triggered by a "CSI request" field of the above-described DCI format 0_1 corresponding to scheduling DCI for a PUSCH. The UE may monitor a PDCCH, obtain DCI format 0_1, and obtain scheduling information for the PUSCH and a CSI request indicator. The CSI request indicator may be configured in NTS (−0, 1, 2, 3, 4, 5, or 6) bits, and may be determined by higher-layer signaling (reportTriggerSize). One trigger state among one or more aperiodic CSI report trigger states which may be configured through higher-layer signaling (CSI-AperiodicTriggerStateList) may be triggered by the CSI request indicator.

When all bits of the CSI request field are 0, this may mean that CSI reporting is not requested.

When the number (M) of CSI trigger states in configured CSI-AperiodicTriggerStateList is greater than 2NTs−1, M number of CSI trigger states may be mapped to 2NTs−1 according to a pre-defined mapping relationship, and one trigger state among the 2NTs−1 trigger states may be indicated by the CSI request field.

When the number (M) of CSI trigger states in configured CSI-AperiodicTriggerStateList is equal to or less than 2NTs−1, one of M number of CSI trigger states may be indicated by the CSI request field.

According to an embodiment of the disclosure, Table 10 shows an example of a relationship between a CSI request indicator and a CSI trigger state indicatable by the corresponding indicator.

TABLE 10

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1<br>CSI report#2 | CSI resource#1,<br>CSI resource#2 |

TABLE 10-continued

| CSI request field | CSI trigger state | CSI-ReportConfigId | CSI-ResourceConfigId |
|---|---|---|---|
| 10 | CSI trigger state#2 | CSI report#3 | CSI resource#3 |
| 11 | CSI trigger state#3 | CSI report#4 | CSI resource#4 |

According to an embodiment of the disclosure, the UE may perform measurement on a CSI resource in a CSI trigger state triggered by a CSI request field, and may generate CSI (including at least one of CQI, PMI, CRI, SSBRI, LI, RI, or L1-RSRP) therefrom.

According to an embodiment of the disclosure, the UE may transmit the obtained CSI by using a PUSCH scheduled by corresponding DCI format 0_1. When 1 bit corresponding to an uplink data indicator (UL-SCH indicator) in DCI format 0_1 indicates "1", the UE may multiplex uplink data (UL-SCH) and the obtained CSI and transmit the same to a PUSCH resource scheduled by DCI format 0_1. When 1 bit corresponding to the uplink data indicator (UL-SCH indicator) in DCI format 0_1 indicates "0", the UE may map only the CSI to the PUSCH resource scheduled by DCI format 0_1, without the uplink data (UL-SCH), and transmit the CSI.

Figure 7:
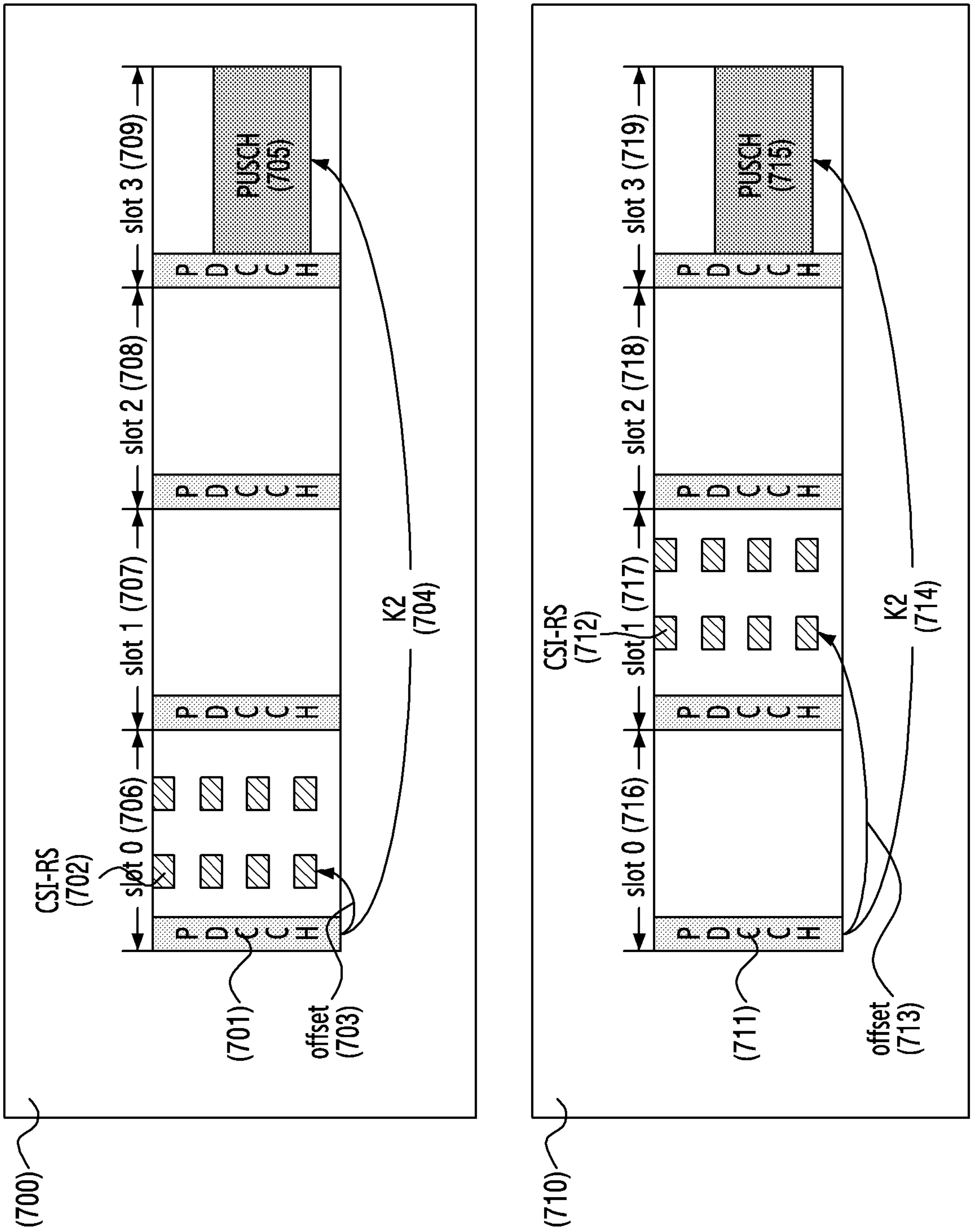
FIG. 7 illustrates an aperiodic channel state information (CSI) reporting method according to an embodiment of the disclosure.

FIG. 7 illustrates an aperiodic CSI reporting method according to an embodiment of the disclosure.

Referring to FIG. 7, in an example 700 of FIG. 7, a UE may obtain DCI format 0_1 by monitoring a PDCCH 701, and may obtain scheduling information and CSI request information for a PUSCH 705, based on the obtained DCI.

According to an embodiment of the disclosure, the UE may obtain resource information for a CSI-RS 702 to be measured from a received CSI request indicator. The UE may determine a time point at which the UE should measure a resource of the transmitted CSI-RS 702, based on a time point at which DCI format 0_1 is received and a parameter (e.g., aperiodicTriggeringOffset) for an offset within a CSI resource set configuration (e.g., an NZP CSI-RS resource set configuration (NZP-CSI-RS-ResourceSet)). For example, the UE may determine a CSI-RS resource measurement time based on the time point at which DCI format 0_1 is received and the CSI resource set configuration.

For example, the UE may receive, from a base station, through higher-layer signaling, a configuration of an offset value X of the parameter aperiodicTriggeringOffset in an NZP-CSI-RS resource set configuration. For example, the configured offset value X may refer to an offset between a slot where a CSI-RS resource is transmitted and a slot where DCI triggering aperiodic CSI reporting is received. For example, a value of the parameter aperiodicTriggeringOffset and the offset value X may have a mapping relationship shown in Table 11 below.

TABLE 11

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

According to an embodiment of the disclosure, the example 700 of FIG. 7 shows an example in which the above-described offset value is configured as 0 (X=0). In this case, the UE may receive the CSI-RS 702 in a slot (e.g., slot 0 706 of FIG. 7) in which DCI format 0_1 triggering aperiodic CSI reporting is received, and may report, to the base station, CSI information measured by the received CSI-RS through the PUSCH 705.

According to an embodiment of the disclosure, the UE may obtain, from DCI format 0_1, scheduling information (e.g., information corresponding to each field of DCI format 0_1) for the PUSCH 705 for CSI reporting. For example, the UE may obtain information on a slot in which the PUSCH 705 is to be transmitted, from the above-described time domain resource allocation information for the PUSCH 705 in DCI format 0_1. For example, in the example 700 of FIG. 7, the UE may obtain 3 as a K2 value 704 and 714 corresponding to a slot offset value for PDCCH-to-PUSCH, and the PUSCH 705 may be transmitted in slot 3 709 and 719 which is spaced 3 slots apart from slot 0 706 (between slot 1 707 and slot 2 708) corresponding to a time point when the PDCCH 701 has been received.

In an example 710 of FIG. 7, the UE may obtain DCI format 0_1 by monitoring a PDCCH 711, and may obtain scheduling information and CSI request information for a PUSCH 715 from the obtained DCI (or DCI format 0_1). The UE may obtain resource information for a CSI-RS 712 to be measured from a received CSI request indicator. The example 710 of FIG. 7 shows an example in which the above-described offset value 713 for the CSI-RS is configured as 1 (X=1). In this case, the UE may receive the CSI-RS 712 in a slot (e.g., slot 0 716 (between slot 1 717 and slot 2 718) of FIG. 7) in which DCI format 0_1 triggering aperiodic CSI reporting is received, and may report, to the base station, CSI information measured by the received CSI-RS through the PUSCH 715.

According to an embodiment of the disclosure, aperiodic CSI reporting may include at least one or both of CSI part 1 and CSI part 2, and when the aperiodic CSI report is transmitted through a PUSCH, the aperiodic CSI report may be multiplexed with a transport block. In the aperiodic CSI reporting, after a CRC is inserted into input bits of aperiodic CSI for multiplexing with the transport block, the CRC may be encoded and rate matched, and then mapped to a resource element in the PUSCH in a specific pattern and transmitted. The CRC insertion may be omitted according to a coding method or the length of the input bits. The number of modulation symbols calculated for rate matching when multiplexing CSI Part 1 or CSI part 2 included in the aperiodic CSI reporting may be calculated as shown in Table 12 below.

TABLE 12

For CSI part 1 transmission on PUSCH not using repetition type B with UL-SCH, the number of coded modulation symbols per layer for CSI part 1 transmission, denoted as $Q'_{CSI\text{-}part1}$, is determined as follows:

TABLE 12-continued $$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} \right\}$$

. . .

For CSI part 1 transmission on an actual repetition of a PUSCH with repetition Type B with UL-SCH, the number of coded modulation symbols per layer for CSI part 1 transmission, denoted as $Q'_{CSI\text{-}part1}$, is determined as follows:

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nominal}^{UCI}(l) \right\rceil - Q'_{ACK/CG-UCI}, \sum_{l=0}^{N_{symb,actual}^{PUSCH}-1} M_{sc,actual}^{UCI}(l) - Q'_{ACK/CG-UCI} \right\}$$

. . .

For CSI part 1 transmission on PUSCH without UL-SCH, the number of coded modulation symbols per layer for CSI part 1 transmission, denoted as $Q'_{CSI\text{-}part1}$, is determined as follows:

if there is CSI part 2 to be transmitted on the PUSCH, $$Q'_{CSI-1} = \min\left\{\left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{sc}^{CSI}(l) - Q'_{ACK} \right\}$$

else $$Q'_{CSI-1} = \sum_{l=0}^{N_{symb,all}^{PUSCH}-1} M_{sc}^{UCI}(l) - Q'_{ACK}$$

end if

. . .

For CSI part 2 transmission on PUSCH not using repetition type B with UL-SCH, the number of coded modulation symbols per layer for CSI part 2 transmission, denoted as $Q'_{CSI\text{-}part1}$, is determined as follows:

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \right\}$$

For CSI part 2 transmission on an actual repetition of a PUSCH with repetition Type B with UL-SCH, the number of coded modulation symbols per layer for CSI part 2 transmission, denoted as $Q'_{CSI\text{-}part1}$, is determined as follows:

$$Q'_{CSI-1} = \min\left\{\left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \right.$$

TABLE 12-continued $$\left[\alpha\cdot\sum_{l=0}^{N_{symb,nominal}^{PUSCH}-1} M_{sc,nominal}^{UCI}(l)\right] - Q'_{ACK/CG-UCI} - Q'_{CSI-1}, \sum_{l=0}^{N_{symb,actual}^{PUSCH}-1} M_{sc,actual}^{UCI}(l) - Q'_{ACK/CG-UCI} - Q'_{CSI-1}\Bigg\}$$

. . .

For CSI part 2 transmission on PUSCH without UL-SCH, the number of coded modulation symbols per layer for CSI part 1 transmission, denoted as $Q'_{CSI\text{-}part1}$, is determined as follows:

$$Q'_{CSI-2} = \sum_{l=0}^{N_{symb,all}^{PUSCH}-1} M_{sc}^{UCI}(l) - Q'_{ACK} - Q'_{CSI-1}$$

According to an embodiment of the disclosure, in the case of PUSCH repetition transmission types A and B, the UE may multiplex and transmit aperiodic CSI reporting only on a first repetition transmission among PUSCH repetition transmissions. This is because aperiodic CSI reporting information that is multiplexed is encoded in a polar code scheme, and in this case, in order for the aperiodic CSI reporting information to be multiplexed across multiple PUSCH repetitions, each PUSCH repetition is required to have the same frequency and time resource allocation. More particularly, in the case of PUSCH repetition type B, since each actual repetition may have a different OFDM symbol length, the aperiodic CSI reporting may be multiplexed and transmitted only on a first PUSCH repetition.

According to an embodiment of the disclosure, in PUSCH repetition transmission type B, when the UE receives DCI that schedules aperiodic CSI reporting or activates semi-persistent CSI reporting without scheduling of a transport block, even when the number of PUSCH repetition transmissions configured through higher-layer signaling is greater than 1, a value of nominal repetition may be assumed to be 1. In addition, when the UE schedules or activates aperiodic or semi-persistent CSI reporting without scheduling of a transport block based on PUSCH repetition transmission type B, the UE may expect that a first nominal repetition is the same as a first actual repetition. For a PUSCH transmitted with semi-persistent CSI based on PUSCH repetition transmission type B without scheduling of DCI after semi-persistent CSI reporting is activated by the DCI, if the first nominal repetition is different from the first actual repetition, transmission for the first nominal repetition may be ignored.

According to an embodiment of the disclosure, when the base station indicates an aperiodic CSI report or a semi-persistent CSI report to the UE through DCI, the UE may determine or identify whether valid channel reporting may be performed through the indicated CSI report, by considering a channel computation time (CSI computation time) required for the CSI report.

According to an embodiment of the disclosure, for the aperiodic CSI report or the semi-persistent CSI report indicated through the DCI, the UE may perform valid CSI reporting from an uplink symbol after a Z symbol following the end of the last symbol included in a PDCCH including the DCI indicating the CSI report.

For example, the Z symbol may be determined based on a numerology of a downlink bandwidth part corresponding to the PDCCH including the DCI indicating the CSI report, a numerology of an uplink bandwidth part corresponding to a PUSCH in which the CSI report is transmitted, or the type and/or characteristics (report quantity, frequency band granularity, the number of ports of reference signals, a codebook type, and the like) of channel information reported in the CSI report. For example, in order to determine a certain CSI report as a valid CSI report (or to determine a CSI report as a valid CSI report), uplink transmission of the CSI report should not be performed prior to a Zref symbol, including a timing advance. In this case, the Zref symbol may be an uplink symbol in which a cyclic prefix (CP) starts after a time $T_{proc,CSI}=(Z)(2048+144)\cdot\kappa 2^{-\mu}\cdot T_C$ from the end of the last symbol of a triggering PDCCH.

According to an embodiment of the disclosure, a detailed value of Z may follow the description below, and $T_c=1/(\Delta f_{max}\cdot N_f)$, $\Delta f_{max}=480\cdot 10^3$ Hz, $N_f=4096$, $\kappa=64$, and $\mu$ are numerologies. In this case, u may be agreed to use one which causes the greatest $T_{proc,CSI}$ value among ($\mu_{PDCCH}$, $\mu_{CSI\text{-}RS}$, $\mu_{UL}$). $\mu_{PDCCH}$ may be referred to as a subcarrier spacing used for PDCCH transmission, $\mu_{CSI\text{-}RS}$ may be referred to as a subcarrier spacing used for CSI-RS transmission, and $\mu_{UL}$ may be referred to as a subcarrier spacing of an uplink channel used for uplink control information (UCI) transmission for CSI reporting. For example, $\mu$ may be one which causes the greatest $T_{proc,CSI}$ value among ($\mu_{PDCCH}$, $\mu_{UL}$). The definitions of $\mu_{PDCCH}$ and $\mu_{UL}$ refer to the above description. For convenience of the following description, satisfying the above condition may be referred to as satisfying CSI reporting validity condition 1.

According to an embodiment of the disclosure, when a reference signal for channel measurement for an aperiodic CSI report indicated to the UE through DCI is an aperiodic reference signal, the UE may perform valid CSI reporting from an uplink symbol after a Z' symbol following the end of the last symbol including the reference signal.

For example, the above-described Z' symbol may be determined based on a numerology of a downlink bandwidth part corresponding to a PDCCH including the DCI indicating the CSI report, a numerology of a bandwidth corresponding to the reference signal for channel measurement for the CSI report, a numerology of an uplink bandwidth part corresponding to a PUSCH in which the CSI report is transmitted, or the type and/or characteristics (e.g., report quantity, frequency band granularity, the number of ports of reference signals, a codebook type, and the like) of channel information reported in the CSI report. For example, in order to determine a certain CSI report as a valid CSI report (to determine a CSI report as a valid CSI report), uplink transmission of the corresponding CSI report should not be performed prior to a Zref symbol, including a timing advance.

For example, the Zref symbol may be an uplink symbol in which a cyclic prefix (CP) starts after a time $T_{proc,CSI}=(Z')(2048+144)\cdot\kappa 2^{-\mu}\cdot T_C$ from the end of the last symbol of an aperiodic CSI-RS or an aperiodic CSI-IM triggered by a triggering PDCCH. A detailed value of Z' may follow the description below, and $T_c=1/(\Delta f_{max}\cdot N_f)$, $\Delta f_{max}=480\cdot 10^3$ Hz, $N_f=4096$, $\kappa=64$, and, μ are numerologies.

In this case, μ may be agreed to use one which causes the greatest $T_{proc,CSI}$ value among ($\mu_{PDCCH}$, $\mu_{CSI\text{-}RS}$, $\mu_{UL}$). $\mu_{PDCCH}$ may be referred to as a subcarrier spacing used for triggering PDCCH transmission, $\mu_{CSI\text{-}RS}$ may be referred to as a subcarrier spacing used for CSI-RS transmission, and $\mu_{UL}$ may be referred to as a subcarrier spacing of an uplink channel used for uplink control information (UCI) transmission for CSI reporting. For example, μ may be agreed to use one which causes the greatest $T_{proc,CSI}$ value among ($\mu_{PDCCH}$, $\mu_{UL}$). In this case, the definitions of $\mu_{PDCCH}$ and $\mu_{UL}$ refer to the above description. For convenience of the following description, satisfying the above condition may be referred to as satisfying CSI reporting validity condition 2.

According to an embodiment of the disclosure, when the base station indicates an aperiodic CSI report for an aperiodic reference signal to the UE through DCI, the UE may perform valid CSI reporting from a first uplink symbol which satisfies both a time point after a Z symbol following the end of the last symbol included in a PDCCH including the DCI indicating the CSI report and a time point after a Z' symbol following the end of the last symbol including the reference signal. For example, in the case of aperiodic CSI reporting based on the aperiodic reference signal, the CSI report is determined as a valid CSI report when both CSI reporting validity conditions 1 and 2 are satisfied.

According to an embodiment of the disclosure, when a CSI reporting time point indicated by the base station does not satisfy a CSI computation time requirement, the UE may determine that a corresponding CSI report is not valid and may not consider updating of a channel information state for the CSI report.

According to an embodiment of the disclosure, the Z and Z' symbols for calculation of a CSI computation time may be based on Table 13 and Table 14 below. For example, when channel information reported in the CSI report includes only wideband information, the number of ports of a reference signal is 4 or less, the number of reference signal resources is 1, and a codebook type is “type1-SinglePanel” or the type (report quantity) of channel information to be reported is “cri-RI-CQI”, the Z and Z' symbols follow value $Z_1$, $Z_1$ of Table 14. This will be referred to as delay requirement 2.

In addition, when a PUSCH including the CSI report does not include a TB or a HACK-ACK and a CPU occupation of the UE is 0, the Z and Z' symbols follow value $Z_1$, $Z_1$ of Table 13, which is referred to as delay requirement 1. The CPU occupation is described below. In addition, when the report quantity is “cri-RSRP” or “ssb-Index-RSRP”, the Z and Z' symbols follow value $Z_3$, $Z_3$ of Table 14. X1, X2, X3, and X4 of Table 14 denote UE capability for a beam reporting time, and KB1 and KB2 of Table 14 denote UE capability for a beam changing time. In a case which does not correspond to the type or characteristics of the channel information reported in the CSI report, the Z and Z' symbols follow value $Z_2$, $Z_2$ in Table 14.

TABLE 13

| | $Z_1$ [symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

TABLE 14

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 + KB_1$) | $X_3$ |
| 3 | 97 | 85 | 152 | 140 | min(97, $X_4 + KB_2$) | $X_4$ |

[CSI Reference Resource]

According to an embodiment of the disclosure, when the base station indicates an aperiodic/semi-persistent/periodic CSI report to the UE, the base station may configure a CSI reference resource to determine a reference time and frequency for a channel to be reported in the CSI report.

For example, a frequency of the CSI reference resource may be carrier and subband information for measuring CSI, indicated in a CSI report configuration, and the carrier and subband information may correspond to a carrier and reportFreqConfiguration in CSI-ReportConfig which is higher-layer signaling, respectively.

According to an embodiment of the disclosure, a time of the CSI reference resource may be defined based on a time at which the CSI report is transmitted. For example, when CSI report #X is indicated to be transmitted in uplink slot n' of a BWP and a carrier for transmitting a CSI report, a time of a CSI reference resource of CSI report #X may be defined as downlink slot n-nCSI-ref of a BWP and a carrier for measuring CSI. Downlink slot n is calculated as $n=\lfloor n'\cdot 2^{\mu_{DL}}/2^{\mu_{UL}}\rfloor$, when a numerology of the BWP and carrier for measuring the CSI is referred to as μDL and a numerology of the BWP and carrier for transmitting CSI report #X is referred to as μUL.

According to an embodiment of the disclosure, when CSI report #X transmitted in uplink slot n' is a semi-persistent or periodic CSI report, nCSI-ref which is a slot interval between downlink slot n and a CSI reference signal may be determined based on the number of CSI-RS/SSB resources for channel measurement. For example, nCSI-ref which is a slot interval between downlink slot n and a CSI reference signal may follow $n_{CSI\text{-}ref}=4\cdot 2^{\mu_{DL}}$ when a single CSI-RS/SSB resource is associated with (or, mapped to or corresponds to) the CSI report, and follow $n_{CSI\text{-}ref}=5\cdot 2^{\mu_{DL}}$ when multiple CSI-RS/SSB resources are associated with the CSI report. When CSI report #X transmitted in uplink slot n' is an aperiodic CSI report, $n_{CSI\text{-}ref}$ may be calculated as $$n_{CSI\text{-}ref}=\lfloor Z/N_{symb}^{slot}\rfloor$$

by considering CSI computation time Z' for channel measurement.

$$N_{symb}^{slot}$$

described above may be the number of symbols included in one slot, and $$N_{symb}^{slot}=14$$

is assumed in NR.

According to an embodiment of the disclosure, when the base station indicates the UE to transmit a certain CSI report in uplink slot n' through higher-layer signaling or DCI, the UE may report CSI by performing channel measurement or interference measurement with respect to a CSI-RS resource, a CSI-IM resource, and an SSB resource transmitted not later than a CSI reference resource slot of the CSI report transmitted in uplink slot n' from among a CSI-RS resource, a CSI-IM resource, and an SSB resource associated with (or, mapped to or corresponding to) the CSI report.

For example, the CSI-RS resource, the CSI-IM resource, or the SSB resource associated with (or, mapped to or corresponding to) the CSI report may be a CSI-RS resource, a CSI-IM resource, or an SSB resource included in a resource set configured in resource setting referred to by report setting for the CSI report of the UE configured through higher-layer signaling. The CSI-RS resource, the CSI-IM resource, or the SSB resource associated with the CSI report may be a CSI-RS resource, a CSI-IM resource, or an SSB resource referred to by a CSI report trigger state including a parameter for the CSI report. The CSI-RS resource, the CSI-IM resource, or the SSB resource associated with the CSI report may be a CSI-RS resource, a CSI-IM resource, or an SSB resource indicated by an ID of a reference signal (RS) set.

According to an embodiment of the disclosure, CSI-RS/CSI-IM/SSB occasions may be referred to as transmission time points of CSI-RS/CSI-IM/SSB resource(s) determined by a higher layer configuration or a combination of the higher layer configuration and DCI triggering. For example, a slot in which a semi-persistent or periodic CSI-RS resource is transmitted may be determined according to a slot period and a slot offset configured through higher-layer signaling, and transmission symbol(s) in the slot may be determined according to resource mapping information (resourceMapping). For another example, a slot in which an aperiodic CSI-RS resource is transmitted may be determined according to a slot offset with a PDCCH including DCI indicating a channel report configured through higher-layer signaling, and transmission symbol(s) in the slot may be determined according to resource mapping information (resourceMapping).

According to an embodiment of the disclosure, the CSI-RS occasion may be determined by independently considering a transmission time point of each CSI-RS resource or by collectively considering transmission time points of one or more CSI-RS resource(s) included in a resource set, and accordingly, the following two interpretations may be possible for the CSI-RS occasion according to each resource set configuration.

Interpretation 1-1: from a start time point of the earliest symbol to an end time point of the latest symbol in which one specific resource among one or more CSI-RS resources included in resource set(s) configured in resource setting referred to by report setting configured for a CSI report is transmitted Interpretation 1-2: from a start time point of the earliest symbol in which a CSI-RS resource transmitted at the earliest time point is transmitted to an end time point of the latest symbol in which a CSI-RS resource transmitted at the latest time point is transmitted among all CSI-RS resources included in resource set(s) configured in resource setting referred to by report setting configured for a CSI report Hereinafter, in embodiments of the disclosure, the individual application is possible based on both the two interpretations for the CSI-RS occasion. Further, both the two interpretations for the CSI-IM occasion and the SSB occasion can be considered as in the CSI-RS occasion, but the principle thereof is similar to the above description, and thus an overlapping description is omitted hereinafter.

According to an embodiment of the disclosure, "the CSI-RS/CSI-IM/SSB occasions for CSI report #X transmitted in uplink slot n'" may be referred to as a set of CSI-RS occasions, CSI-IM occasions, and SSB occasions which are not later than a CSI reference resource of CSI report #X transmitted in uplink slot n' among CSI-RS occasions, CSI-IM occasions, and SSB occasions of a CSI-RS resource, a CSI-IM resource, and an SSB resource included in a resource set configured in resource setting referred to by report setting configured for CSI report #X.

According to an embodiment of the disclosure, "the latest CSI-RS/CSI-IM/SSB occasions among the CSI-RS/CSI-IM/SSB occasions for CSI report #X transmitted in uplink slot n'" may have two interpretations below.

Interpretation 2-1: a set of occasions including the latest CSI-RS occasion among CSI-RS occasions for CSI report #X transmitted in uplink slot n', the latest CSI-IM occasion among CSI-IM occasions for CSI report #X transmitted in uplink slot n', and the latest SSB occasion among SSB occasions for CSI report #0 transmitted in uplink slot n'

Interpretation 2-2: the latest occasion among all of CSI-RS occasions, CSI-IM occasions, and SSB occasions for CSI report #X transmitted in uplink slot n'

According to an embodiment of the disclosure, the individual application is possible based on both the two interpretations for "the latest CSI-RS/CSI-IM/SSB occasions among the CSI-RS/CSI-IM/SSB occasions for CSI report #X transmitted in uplink slot n'". In addition, when the above-described two interpretations (interpretation 1-1 and interpretation 1-2) are considered for the CSI-RS occasion, the CSI-IM occasion, and the SSB occasion, "the latest CSI-RS/CSI-IM/SSB occasions among the CSI-RS/CSI-IM/SSB occasions for CSI report #X transmitted in uplink slot n'" may have four different interpretations (the application of interpretation 1-1 and interpretation 2-1, the application of interpretation 1-1 and interpretation 2-2, and the application of interpretation 1-2 and interpretation 2-1, and the application of interpretation 1-2 and interpretation 2-2) in embodiments of the disclosure, each of the interpretations being applied individually.

According to an embodiment of the disclosure, the base station may indicate a CSI report based on the amount of channel information that may be simultaneously computed by the UE for a CSI report. For example, the base station may indicate a CSI report based on the number of channel information computation units (CSI processing units, CPUs) of the UE. When the number of channel information computation units that may be simultaneously computed by the UE is $N_{CPU}$, the UE may not expect a CSI report indication of the base station, which requires channel information computations more than $N_{CPU}$, or may not consider updating of channel information which requires channel information computations more than $N_{CPU}$. $N_{CPU}$ may be reported by the UE to the base station through higher-layer signaling or may be configured by the base station through higher-layer signaling.

According to an embodiment of the disclosure, it may be assumed that the CSI report indicated to the UE by the base station occupies some or all of CPUs for channel information computation among the total number $N_{CPU}$ of pieces of channel information that may be simultaneously computed by the UE. When the number of channel information computation units required for each CSI report, for example, CSI report n (n=0, 1, . . . , N−1) is $$O_{CPU}^{(n)},$$

the number of channel information computation units required for a total of N CSI reports may be referred to as $$\sum_{n=0}^{N-1} O_{CPU}^{(n)}.$$

The channel information computation unit required for each reportQuantity configured in the CSI report may be configured as shown in Table 15 below.

TABLE 15

| | |
|---|---|
| $O_{CPU}^{(n)} = 0$: | case where reportQuantity configured in CSI report is configured as "none", and trs-Info is configured in CSI-RS resource set connected to CSI report |
| $O_{CPU}^{(n)} = 1$: | case where reportQuantity configured in CSI report is configured as "none", "cri-RSRP", or "ssb-Index-RSRP", and trs-Info is not configured in CSI-RS resource set connected to CSI report<br>case where reportQuantity configured in CSI report is configured as "cri-RI-PMI-CQI", "cri-RI-il", "cri-RI-il-CQI", "cri-RI-CQI", or "cri-RI-LI-PMI-CQI" |
| $O_{CPU}^{(n)} = N_{CPU}$: | case where aperiodic CSI report is triggered and corresponding CSI report is not multiplexed with one or all of TB/HARQ-ACK. Case where corresponding CSI report is wideband CSI, corresponds to up to 4 CSI-RS ports, and corresponds to a single resource with no CRI report, and codebookType corresponds to "typeI-SinglePanel" or reportQuantity corresponds to "cri-RI-CQI" (this case is a case corresponding to the above-described delay requirement 1 and may be regarded as a case where a UE rapidly computes and reports CSI by using all available CPUs) |
| $O_{CPU}^{(n)} = K_s$: | all other cases except the above cases: $K_S$ indicates the number of CSI-RS resources in CSI-RS resource set for channel measurement |

According to an embodiment of the disclosure, when the number of channel information computations required by the UE for multiple CSI reports at a specific time point is greater than the number $N_{CPU}$ of channel information computation units that may be simultaneously computed by the UE, the UE may not consider or perform updating of channel information for some CSI reports. Among the indicated multiple CSI reports, a CSI report for which updating of channel information is not considered or performed may be determined by at least considering a time for which channel information computation required for the CSI report occupies CPUs and/or a priority of channel information to be reported. For example, regarding the time for which the channel information computation required for the CSI report occupies the CPUs, updating of channel information for a CSI report starting at the latest time point may not be considered or performed, and updating of channel information for a CSI report having a low priority of channel information may not be preferentially considered or performed.

The priority of the channel information may be determined with reference to Table 16 below.

TABLE 16

| | |
|---|---|
| $O_{CPU}^{(n)} = 0$: | case where reportQuantity configured in CSI report is configured as "none", and trs-Info is configured in CSI-RS resource set connected to CSI report |
| $O_{CPU}^{(n)} = 1$: | case where reportQuantity configured in CSI report is configured as "none", "cri-RSRP", or "ssb-Index-RSRP", and trs-Info is not configured in CSI-RS resource set connected to CSI report<br>case where reportQuantity configured in CSI report is configured as "cri-RI-PMI-CQI", "cri-RI-il", "cri-RI-il-CQI", "cri-RI-CQI", or "cri-RI-LI-PMI-CQI" |
| $O_{CPU}^{(n)} = N_{CPU}$: | case where aperiodic CSI report is triggered and corresponding CSI report is not multiplexed with one or all of TB/HARQ-ACK. Case where corresponding CSI report is wideband CSI, corresponds to up to 4 CSI-RS ports, and corresponds to a single resource with no CRI report, and codebookType corresponds to "typeI-SinglePanel" or reportQuantity corresponds to "cri-RI-CQI" (this case is a case corresponding to the above-described delay requirement 1 and may be regarded as a case where a UE rapidly computes and reports CSI by using all available CPUs) |
| $O_{CPU}^{(n)} = K_s$: | all other cases except the above cases: $K_S$ indicates the number of CSI-RS resources in CSI-RS resource set for channel measurement |

According to an embodiment of the disclosure, a CSI priority for a CSI report may be determined based on priority values PriiCSI (y, k, c, s) of Table 16. Referring to Table 16, a CSI priority value may be determined based on the type of channel information included in the CSI report, time domain report characteristics (aperiodic, semi-persistent, and periodic) of the CSI report, a channel (PUSCH or PUCCH) through which the CSI report is transmitted, a serving-cell index, and/or a CSI report configuration index. The CSI priority for the CSI report may be determined by comparing the priority values PriiCSI (y, k, c, s) such that a CSI report having a lower priority value has a higher CSI priority.

According to an embodiment of the disclosure, if a time for which channel information computation required for a CSI report indicated by the base station to the UE occupies CPUs is referred to as a CPU occupation time, the CPU occupation time may be determined by considering the type (report quantity) of channel information included in the CSI report, time domain characteristics (aperiodic, semi-persistent, and periodic) of the CSI report, a slot or a symbol occupied by higher-layer signaling or DCI indicating the CSI report, and/or a part or all of a slot or a symbol occupied by a reference signal for channel state measurement.

[PDCCH: Regarding DCI]

Hereinafter, downlink control information (DCI) in a 5G communication system will be described below.

According to an embodiment of the disclosure, in a 5G system, scheduling information regarding uplink data (or physical uplink shared channel (PUSCH)) or downlink data (or physical downlink shared channel (PDSCH)) may be included in DCI and transferred from a base station to a UE through the DCI. The UE may monitor, with regard to the PUSCH or PDSCH, a fallback DCI format and a non-fallback DCI format. The fallback DCI format may include a fixed field predefined between the base station and the UE, and the non-fallback DCI format may include a configurable field.

The DCI may be subjected to channel coding and modulation processes and then transmitted through or on a physical downlink control channel (PDCCH). A cyclic redundancy check (CRC) may be attached to the payload of a DCI message, and the CRC may be scrambled by a radio network temporary identifier (RNTI) corresponding to the identity of the UE. Different RNTIs may be used according to the purpose of the DCI message, for example, UE-specific data transmission, power control command, or random access response. For example, the RNTI may not be explicitly transmitted, but may be transmitted while being included in a CRC calculation process. Upon receiving a DCI message transmitted on the PDCCH, the UE may identify the CRC by using the allocated RNTI, and if the CRC identification result is right, the UE may identify or know that the corresponding message has been transmitted to the UE.

For example, DCI for scheduling a PDSCH regarding system information (SI) may be scrambled by an SI-RNTI. DCI for scheduling a PDSCH regarding a random access response (RAR) message may be scrambled by an RA-RNTI. DCI for scheduling a PDSCH regarding a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

According to an embodiment of the disclosure, DCI format 0_0 may be used as fallback DCI for scheduling a PUSCH, and in this case, the CRC may be scrambled by a C-RNTI. DCI format 0_0 in which the CRC is scrambled by a C-RNTI may include at least some of the following pieces of information given in Table 17 below, for example.

TABLE 17

| |
|---|
| Identifier for DCI formats - [1] bit |
| Frequency domain resource assignment - |
| $[\lceil \log_2(N_{RB}^{UL,BWP}(N_{RB}^{UL,BWP}+1)/2)\rceil]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| Transmit power control (TPC) command for scheduled PUSCH - [2] bits |
| Uplink/ supplementary uplink (UL/SUL) indicator - 0 or 1 bit |

DCI format 0_1 may be used as non-fallback DCI for scheduling a PUSCH, and in this case, the CRC may be scrambled by a C-RNTI. DCI format 0_1 in which the CRC is scrambled by a C-RNTI may include at least some of the following pieces of information given in Table 18 below, for example.

TABLE 18

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| For resource allocation type 0, $\lceil N_{RB}^{UL,BWP}/P \rceil$ bits |
| For resource allocation type 1, $\lceil \log_2(N_{RB}^{UL,BWP}(N_{RB}^{UL,BWP}+1)/2)\rceil$ bits |
| Time domain resource assignment -1, 2, 3, or 4 bits |
| Virtual resource block (VRB)-to-physical resource block (PRB) mapping - 0 or 1 bit, only for resource allocation type 1. |
| 0 bit if only resource allocation type 0 is configured; |
| 1 bit otherwise. |
| Frequency hopping flag - 0 or 1 bit, only for resource allocation type 1. |
| 0 bit if only resource allocation type 0 is configured; |
| 1 bit otherwise. |
| Modulation and coding scheme - 5 bits |
| New data indicator - 1 bit |
| Redundancy version - 2 bits |
| HARQ process number - 4 bits |
| 1st downlink assignment index- 1 or 2 bits |
| 1 bit for semi-static HARQ-ACK codebook; |
| 2 bits for dynamic HARQ-ACK codebook with single HARQ-ACK codebook. |
| 2nd downlink assignment index - 0 or 2 bits |
| 2 bits for dynamic HARQ-ACK codebook with two HARQ-ACK sub-codebooks; |
| 0 bit otherwise. |
| TPC command for scheduled PUSCH - 2 bits |
| SRS resource indicator - |
| $\left\lceil \log_2\left(\sum_{k=1}^{L_{max}} \binom{N_{SRS}}{k}\right)\right\rceil$ or $\lceil \log_2(N_{SRS})\rceil$ bits |
| $\left\lceil \log_2\left(\sum_{k=1}^{L_{max}} \binom{N_{SRS}}{k}\right)\right\rceil$ bits for non-codebook based PUSCH transmission; |
| $\lceil \log_2(N_{SRS})\rceil$ bits for codebook based PUSCH transmission. |
| Precoding information and number of layers - up to 6 bits |
| Antenna ports - up to 5 bits |
| SRS request - 2 bits |
| Channel state information (CSI) request - 0, 1, 2, 3, 4, 5, or 6 bits |
| Code block group (CBG) transmission information - 0, 2, 4, 6, or 8 bits |
| Phase tracking reference signal (PTRS)-demodulation reference signal (DMRS) association - 0 or 2 bits. |
| beta_offset indicator - 0 or 2 bits |
| DMRS sequence initialization - 0 or 1 bit |

DCI format 1_0 may be used as fallback DCI for scheduling a PDSCH, and in this case, the CRC may be scrambled by a C-RNTI. DCI format 1_0 in which the CRC is scrambled by a C-RNTI may include at least some of the following pieces of information given in Table 19 below, for example.

TABLE 19

| |
|---|
| Identifier for DCI formats - [1] bit |
| Frequency domain resource assignment - |

TABLE 19-continued $\lceil\lceil\log_2(N_{RB}^{UL,BWP}(N_{RB}^{UL,BWP}+1)/2)\rceil\rceil$ bits Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used as non-fallback DCI for scheduling a PDSCH, and in this case, the CRC may be scrambled by a C-RNTI. DCI format 1_1 in which the CRC is scrambled by a C-RNTI may include at least some of the following pieces of information given in Table 20 below, for example.

TABLE 20

Carrier indicator - 0 or 3 bits
Carrier indicator - 0 or 3 bits
Identifier for DCI formats - [1] bits
Bandwidth part indicator - 0, 1 or 2 bits
Frequency domain resource assignment For resource allocation type 0, $\lceil N_{RB}^{DL,BWP}/P\rceil$ bits For resource allocation type 1, $\lceil\log_2(N_{RB}^{DL,BWP}(N_{RB}^{DL,BWP}+1)/2)\rceil$ bits Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power (ZP) channel state information (CSI)-reference signal (RS) trigger - 0, 1, or 2 bits
For transport block 1:
Modulation and coding scheme - 5 bits
New data indicator - 1 bit
Redundancy version - 2 bits TABLE 20-continued For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit Hereinafter, a downlink control channel in a 5G communication system will be described with reference to the accompanying drawings.

Figure 8:
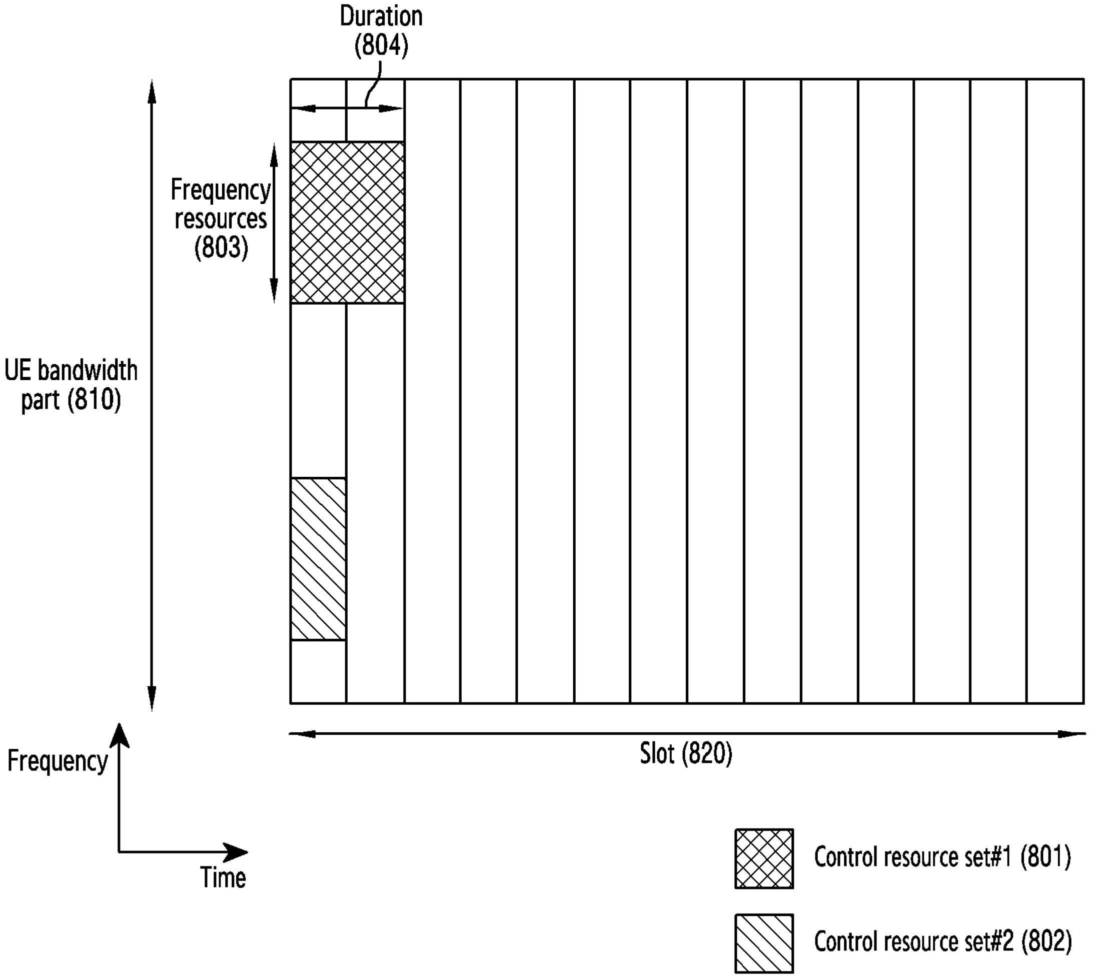
FIG. 8 illustrates a control resource set configuration of a downlink control channel in a wireless communication system according to an embodiment of the disclosure.

FIG. 8 illustrates a control resource set (CORESET) used to transmit a downlink control channel in a 5G wireless communication system according to an embodiment of the disclosure.

Referring to FIG. 8, it illustrates a UE bandwidth part 810 is configured along the frequency axis, and two control resource sets (control resource set #1 801 and control resource set #2 802) are configured within one slot 820 along the time axis. The control resource sets 801 and 802 may be configured in a specific frequency resource 803 within the entire UE bandwidth part 810 along the frequency axis. One or multiple OFDM symbols may be configured along the time axis, and this may be defined as a control resource set duration 804. Referring to the example illustrated in FIG. 8, control resource set #1 801 is configured to have a control resource set duration corresponding to two symbols, and control resource set #2 802 is configured to have a control resource set duration corresponding to one symbol.

According to an embodiment of the disclosure, a control resource set in 5G described above may be configured for a UE by a base station through upper layer signaling (for example, system information, master information block (MIB), radio resource control (RRC) signaling). The description that a control resource set is configured for a UE means that information, such as a control resource set identity, the control resource set's frequency location, and/or the control resource set's symbol duration is provided. For example, configuration information regarding the control resource set may include at least some of the following pieces of information given in Table 21.

TABLE 21

```
ConControlResourceSet ::=                         SEQUENCE {
    -- Corresponds to L1 parameter 'CORESET-ID'
    controlResourceSetId                       ControlResourceSetId,
  (control resource set identity))
    frequencyDomainResources                    BIT STRING (SIZE (45)),
  (frequency domain resource allocation information)
    duration                                   INTEGER (1..maxCoReSetDuration),
  (time domain resource allocation information)
    cce-REG-MappingType                           CHOICE {
  (CCE-to-REG mapping type)
        interleaved                             SEQUENCE {
          reg-BundleSize                          ENUMERATED {n2, n3, n6},
      (REG bundle size)
          precoderGranularity                       ENUMERATED
{sameAsREG-bundle, allContiguousRBs},
          interleaverSize                         ENUMERATED {n2, n3, n6}
          (interleaver size)
          shiftIndex
  INTEGER(0..maxNrofPhysicalResourceBlocks-1)
```

TABLE 21-continued

```
OPTIONAL
             (interleaver shift)
         },
     nonInterleaved                              NULL
         },
         tci-StatesPDCCH                          SEQUENCE(SIZE
(1..maxNrofTCI-StatesPDCCH)) OF TCI-StateId           OPTIONAL,
        (QCL configuration information)
     tci-PresentInDCI                           ENUMERATED {enabled}
                 OPTIONAL,    -- Need S
     }
```

In Table 21, tci-StatesPDCCH (simply referred to as transmission configuration indication (TCI) state) configuration information may include information of one or multiple SS/PBCH block indexes and/or channel state information reference signal (CSI-RS) indexes, which are quasi-co-located (OCLed) with a DMRS transmitted in a corresponding control resource set.

Figure 9:
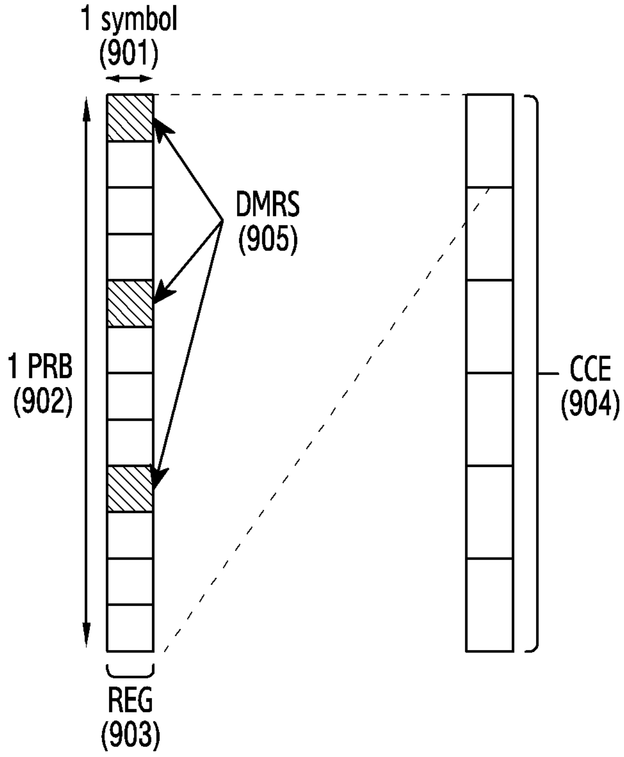
FIG. 9 illustrates a structure of a downlink control channel in a wireless communication system according to an embodiment of the disclosure.

FIG. 9 illustrates a basic unit of time and frequency resources constituting a downlink control channel available in a 5G system according to an embodiment of the disclosure.

Referring to FIG. 9, the basic unit of time and frequency resources constituting a control channel may be referred to as a resource element group (REG) 903. The REG 903 may be defined by one OFDM symbol 901 along the time axis and one physical resource block (PRB) 902 (for example, 12 subcarriers) along the frequency axis. The base station may configure a downlink control channel allocation unit by concatenating the REGs 903.

According to an embodiment of the disclosure, provided that the basic unit of downlink control channel allocation in 5G is a control channel element 904, one CCE 904 may include multiple REGs 903. To describe the REG 903 illustrated in FIG. 9, for example, the REG 903 may include 12 REs, and if one CCE 904 includes six REGs 903, one CCE 904 may then include 72 REs.

According to an embodiment of the disclosure, a downlink control resource set, once configured, may include multiple CCEs 904, and a specific downlink control channel may be mapped to one or multiple CCEs 904 and then transmitted according to the aggregation level (AL) in the control resource set. The CCEs 904 in the control resource set are distinguished by numbers, and the numbers of CCEs 904 may be allocated or indicated according to a logical mapping scheme.

The basic unit of the downlink control channel illustrated in FIG. 9, that is, the REG 903 may include both REs to which DCI is mapped, and an area to which a reference signal (DMRS 905) for decoding the same is mapped. As in FIG. 9, three DRMSs 905 may be transmitted inside one REG 903.

According to an embodiment of the disclosure, the number of CCEs necessary to transmit a PDCCH may be 1, 2, 4, 8, or 16 according to the aggregation level (AL), and different number of CCEs may be used to implement link adaption of the downlink control channel. For example, in the case of AL=L, one downlink control channel may be transmitted through L CCEs. The UE needs to detect a signal while being no information regarding the downlink control channel, and thus a search space indicating a set of CCEs has been defined for blind decoding. The search space is a set of downlink control channel candidates including CCEs which the UE needs to attempt to decode at a given AL, and since 1, 2, 4, 8, or 16 CCEs may constitute a bundle at various ALs, the UE may have multiple search spaces. A search space set may be defined as a set of search spaces at all configured aggregation levels.

According to an embodiment of the disclosure, search spaces may be classified into common search spaces and UE-specific search spaces. A group of UEs or all UEs may search a common search space of the PDCCH in order to receive cell-common control information, such as dynamic scheduling regarding system information or a paging message. For example, PDSCH scheduling allocation information for transmitting an SIB including a cell operator information or the like may be received by searching the common search space of the PDCCH. For example, in the case of a common search space, a group of UEs or all UEs need to receive the PDCCH, and the common search space may thus be defined as a predetermined set of CCEs. Scheduling allocation information regarding a UE-specific PDSCH or PUSCH may be received by searching the UE-specific search space of the PDCCH. The UE-specific search space may be defined UE-specifically as a function of various system parameters and the identity of the UE.

According to an embodiment of the disclosure, in 5G, a parameter for a search space regarding a PDCCH may be configured for the UE by the base station through upper layer signaling (for example, SIB, MIB, RRC signaling). For example, the base station may configure, for the UE, the number of PDCCH candidates at each aggregation level L, the monitoring cycle regarding the search space, the monitoring occasion with regard to each symbol in a slot regarding the search space, the search space type (common search space or UE-specific search space), a combination of an RNTI and a DCI format to be monitored in the corresponding search space, and/or a control resource set index for monitoring the search space, or the like. For example, the information configured for the UE may include at least some of the following pieces of information given in Table 22 below.

TABLE 22

```
SearchSpace ::=                           SEQUENCE {
     -- Identity of the search space. SearchSpaceId = 0 identifies the SearchSpace
configured via PBCH (MIB) or ServingCellConfigCommon.
     searchSpaceId                          SearchSpaceId,
   (search space identity)
     controlResourceSetId                   ControlResourceSetId,
```

TABLE 22-continued

```
  (control resource set identity)
    monitoringSlotPeriodicityAndOffset          CHOICE {
  (monitoring slot level periodicity)
      sl1                                       NULL,
      sl2                                       INTEGER (0..1),
      sl4                                       INTEGER (0..3),
      sl5                                     INTEGER (0..4),
      sl8                                       INTEGER (0..7),
      sl10                                      INTEGER (0..9),
      sl16                                      INTEGER (0..15),
      sl20                                      INTEGER (0..19)
    }
                                        OPTIONAL,
  duration (monitoring duration)              INTEGER (2..2559)
    monitoringSymbolsWithinSlot                 BIT STRING (SIZE (14))
                                          OPTIONAL,
  (monitoring symbols within slot)
    nrofCandidates                            SEQUENCE {
  (number of PDCCH candidates for each aggregation level)
      aggregationLevel1                         ENUMERATED {n0, n1, n2, n3, n4, n5,
n6, n8},
      aggregationLevel2                         ENUMERATED {n0, n1, n2, n3, n4, n5,
n6, n8},
      aggregationLevel4                         ENUMERATED {n0, n1, n2, n3, n4, n5,
n6, n8},
      aggregationLevel8                         ENUMERATED {n0, n1, n2, n3, n4, n5,
n6, n8},
      aggregationLevel16                        ENUMERATED {n0, n1, n2, n3, n4, n5,
n6, n8}
    },
    searchSpaceType                             CHOICE {
    (search space type)
      -- Configures this search space as common search space (CSS) and DCI formats to
monitor.
      common                                      SEQUENCE {
    (common search space)
    }
      UE-Specific                                 SEQUENCE {
    (UE-specific search space)
        -- Indicates whether the UE monitors in this USS for DCI formats 0-0 and 1-0
or for formats 0-1 and 1-1.
        formats                                   ENUMERATED {formats0-0-And-1-
0, formats0-1-And-1-1},
        ...
          }
```

According to an embodiment of the disclosure, based on configuration information, the base station may configure one or multiple search space sets for the UE. According to an embodiment of the disclosure, the base station may configure search space set 1 and search space set 2 for the UE, may configure DCI format A scrambled by an X-RNTI to be monitored in a common search space in search space set 1, and may configure DCI format B scrambled by a Y-RNTI to be monitored in a UE-specific search space in search space set 2.

According to an embodiment of the disclosure, one or multiple search space sets may exist in a common search space or a UE-specific search space according to configuration information. For example, search space set #1 and search space set #2 may be configured as a common search space, and search space set #3 and search space set #4 may be configured as a UE-specific search space.

Combinations of DCI formats and RNTIs given below may be monitored in a UE-specific search space. Obviously, the example given below is not limiting.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI According to an embodiment of the disclosure, combinations of DCI formats and RNTIs given below may be monitored in a UE-specific search space. Obviously, the example given below is not limiting.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

Enumerated RNTIs may follow the definition and usage given below.

Cell RNTI (C-RNTI): used to schedule a UE-specific PDSCH

Temporary cell RNTI (TC-RNTI): used to schedule a UE-specific PDSCH

Configured scheduling RNTI (CS-RNTI): used to schedule a semi-statically configured UE-specific PDSCH Random access RNTI (RA-RNTI): used to schedule a PDSCH in a random access step Paging RNTI (P-RNTI): used to schedule a PDSCH in which paging is transmitted System information RNTI (SI-RNTI): used to schedule a PDSCH in which system information is transmitted Interruption RNTI (INT-RNTI): used to indicate whether a PDSCH is punctured Transmit power control for PUSCH RNTI (TPC-PUSCH-RNTI): used to indicate a power control command regarding a PUSCH Transmit power control for PUCCH RNTI (TPC-PUCCH-RNTI): used to indicate a power control command regarding a PUCCH Transmit power control for SRS RNTI (TPC-SRS-RNTI): used to indicate a power control command regarding an SRS The DCI formats enumerated above may follow the definitions given in Table 23 below.

TABLE 23

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OF DM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space at aggregation level L in connection with control resource set p and search space set s may be expressed by Equation 1 below:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \qquad \text{Equation 1}$$

L: aggregation level $n_{CI}$: carrier index $N_{CCE,p}$: total number of CCEs existing in control resource set p $n^{\mu}_{s,f}$: slot index $M^{(L)}_{s,max}$: number of PDCCH candidates at aggregation level L $m_{s,n_{CI}}=0,\ldots,M^{(L)}_{s,max}-1$: PDCCH candidate index at aggregation level L $$i=0,\ldots,L-1$$

$$Y_{p,n^{\mu}_{s,f}}=\left(A_p\cdot Y_{p,n^{\mu}_{s,f}-1}\right)\bmod D,\ Y_{p,-1}=n_{RNTI}\neq 0,$$

$$A_p=39827 \text{ for } p\bmod 3=0,\ A_p=39829 \text{ for } p\bmod 3=1,$$

$$A_p=39839 \text{ for } p\bmod 3=2,\ D=65537$$

$n_{RNTI}$: UE identity

The $Y_{p,n^{\mu}_{s,f}}$ value may correspond to 0 in the case of a common search space.

The $Y_{p,n^{\mu}_{s,f}}$ value may correspond to a value changed by the UE's identity (C-RNTI or ID configured for the UE by the base station) and the time index in the case of a UE-specific search space.

According to an embodiment of the disclosure, in 5G, multiple search space sets may be configured by different parameters (for example, parameters in Table 22), and the group of search space sets monitored by the UE at each timepoint may differ accordingly. For example, if search space set #1 is configured at by X-slot cycle, if search space set #2 is configured at by Y-slot cycle, and if X and Y are different, the UE may monitor search space set #1 and search space set #2 both in a specific slot, and may monitor one of search space set #1 and search space set #2 both in another specific slot.

[PDSCH/PUSCH: Related to Frequency Resource Assignment]

Next, a frequency domain resource assignment (FDRA) for a physical downlink shared channel (PDSCH) and a physical uplink shared channel (PUSCH) in NR is described.

Figure 10:
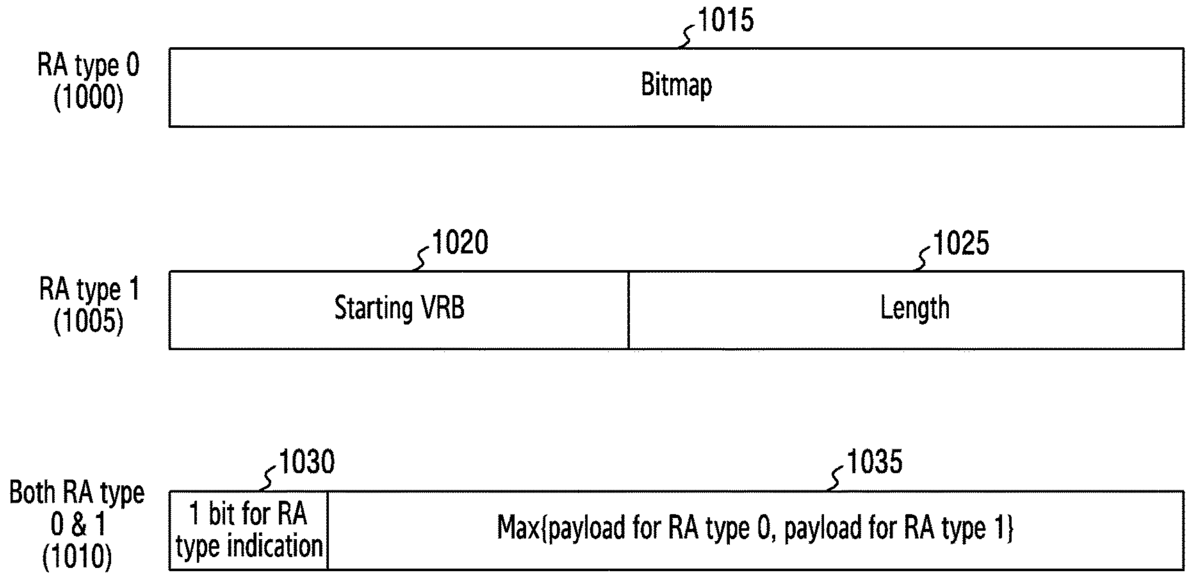
FIG. 10 illustrates frequency domain resource allocation with regard to a physical downlink shared channel (PDSCH) or PUSCH in a wireless communication system according to an embodiment of the disclosure.

FIG. 10 illustrates a frequency domain resource assignment of a PDSCH or a PUSCH in a wireless communication system according to an embodiment of the disclosure.

Referring to FIG. 10, it illustrates three frequency domain resource assignment methods of FDRA type 0 1000, FDRA type 1 1005, and a dynamic switch 1010, which may be configured through a higher layer in an NR wireless communication system.

Referring to FIG. 10, when a UE is configured to use only FDRA type 0 through higher-layer signaling (indicated by reference numeral 1000), a part of downlink control information (DCI) for scheduling a PDSCH or a PUSCH to the corresponding UE includes a bitmap consisting of NRBG number of bits. A condition for this is described below. In this case, an NRBG refers to the number of resource block groups (RBGs) determined as shown in Table 24 below according to the size of a bandwidth part assigned by a bandwidth part indicator and a higher layer parameter, rbg-Size, and data is transmitted to an RBG which is indicated as 1 by the bitmap.

TABLE 24

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The size of a frequency resource in a bandwidth part may be defined as the number of RBs included in the bandwidth part. Specifically, when the UE is indicated to allocate an FDRA type-0 resource, the length of an FDRA field of DCI received by the UE is equal to the number of RBGs (NRBG) in the bandwidth part, and $$N_{RBG} = \lceil (N_{BWP}^{size} + (N_{BWP}^{start} \bmod P))/P \rceil.$$

Here, a first RBG in the bandwidth part includes $$RBG_0^{size} = P - N_{BWP}^{size} \bmod P$$

number of RBs, the last RBG in the bandwidth part includes $$RBG_{last}^{size} = (N_{BWP}^{start} + N_{BWP}^{size}) \bmod P$$

number of RBs if $$(N_{BWP}^{start} + N_{BWP}^{size}) \bmod P > 0,$$

and otherwise (that is, not $$(N_{BWP}^{start} + N_{BWP}^{size}) \bmod P > 0),$$

includes $$RBG_{last}^{size} = P$$

number of RBs. The remaining RBGs in the bandwidth part include P number of RBs. Here, P is the number of nominal RBGs determined according to Table 24 above.

When the UE is configured to use only FDRA type 1 through higher-layer signaling (indicated by reference numeral 1005), DCI for allocating a PDSCH or a PUSCH to the corresponding UE includes frequency domain resource assignment (FDRA) information consisting of $$\lceil \log_2(N_{RB}^{BWP} * (N_{RB}^{BWP} + 1)/2 \rceil$$

number of bits. Here, $$N_{RB}^{BWP}$$

indicates the number of RBs included in the bandwidth part. Through this, a base station may configure a starting VRB 1020 and the length 1025 of a frequency domain resource allocated continuously therefrom.

When the UE is configured to use both FDRA type-0 resource assignment and FDRA type-1 resource assignment through higher-layer signaling (indicated by reference numeral 1010), a part of DCI for allocating a PDSCH/PUSCH to the corresponding UE includes frequency domain resource assignment information consisting of bits of the larger value 1035 among a payload 1015 for configuring FDRA type-0 resource assignment and payloads 1020 and 1025 for configuring FDRA type-1 resource assignment. A condition for this is specifically described below. In this case, one bit may be added to the first part (MSB) of the frequency domain resource assignment information in the DCI, and if the corresponding bit has a value of "0", it may be indicated that FDRA type-0 resource assignment is used, and if the bit has a value of "1", it may be indicated that FDRA type-1 resource assignment is used.

If the UE receives a configuration of an FDRA type-2 resource assignment method through higher-layer signaling, the UE may receive an indication of the FDRA type-2 resource assignment method from the base station according to the following method.

The UE may receive an indication of M number of interlace index sets of RB assignment information from the base station.

The interlace index m∈{0,1, . . . , M−1} may be configured by common RBs {m, M+m, 2M+m, 3M+m, . . . }, and M may be defined as shown in Table 25.

TABLE 25

| μ | M |
|---|---|
| 0 | 10 |
| 1 | 5 |

The relationship between $$RB\ n_{IRB,m}^{\mu} \in \{0, 1, \ldots\}$$

and common RB $$n_{CRB}^{\mu}$$

in bandwidth part i and interlace m may be defined as follows.

$$n_{CRB}^{\mu} = Mn_{IRB,m}^{\mu} + N_{BWP,i}^{start,\mu} + ((m - N_{BWP,i}^{start,\mu}) \bmod M) \quad (1)$$

(2) where $$N_{BWP,i}^{start,\mu}$$

block where bandwidth part starts relative to common resource block 0. u is subcarrier spacing index When a subcarrier spacing is 15 kHz (μ=0), RB allocation information for an interlace set with m0+1 indexes may be notified from the base station to the UE. In addition, a resource assignment field may be configured by a resource indication value (RIV). When the resource indication value is 0≤RIV<M(M+1)/2 and l=0, 1, . . . L−1, the resource allocation field may be configured by start interlace m0 and the number of consecutive interlaces L (L≥1), and the value is as follows.

$$\text{if } (L-1) \le \lfloor M/2 \rfloor \text{ then}$$

-continued $$RIV = M(L-1) + m_0$$

else $$RIV = M(M-L+1) + (M-1-m_0)$$

When the resource indication value is RIV≥M(M+1)/2, the resource indication value may be configured by values of start interlace index m0 and 1, and the value may be configured as shown in Table 26.

TABLE 26

| RIV − M(M + 1)/2 | m0 | 1 |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

When a subcarrier spacing is 30 kHz (μ=1), the RB allocation information may be notified to the UE by the base station in the form of a bitmap indicating interlaces allocated to the UE. The size of the bitmap is M, and each 1 bit of the bitmap corresponds to an interlace. With respect to the interlace bitmap order, interlace indexes from 0 to M−1 may be mapped to an MSB to an LSB.

In addition, with respect to 15 kHz and 30 kHz, a least significant bit (LSB)

$$Y = \left\lceil \log 2 \frac{N_{RB-set}^{BWP}\left(N_{RB-set}^{BWP}+1\right)}{2} \right\rceil$$

of an FDRA field may mean a set of consecutive RBs of a PUSCH scheduled by DCI format 0_1. An Y bit may be configured by a resource indication value (RIVRBset). In $$0 \le RIV_{RBset} < N_{RB-set}^{BWP}\left(N_{RB-set}^{BWP}+1\right)/2$$

and l=0, 1, . . . $L_{RBset}-1$, an RIVRBset value may be determined by a start RB set ($RBset_{START}$) and the number of consecutive RB sets ($L_{RBset}$ ($L_{RBset} \ge 1$)). The RIVRBset value may be defined as follows.

if $(L_{RBset}-1) \le \lfloor N_{RB-set}^{BWP}/2 \rfloor$ then $$RIV_{RBset} = N_{RB-set}^{BWP}(L_{RBset}-1) + RBset_{START}$$

else $$RIV_{RBset} = N_{RB-set}^{BWP}\left(N_{RB-set}^{BWP} - L_{RBSet} + 1\right) + \left(N_{RB-set}^{BWP} - 1 - RBset_{START}\right)$$

$$N_{RB-set}^{BWP}$$

means the number of RB sets included in the bandwidth part, and may be determined by the number of guard gaps (or bands) in a carrier configured (or preconfigured) through higher-layer signaling.

[PDSCH/PUSCH: Regarding Time Resource Allocation]

Hereinafter, a time domain resource allocation method regarding a data channel in a next-generation mobile communication system (5G or NR system) will be described.

A base station may configure a table for time domain resource allocation information regarding a physical downlink shared channel (PDSCH) and a physical uplink shared channel (PUSCH) for a UE through upper layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. In an embodiment of the disclosure, the time domain resource allocation information may include PDCCH-to-PDSCH slot timing (for example, corresponding to a slot-unit time interval between a timepoint at which a PDCCH is received and a timepoint at which a PDSCH scheduled by the received PDCCH is transmitted; labeled K0), PDCCH-to-PUSCH slot timing (for example, corresponding to a slot-unit time interval between a timepoint at which a PDCCH is received and a timepoint at which a PUSCH scheduled by the received PDCCH is transmitted; hereinafter, labeled K2), information regarding the location and length of the start symbol by which a PDSCH or PUSCH is scheduled inside a slot, the mapping type of a PDSCH or PUSCH, and the like. For example, information, such as in Table 27 or Table 28 below may be transmitted from the base station to the UE.

TABLE 27

| PDSCH-TimeDomainResourceAllocationList information element |
|---|

```
PDSCH-TimeDomainResourceAllocationList ::=   SEQUENCE (SIZE(1..maxNrofDL-
Allocations)) OF
PDSCH-TimeDomainResourceAllocation
PDSCH-TimeDomainResourceAllocation ::=   SEQUENCE {
        k0                                          INTEGER(0..32)
   OPTIONAL,   -- Need S
        (PDCCH-to-PDSCH timing, slot unit)
mappingType                              ENUMERATED {typeA, typeB},
     (PDSCH mapping type)
startSymbolAndLength                        INTEGER (0..127)
(start symbol and length of PDSCH)
}
```

TABLE 28

| PUSCH-TimeDomainResourceAllocationList information element |
|---|
| PUSCH-TimeDomainResourceAllocationList ::= SEQUENCE (SIZE(1..maxNrofUL-Allocations)) OF<br>PUSCH-TimeDomainResourceAllocation<br>PUSCH-TimeDomainResourceAllocation ::= SEQUENCE {<br>k2 INTEGER(0..32) OPTIONAL, -- Need S<br>(PDCCH-to-PUSCH timing, slot unit)<br>mappingType ENUMERATED {typeA, typeB},<br>(PUSCH mapping type)<br>startSymbolAndLength INTEGER (0..127)<br>(start symbol and length of PUSCH)<br>} |

The base station may notify the UF of one of the entries of the table regarding time domain resource allocation information described above through L1 signaling (for example, DCI) (for example, "time domain resource allocation" field in DCI may indicate the same). The UE may acquire time domain resource allocation information regarding a PDSCH or PUSCH, based on the DCI acquired from the base station.

Figure 11:
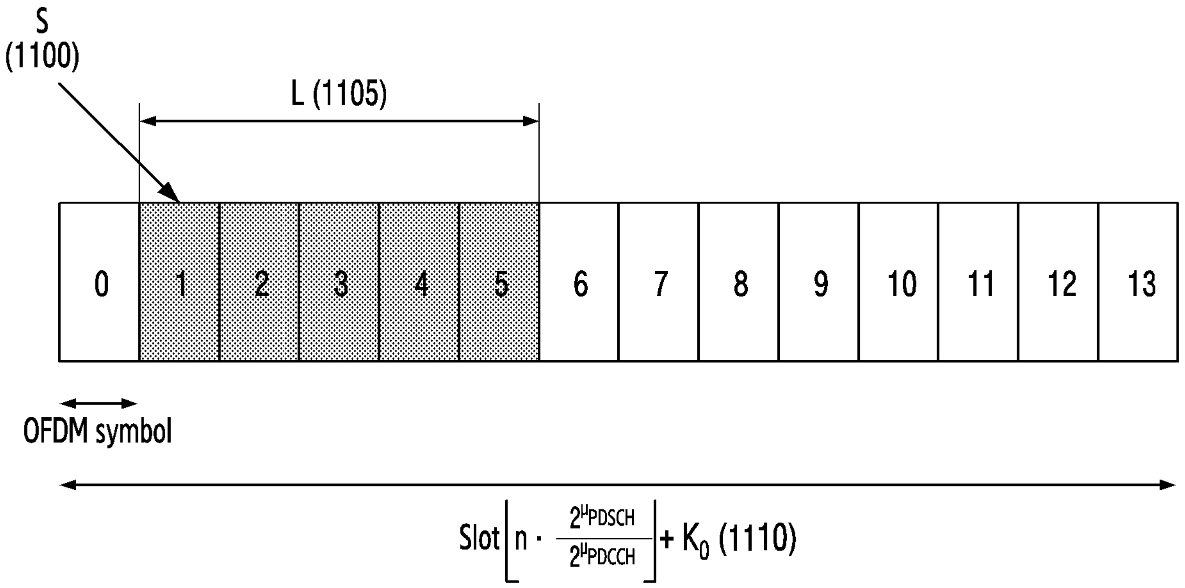
FIG. 11 illustrates time domain resource allocation with regard to a PDSCH in a wireless communication system according to an embodiment of the disclosure.

FIG. 11 illustrates time domain resource allocation with regard to a PDSCH in a wireless communication system according to an embodiment of the disclosure.

Referring to FIG. 11, the base station may indicate the time domain location of a PDSCH resource according to the subcarrier spacing (SCS) (μPDSCH, μPDCCH) of a data channel and a control channel configured by using an upper layer, the scheduling offset (K0) value 1110, and the OFDM symbol start location 1100 and length 1105 within one slot dynamically indicated through DCI.

[PUSCH: Regarding Transmission Scheme]

Next, a PUSCH transmission scheduling scheme will be described. PUSCH transmission may be dynamically scheduled by a UL grant inside DCI, or operated by means of configured grant Type 1 or Type 2. Dynamic scheduling indication regarding PUSCH transmission may be made by DCI format 0_0 or 0_1.

Configured grant Type 1 PUSCH transmission may be configured semi-statically by receiving configuredGrant-Config including rrc-ConfiguredUplinkGrant in Table 29 through upper signaling, without receiving a UL grant inside DCI. Configured grant Type 2 PUSCH transmission may be scheduled semi-persistently by a UL grant inside DCI after receiving configuredGrantConfig not including rrc-ConfiguredUplinkGrant in Table 29 through upper signaling. If PUSCH transmission is operated by a configured grant, parameters applied to the PUSCH transmission are applied through configuredGrantConfig (upper signaling) in Table 29 except for dataScramblingIdentityPUSCH, txConfig, codebookSubset, maxRank, and scaling of UCI-OnPUSCH, which are provided by pusch-Config (upper signaling) in Table 30. If provided with transformPrecoder inside configuredGrantConfig (upper signaling) in Table 29, the UE applies tp-pi2BPSK inside pusch-Config in Table 30 to PUSCH transmission operated by a configured grant.

TABLE 29

```
ConfiguredGrantConfig ::=                SEQUENCE {
  frequencyHopping                       ENUMERATED {intraSlot, interSlot}
OPTIONAL,   -- Need S,
  cg-DMRS-Configuration                  DMRS-UplinkConfig,
  mcs-Table                              ENUMERATED {qam256, qam64LowSE}
OPTIONAL,   -- Need S
  mcs-TableTransformPrecoder             ENUMERATED {qam256, qam64LowSE}
OPTIONAL,   -- Need S
  uci-OnPUSCH                            SetupRelease { CG-UCI-OnPUSCH }
OPTIONAL,   -- Need M
  resourceAllocation                     ENUMERATED { resourceAllocationType0,
resourceAllocationType1, dynamicSwitch },
  rbg-Size                               ENUMERATED {config2}
OPTIONAL,   -- Need S
  powerControlLoopToUse                  ENUMERATED {n0, n1},
  p0-PUSCH-Alpha                         P0-PUSCH-AlphaSetId,
  transformPrecoder                      ENUMERATED {enabled, disabled}
OPTIONAL,   -- Need S
  nrofHARQ-Processes                     INTEGER(1..16),
  repK                                   ENUMERATED {n1, n2, n4, n8},
  repK-RV                                ENUMERATED {s1-0231, s2-0303, s3-0000}
OPTIONAL,   -- Need R
  periodicity                            ENUMERATED {
                                           sym2, sym7, sym1x14, sym2x14, sym4x14, sym5x14,
sym8x14, sym10x14, sym16x14, sym20x14,
                                           sym32x14, sym40x14, sym64x14, sym80x14, sym128x14,
sym160x14, sym256x14, sym320x14, sym512x14,
                                           sym640x14, sym1024x14, sym1280x14, sym2560x14,
sym5120x14,
                                           sym6, sym1x12, sym2x12, sym4x12, sym5x12, sym8x12,
sym10x12, sym16x12, sym20x12, sym32x12,
                                           sym40x12, sym64x12, sym80x12, sym128x12, sym160x12,
sym256x12, sym320x12, sym512x12, sym640x12,
```

TABLE 29-continued

```
                              sym1280x12, sym2560x12
  },
  configuredGrantTimer                    INTEGER (1..64)
OPTIONAL,   -- Need R
  rrc-ConfiguredUplinkGrant                 SEQUENCE {
     timeDomainOffset                     INTEGER (0..5119),
     timeDomainAllocation                   INTEGER (0..15),
     frequencyDomainAllocation                BIT STRING (SIZE(18)),
     antennaPort                        INTEGER (0..31),
     dmrs-SeqInitialization                 INTEGER (0..1)
OPTIONAL,   -- Need R
     precodingAndNumberOfLayers                   INTEGER (0..63),
     srs-ResourceIndicator                  INTEGER (0..15)
OPTIONAL,   -- Need R
     mcsAndTBS                           INTEGER (0..31),
     frequencyHoppingOffset                   INTEGER (1..
maxNrofPhysicalResourceBlocks-1)                 OPTIONAL,   -- Need R
     pathlossReferenceIndex                INTEGER (0..maxNrofPUSCH-
PathlossReferenceRSs-1),
     ...
  }                                            OPTIONAL, --
Need R
  ...
}
```

Next, a PUSCH transmission method will be described. The DMRS antenna port for PUSCH transmission is identical to an antenna port for SRS transmission. PUSCH transmission may follow a codebook-based transmission method and a non-codebook-based transmission method according to whether the value of txConfig inside pusch-Config in Table 30, which is upper signaling, is "codebook" or "nonCodebook".

As described above, PUSCH transmission may be dynamically scheduled through DCI format 0_0 or 0_1, and may be semi-statically configured by a configured grant. Upon receiving indication of scheduling regarding PUSCH transmission through DCI format 0_0, the UE performs beam configuration for PUSCH transmission by using pucch-spatialRelationInfoID corresponding to a UE-specific PUCCH resource corresponding to the minimum ID inside an activated uplink BWP inside a serving cell, and the PUSCH transmission is based on a single antenna port. The UE does not expect scheduling regarding PUSCH transmission through DCI format 0_0 inside a BWP having no configured PUCCH resource including pucch-spatialRelationInfo. If the UE has no configured txConfig inside pusch-Config in Table 30, the UE does not expect scheduling through DCI format 0_1.

TABLE 30

```
PUSCH-Config ::=                          SEQUENCE {
  dataScramblingIdentityPUSCH                     INTEGER (0..1023)
OPTIONAL,   -- Need S
  txConfig                            ENUMERATED {codebook, nonCodebook}
OPTIONAL,   -- Need S
  dmrs-UplinkForPUSCH-MappingTypeA   SetupRelease { DMRS-UplinkConfig }
OPTIONAL,   -- Need M
  dmrs-UplinkForPUSCH-MappingTypeB   SetupRelease { DMRS-UplinkConfig }
OPTIONAL,   -- Need M
  pusch-PowerControl                        PUSCH-PowerControl
OPTIONAL,   -- Need M
  frequencyHopping                        ENUMERATED {intraSlot, interSlot}
OPTIONAL,   -- Need S
  frequencyHoppingOffsetLists                 SEQUENCE (SIZE (1..4)) OF INTEGER (1..
maxNrofPhysicalResourceBlocks-1)
                                                    OPTIONAL, --
Need M
  resourceAllocation                      ENUMERATED { resourceAllocationType0,
resourceAllocationType1, dynamicSwitch},
  pusch-TimeDomainAllocationList                  SetupRelease { PUSCH-
TimeDomainResourceAllocationList }               OPTIONAL,   -- Need M
  pusch-AggregationFactor                   ENUMERATED { n2, n4, n8 }
OPTIONAL,   -- Need S
  mcs-Table                           ENUMERATED {qam256, qam64LowSE}
OPTIONAL,   -- Need S
  mcs-TableTransformPrecoder                  ENUMERATED {qam256, qam64LowSE}
OPTIONAL,   -- Need S
  transformPrecoder                       ENUMERATED {enabled, disabled}
OPTIONAL,   -- Need S
  codebookSubset                          ENUMERATED {fullyAndPartialAndNonCoherent,
partialAndNonCoherent,nonCoherent}
                                                OPTIONAL, -- Cond
codebookBased
  maxRank                             INTEGER (1..4)              OPTIONAL, -
- Cond codebookBased
```

TABLE 30-continued

```
  rbg-Size                          ENUMERATED { config2}
OPTIONAL, -- Need S
  uci-OnPUSCH                            SetupRelease { UCI-OnPUSCH}
OPTIONAL, -- Need M
  tp-pi2BPSK                           ENUMERATED {enabled}
OPTIONAL, -- Need S
  ...
}
```

Hereinafter, codebook-based PUSCH transmission will be described. The codebook-based PUSCH transmission may be dynamically scheduled through DCI format 0_0 or 0_1, and may be operated semi-statically by a configured grant. If a codebook-based PUSCH is dynamically scheduled through DCI format 0_1 or configured semi-statically by a configured grant, the UE determines a precoder for PUSCH transmission, based on an SRS resource indicator (SRI), a transmission precoding matrix indicator (TPMI), and a transmission rank (the number of PUSCH transmission layers).

The SRI may be given through the SRS resource indicator (a field inside DCI) or configured through srs-ResourceIndicator (upper signaling). During codebook-based PUSCH transmission, the UE has at least one SRS resource configured therefor, and may have a maximum of two SRS resources configured therefor. If the UE is provided with the SRI through DCI, the SRS resource indicated by the corresponding SRI refers to the SRS resource corresponding to the SRI, among SRS resources transmitted prior to the PDCCH including the corresponding SRI. In addition, the TPMI and the transmission rank may be given through "precoding information and number of layers" (a field inside DCI) or configured through precodingAndNumberOfLayers (upper signaling). The TPMI is used to indicate a precoder to be applied to PUSCH transmission. If one SRS resource is configured for the UE, the TPMI may be used to indicate a precoder to be applied in the configured one SRS resource. If multiple SRS resources are configured for the UE, the TPMI is used to indicate a precoder to be applied in an SRS resource indicated through the SRI.

The precoder to be used for PUSCH transmission is selected from an uplink codebook having the same number of antenna ports as the value of nrofSRS-Ports inside SRS-Config (upper signaling). In connection with codebook-based PUSCH transmission, the UE determines a codebook subset, based on codebookSubset inside pusch-Config (upper signaling) and TPMI. The codebookSubset inside pusch-Config (upper signaling) may be configured to be one of "fullyAndPartialAndNonCoherent", "partialAndNonCoherent", or "noncoherent", based on UE capability reported by the UE to the base station. If the UE reported "partialAndNonCoherent" as UE capability, the UE does not expect that the value of codebookSubset (upper signaling) will be configured as "fullyAndPartialAndNonCoherent". In addition, if the UE reported "nonCoherent" as UE capability, UE does not expect that the value of codebookSubset (upper signaling) will be configured as "fully AndPartialAndNonCoherent" or "partialAndNonCoherent". If nrofSRS-Ports inside SRS-ResourceSet (upper signaling) indicates two SRS antenna ports, the UE does not expect that the value of codebookSubset (upper signaling) will be configured as "partialAndNonCoherent".

The UE may have one SRS resource set configured therefor, wherein the value of usage inside SRS-ResourceSet (upper signaling) is "codebook", and one SRS resource may be indicated through an SRI inside the corresponding SRS resource set. If multiple SRS resources are configured inside the SRS resource set wherein the value of usage inside SRS-ResourceSet (upper signaling) is "codebook", the UE expects that the value of nrofSRS-Ports inside SRS-Resource (upper signaling) is identical for all SRS resources.

The UE transmits, to the base station, one or multiple SRS resources included in the SRS resource set wherein the value of usage is configured as "codebook" according to upper signaling, and the base station selects one from the SRS resources transmitted by the UE and indicates the UE to be able to transmit a PUSCH by using transmission beam information of the corresponding SRS resource. In connection with the codebook-based PUSCH transmission, the SRI is used as information for selecting the index of one SRS resource, and is included in DCI. Additionally, the base station adds information indicating the rank and TPMI to be used by the UE for PUSCH transmission to the DCI. Using the SRS resource indicated by the SRI, the UE applies, in performing PUSCH transmission, the precoder indicated by the rank and TPMI indicated based on the transmission beam of the corresponding SRS resource, thereby performing PUSCH transmission.

Next, non-codebook-based PUSCH transmission will be described. The non-codebook-based PUSCH transmission may be dynamically scheduled through DCI format 0_0 or 0_1, and may be operated semi-statically by a configured grant. If at least one SRS resource is configured inside an SRS resource set wherein the value of usage inside SRS-ResourceSet (upper signaling) is "nonCodebook", non-codebook-based PUSCH transmission may be scheduled for the UE through DCI format 0_1.

With regard to the SRS resource set wherein the value of usage inside SRS-ResourceSet (upper signaling) is "nonCodebook", one connected NZP CSI-RS resource (non-zero power CSI-RS) may be configured for the UE. The UE may calculate a precoder for SRS transmission by measuring the NZP CSI-RS resource connected to the SRS resource set. If the difference between the last received symbol of an aperiodic NZP CSI-RS resource connected to the SRS resource set and the first symbol of aperiodic SRS transmission in the UE is less than 42 symbols, the UE does not expect that information regarding the precoder for SRS transmission will be updated.

If the configured value of resourceType inside SRS-ResourceSet (upper signaling) is "aperiodic", the connected NZP CSI-RS is indicated by an SRS request which is a field inside DCI format 0_1 or 1_1. If the connected NZP CSI-RS resource is an aperiodic NZP CSI-RS resource, the existence of the connected NZP CSI-RS may be indicated with regard to the case in which the value of SRS request (a field inside DCI format 0_1 or 1_1) is not "00". The corresponding DCI should not indicate cross carrier or cross BWP scheduling. In addition, if the value of SRS request indicates the existence of a NZP CSI-RS, the NZP CSI-RS is positioned in the slot used to transmit the PDCCH including the SRS request field. In this case, TCI states configured for the scheduled subcarrier are not configured as QCL-TypeD.

If there is a periodic or semi-persistent SRS resource set configured, the connected NZP CSI-RS may be indicated through associatedCSI-RS inside SRS-ResourceSet (upper signaling). With regard to non-codebook-based transmission, the UE does not expect that spatialRelationInfo which is upper signaling regarding the SRS resource and associatedCSI-RS inside SRS-ResourceSet (upper signaling) will be configured together.

If multiple SRS resources are configured for the UE, the UE may determine a precoder to be applied to PUSCH transmission and the transmission rank, based on an SRI indicated by the base station. The SRI may be indicated through the SRS resource indicator (a field inside DCI) or configured through srs-ResourceIndicator (upper signaling). Similarly to the above-described codebook-based PUSCH transmission, if the UE is provided with the SRI through DCI, the SRS resource indicated by the corresponding SRI refers to the SRS resource corresponding to the SRI, among SRS resources transmitted prior to the PDCCH including the corresponding SRI. The UE may use one or multiple SRS resources for SRS transmission, and the maximum number of SRS resources that can be transmitted simultaneously in the same symbol inside one SRS resource set and the maximum number of SRS resources are determined by UE capability reported to the base station by the UE. SRS resources simultaneously transmitted by the UE occupy the same RB. The UE configures one SRS port for each SRS resource. There may be only one configured SRS resource set wherein the value of usage inside SRS-ResourceSet (upper signaling) is “nonCodebook”, and a maximum of four SRS resources may be configured for non-codebook-based PUSCH transmission.

The base station transmits one NZP-CSI-RS connected to the SRS resource set to the UE, and the UE calculates the precoder to be used when transmitting one or multiple SRS resources inside the corresponding SRS resource set, based on the result of measurement when the corresponding NZP-CSI-RS is received. The UE may apply the calculated precoder when transmitting, to the base station, one or multiple SRS resources inside the SRS resource set wherein the configured usage is “nonCodebook”, and the base station selects one or multiple SRS resources from the received one or multiple SRS resources. In connection with the non-codebook-based PUSCH transmission, the SRI indicates an index that may express one SRS resource or a combination of multiple SRS resources, and the SRI is included in DCI. The number of SRS resources indicated by the SRI transmitted by the base station may be the number of transmission layers of the PUSCH, and the UE may transmit the PUSCH by applying the precoder applied to SRS resource transmission to each layer.

[PUSCH: preparation procedure time]

Next, a PUSCH preparation procedure time will be described. If a base station schedules a UE so as to transmit a PUSCH by using DCI format 0_0, 0_1, or 0_2, the UE may require a PUSCH preparation procedure time such that a PUSCH is transmitted by applying a transmission method (SRS resource transmission precoding method, the number of transmission layers, spatial domain transmission filter) indicated through DCI. The PUSCH preparation procedure time is defined in an NR system in consideration thereof. The PUSCH preparation procedure time of the UE may follow Equation 2 given below.

$$Tproc,2 = \max((N2 + d2,1 + d2)(2048 + 144)\kappa 2^{-\mu} Tc + \text{Text} + Tswitch, d2,2) \quad \text{Equation 2}$$

Each parameter in Tproc,2 described above in Equation 2 may have the following meaning.

N2: the number of symbols determined according to UE processing capability 1 or 2, based on the UE’s capability, and numerology u. N2 may have a value in Table 31 if UE processing capability 1 is reported according to the UE’s capability report, and may have a value in Table 32 if UE processing capability 2 is reported, and if availability of UE processing capability 2 is configured through upper layer signaling.

TABLE 31

| μ | PUSCH preparation time $N_2$ [symbols] |
|---|---|
| 0 | 10 |
| 1 | 12 |
| 2 | 23 |
| 3 | 36 |

TABLE 32

| μ | PUSCH preparation time $N_2$ [symbols] |
|---|---|
| 0 | 5 |
| 1 | 5.5 |
| 2 | 11 for frequency range 1 |

d2,1: the number of symbols determined to be 0 if all resource elements of the first OFDM symbol of PUSCH transmission include DM-RSs, and to be 1 otherwise.

κ: 64

μ: follows a value, among $\mu_{DL}$ and $\mu_{UL}$, which makes Tproc,2 larger. HDL refers to the numerology of a downlink used to transmit a PDCCH including DCI that schedules a PUSCH, and $\mu_{UL}$ refers to the numerology of an uplink used to transmit a PUSCH.

$Tc$: has $1/(\Delta f_{max} \cdot N_f)$, $\Delta f_{max} = 480 \cdot 10^3$ Hz, $N_f = 4096$ … d2,2: follows a BWP switching time if DCI that schedules a PUSCH indicates BWP switching, and has 0 otherwise.

d2: if OFDM symbols overlap temporally between a PUSCH having a high priority index and a PUCCH having a low priority index, the d2 value of the PUSCH having a high priority index is used. Otherwise, d2 is 0.

Text: if the UE uses a shared spectrum channel access scheme, the UE may calculate Text and apply the same to a PUSCH preparation procedure time. Otherwise, Text is assumed to be 0.

Tswitch: if an uplink switching spacing has been triggered, Tswitch is assumed to be the switching spacing time. Otherwise, Tswitch is assumed to be 0.

The base station and the UE determine that the PUSCH preparation procedure time is insufficient if the first symbol of a PUSCH starts earlier than the first uplink symbol in which a CP starts after Tproc,2 from the last symbol of a PDCCH including DCI that schedules the PUSCH, in view of the influence of timing advance between the uplink and the downlink and time domain resource mapping information of the PUSCH scheduled through the DCI. Otherwise (if the first symbol of a PUSCH does not start earlier than the first uplink symbol in which a CP starts after Tproc,2 from the last symbol of a PDCCH including DCI that schedules the PUSCH), the base station and the UE determine that the PUSCH preparation procedure time is sufficient. The UE may transmit the PUSCH only if the PUSCH preparation procedure time is sufficient, and may ignore the DCI that schedules the PUSCH if the PUSCH preparation procedure time is insufficient.

[PUSCH: Regarding Repetition Transmission]

Hereinafter, repetition transmission of an uplink data channel in a 5G system will be described below. A 5G system supports two types of uplink data channel repetition transmission methods, PUSCH repetition type A transmission and PUSCH repetition type B transmission. One of PUSCH repetition type A transmission and PUSCH repetition type B transmission may be configured for a UE through upper layer signaling.

1. PUSCH Repetition Type a Transmission

As described above, the symbol length of an uplink data channel and the location of the start symbol may be determined by a time domain resource allocation method in one slot, and a base station may notify a UE of the number of repetition transmissions through upper layer signaling (for example, RRC signaling) or L1 signaling (for example, DCI).

- Based on the number of repetition transmissions received from the base station, the UE may repetitively transmit an uplink data channel having the same length and start symbol as the configured uplink data channel, in a continuous slot. If the base station configured a slot as a downlink for the UE, or if at least one of symbols of the uplink data channel configured for the UE is configured as a downlink, the UE omits uplink data channel transmission, but counts the number of repetition transmissions of the uplink data channel. For example, although included in the number of repetition transmissions of the uplink data channel, the uplink data channel may not be transmitted. Contrarily, the UE supporting Rel-17 uplink data repetition transmission may determine a slot capable of uplink data repetition transmission as an available slot, and may count the number of transmissions during uplink data channel repetition transmission in the slot determined as an available slot. If uplink data channel repetition transmission is omitted in the slot determined as an available slot, the UE may postpone uplink data channel repetition transmission till a next available slot without counting the corresponding omitted repetition transmission and then transmit same.
- In order to determine an available slot as described above, if at least one symbol configured for a PUSCH by time domain resource allocation (TDRA) in a slot for PUSCH transmission overlaps a symbol for purposes other than uplink transmission (for example, downlink transmission), the corresponding slot is determined as an unavailable slot (for example, a slot other than an available slot, which is determined as being unavailable for PUSCH transmission). In addition, an available slot may be considered a resource for PUSCH transmission and an uplink resource for determining a transport block size (TBS) in PUSCH repetition transmission and multi-slot PUSCH transmission including one TB (TBoMS (transport block on multiple slots)).

2. PUSCH Repetition Transmission Type B (PUSCH Repetition Type B Transmission)

- As described above, a start symbol and a length of an uplink data channel may be determined in one slot by using a time domain resource assignment method, and a base station may notify the UE of the number of repetition transmissions, numberofrepetitions, through higher signaling (for example, RRC signaling) or L1 signaling (for example, DCI).
- First, nominal repetition of the uplink data channel is determined as follows based on the start symbol and the length of the configured uplink data channel. A slot in which an n-$^{th}$ nominal repetition starts is given by $$K_s + \left\lfloor \frac{S + n \cdot L}{N_{symb}^{slot}} \right\rfloor,$$

and a start symbol in the slot is given by $$\mathrm{mod}\left(S + n \cdot L,\ N_{symb}^{slot}\right).$$

A slot in which the n-$^{th}$ nominal repetition ends is given by $$K_s + \left\lfloor \frac{S + (n+1) \cdot L - 1}{N_{symb}^{slot}} \right\rfloor,$$

and an end symbol in the slot is given by $$\mathrm{mod}\left(S + (n+1) \cdot L - 1,\ N_{symb}^{slot}\right).$$

Here, n=0, . . . , numberofrepetitions−1, S is a start symbol of the configured uplink data channel, and L denotes a symbol length of the configured uplink data channel. $K_s$ denotes a slot in which PUSCH transmission starts, and $$N_{symb}^{slot}$$

denotes the number of symbols per slot.

- The UE may determine a specific OFDM symbol as an invalid symbol for the following cases for PUSCH repetition transmission type B.
- A symbol configured as a downlink by tdd-UL-DL-ConfigurationCommon or tdd-UL-DL-Configuration-Dedicated may be determined as an invalid symbol for PUSCH repetition transmission type B.
- Symbols indicated by ssb-PositionsInBurst in SIB1 for SSB reception in an unpaired spectrum (TDD spectrum) or ssb-PositionsInBurst in ServingCellConfig-Common, which is higher-layer signaling, may be determined as invalid symbols for PUSCH repetition transmission type B.
- Symbols indicated by pdcch-ConfigSIB1 in an MIB to transmit a control resource set associated with a Type0-PDCCH CSS set in the unpaired spectrum (TDD spectrum) may be determined as invalid symbols for PUSCH repetition transmission Type B.

When numberOfInvalidSymbolsForDL-UL-Switching, which is higher-layer signaling, is configured in the unpaired spectrum (TDD spectrum), as many symbols as numberOfInvalidSymbolsForDL-UL-Switching from the symbols configured as downlink symbols by tdd-UL-DL-ConfigurationCommon or tdd-UL-DL-ConfigurationDedicated may be determined as invalid symbols.

Additionally, an invalid symbol may be configured in a higher layer parameter (e.g., InvalidSymbolPattern). The higher layer parameter (e.g., InvalidSymbolPattern) may provide a symbol-level bitmap over one or two slots to configure invalid symbols. In the bitmap, "1" represents an invalid symbol. Additionally, a period and a pattern of the bitmap may be configured in a higher layer parameter (e.g., periodicityAndPattern). If the higher layer parameter (e.g., InvalidSymbolPattern) is configured and a parameter InvalidSymbolPattern-Indicator-ForDCIFormat0_1 or InvalidSymbolPattern-Indicator-ForDCIFormat0_2 indicates "1", the UE applies an invalid symbol pattern, and when the parameter indicates "0", the UE does not apply the invalid symbol pattern. If the higher layer parameter (e.g., InvalidSymbolPattern) is configured and the parameter InvalidSymbolPatternIndicator-ForDCIFormat0_1 or InvalidSymbolPatternIndicator-ForDCIFormat0_2 is not configured, the UE applies the invalid symbol pattern.

After the invalid symbol is determined, the UE may consider symbols other than the invalid symbol as valid symbols for each nominal repetition. When one or more valid symbols are included in each nominal repetition, the nominal repetition may include one or more actual repetitions. In this case, each of the actual repetitions includes a consecutive set of valid symbols available for PUSCH repetition transmission type B in one slot. When an OFDM symbol length of the nominal repetition is not 1, if the length of an actual repetition is 1, the UE may ignore transmission for the corresponding actual repetition.

Figure 12:
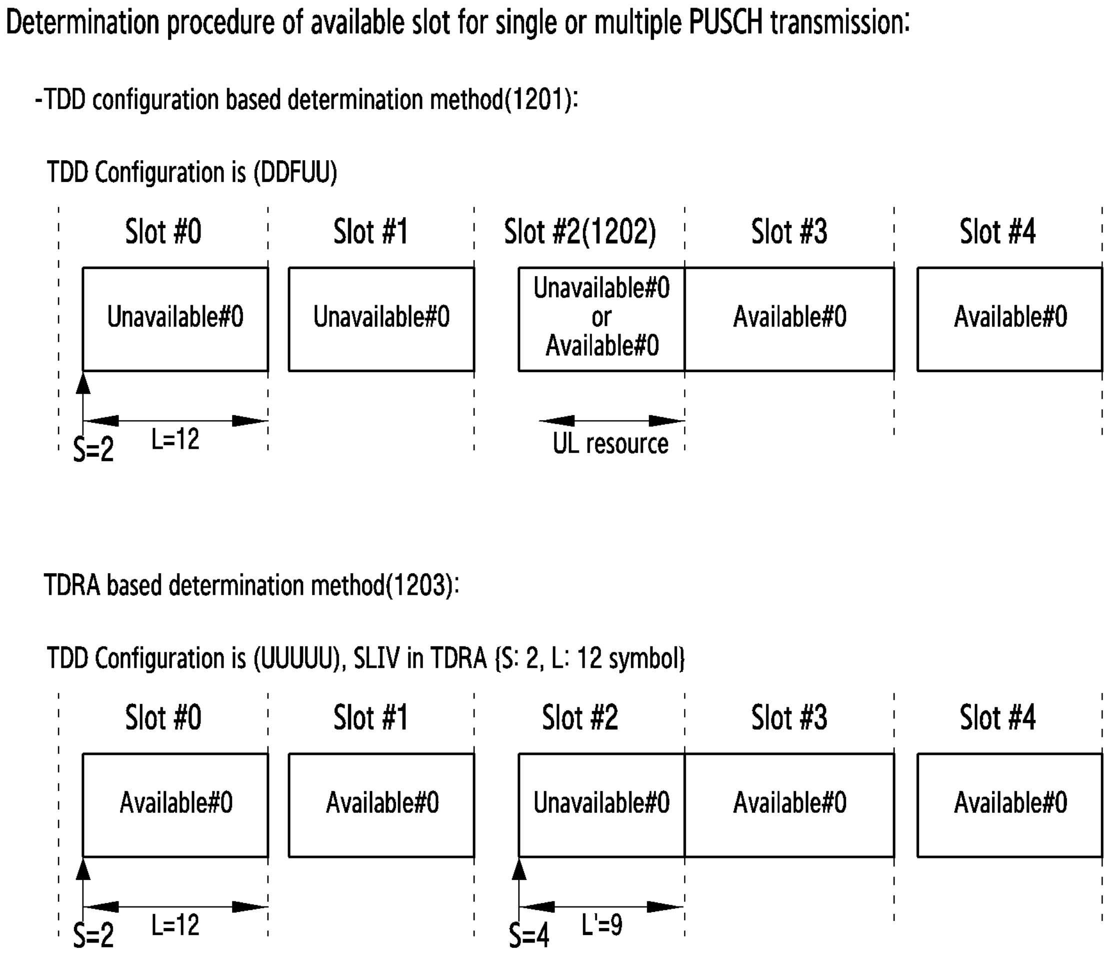
FIG. 12 illustrates a method for determining an available slot during PUSCH repetition type A transmission of a terminal in a 5G system according to an embodiment of the disclosure.

FIG. 12 illustrates a method for determining an available slot during PUSCH repetition type A transmission of a UE in a 5G system according to an embodiment of the disclosure.

Referring to FIG. 12, when a base station configures an uplink resource through higher-layer signaling (e.g., tdd-UL-DL-ConfigurationCommon or tdd-UL-DL-ConfigurationDedicated) or L1 signaling (e.g., dynamic slot format indicator), the base station and a UE may determine an available slot for the configured uplink resource according to the following two methods.

(1) A method for determining an available slot based on a TDD configuration (2) A method for determining an available slot by considering a TDD configuration and time domain resource allocation (TDRA), and configured grant (CG) configuration or activation DCI As an example of a method for determining an available slot based on a TDD configuration, in FIG. 12, when a TDD configuration is configured to be "DDFUU" through higher-layer signaling, the base station and the UE may determine, as available slots, slot #3 and slot #4, which are configured to be uplink "U" based on the TDD configuration (indicated by reference numeral 1201). In this case, slot #2 1202 configured to be flexible slot "F" (1305 of FIG. 13) based on the TDD configuration may be determined as an unavailable slot or an available slot and, for example, may be predefined through a base station configuration.

As an example of a method for determining an available slot by considering a TDD configuration and time domain resource allocation (TDRA), and CG configuration or activation DCI, in FIG. 12, when a TDD configuration is configured to be "UUUUU" through higher-layer signaling and a start and length indicator value (SLIV) of PUSCH transmission is configured to be {S: 2, L: 12 symbols} through L1 signaling, the base station and the UE may determine, as available slots, slot #0, slot #1, slot #3, and slot #4 that satisfy an SLIV of a PUSCH for the configured uplink slot "U". In this case, the base station and the UE may determine, as an unavailable slot, slot #2 ('L=9'≤SLIV 'L=12') that does not satisfy an SLIV, which is a TDRA condition for PUSCH transmission (indicated by reference numeral 1203). This is merely an example and is not limited to PUSCH transmission, but may also be applied to PUCCH transmission, PUSCH/PUCCH repetition transmission, nominal repetition of PUSCH repetition type B, and TBoMS.

Figure 13:
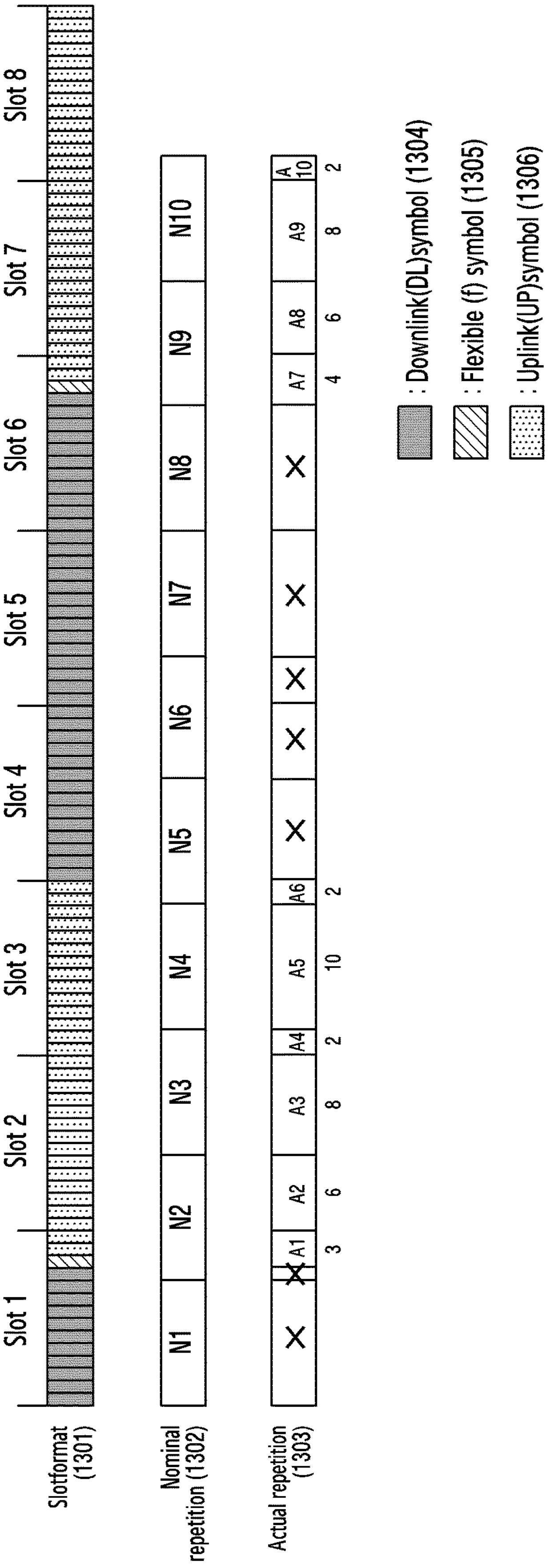
FIG. 13 illustrates physical uplink shared channel (PUSCH) repetition type B transmission in a wireless communication system according to an embodiment of the disclosure.

FIG. 13 illustrates PUSCH repetition transmission type B in a wireless communication system according to an embodiment of the disclosure.

Referring to FIG. 13, it illustrates a case in which a UE receives a configuration of transmission start symbol S as 0, transmission symbol length L as 10, and the number of repetition transmissions as 10 with respect to nominal repetition, which may be expressed as N1 to N10 in FIG. 13 (indicated by reference numeral 1302). In this case, the UE may determine actual repetition by determining an invalid symbol based on a slot format 1301, which may be represented as A1 to A10 in the drawing (indicated by reference numeral 1303). In this case, according to the above-described invalid symbol and actual repetition determination method, when PUSCH repetition type B is not transmitted in a symbol in which a slot format is determined to be a downlink (DL) 1304, and there is a slot boundary within the nominal repetition, the nominal repetition may be divided into two actual repetitions based on the slot boundary and transmitted. For example, A1 which indicates a first actual repetition may include three OFDM symbols, and A2 which may be transmitted next may include six OFDM symbols.

In addition, with regard to PUSCH repeated transmission, additional methods may be defined in NR Release 16 with regard to UL 1306 grant-based PUSCH transmission and configured grant-based PUSCH transmission, across slot boundaries, as follows:

Method 1 (mini-slot level repetition): through one UL grant, two or more PUSCH repetition transmissions are scheduled inside one slot or across the boundary of consecutive slots. In connection with method 1, time domain resource allocation information inside DCI indicates resources of the first repetition transmission. In addition, time domain resource information of remaining repetition transmissions may be determined according to time domain resource information of the first repetition transmission, and the uplink or downlink direction determined with regard to each symbol of each slot. Each repetition transmission occupies consecutive symbols.

Method 2 (multi-segment transmission): through one UL grant, two or more PUSCH repetition transmissions are scheduled in consecutive slots. Transmission no. 1 is designated for each slot, and the start point or repetition length differs between respective transmissions. In method 2, time domain resource allocation information inside DCI indicates the start point and repetition length of all repetition transmissions. In the case of performing repetition transmissions inside a single slot through method 2, if there are multiple bundles of consecutive uplink symbols in the corresponding slot, respective repetition transmissions may be performed with regard to respective uplink symbol bundles. If there is a single bundle of consecutive uplink symbols in the corresponding slot, PUSCH repetition transmission is performed once according to the method of NR Release 15.

Method 3: two or more PUSCH repetition transmissions are scheduled in consecutive slots through two or more UL grants. Transmission no. 1 may be designated with regard to each slot, and the nth UL grant may be received before PUSCH transmission scheduled by the (n-1)th UL grant is over.

Method 4: through one UL grant or one configured grant, one or multiple PUSCH repetition transmissions inside a single slot, or two or more PUSCH repetition transmissions across the boundary of consecutive slots may be supported. The number of repetitions indicated to the UE by the base station is only a nominal value, and the UE may actually perform a larger number of PUSCH repetition transmissions than the nominal number of repetitions. Time domain resource allocation information inside DCI or configured grant refers to resources of the first repetition transmission indicated by the base station. Time domain resource information of remaining repetition transmissions may be determined with reference to resource information of the first repetition transmission and the uplink or downlink direction of symbols. If time domain resource information of repetition transmission indicated by the base station spans a slot boundary or includes an uplink/downlink switching point, the corresponding repetition transmission may be divided into multiple repeated transmissions. One repetition transmission may be included in one slot with regard to each uplink period.

[PUSCH: Frequency Hopping Process]

Hereinafter, frequency hopping of a physical uplink shared channel (PUSCH) in a 5G system will be described below.

5G supports two kinds of PUSCH frequency hopping methods with regard to each PUSCH repeated transmission type. First of all, in PUSCH repeated transmission type A, intra-slot frequency hopping and inter-slot frequency hopping are supported, and in PUSCH repeated transmission type B, inter-repetition frequency hopping and inter-slot frequency hopping are supported.

The intra-slot frequency hopping method supported in PUSCH repetition type A transmission may include a method in which a UE transmits allocated resources in the frequency domain, after changing the same by a configured frequency offset, by two hops in one slot. The start RB of each hop in connection with intra-slot frequency hopping may be expressed by Equation 3 below.

$$RB_{start}=\begin{cases}RB_{start} & i=0\\ (RB_{start}+RB_{offset})\bmod N_{BWP}^{size} & i=1\end{cases}\qquad\text{Equation 3}$$

In Equation 3, i=0 and i=1 denotes the first and second hops, respectively, and RBstart denotes the start RB in a UL BWP and is calculated from a frequency resource allocation method. RBoffset denotes a frequency offset between two hops through an upper layer parameter. The number of symbols of the first hop may be represented by $$\lfloor N_{symb}^{PUSCH,s}/2\rfloor,$$

and number of symbols of the second hop may be represented by $$N_{symb}^{PUSCH,s}-\lfloor N_{symb}^{PUSCH,s}/2\rfloor.$$

$$N_{symb}^{PUSCH,S}$$

is the length of PUSCH transmission in one slot and is expressed by the number of OFDM symbols.

Next, the inter-slot frequency hopping method supported in PUSCH repetition type A and type B transmissions is a method in which the UE transmits allocated resources in the frequency domain, after changing the same by a configured frequency offset, in each slot. The start RB during $$n_s^\mu$$

slots in connection with inter-slot frequency hopping may be expressed by Equation 4 below.

$$RB_{start}(n_s^\mu)=\begin{cases}RB_{start} & n_s^\mu\bmod 2=0\\ (RB_{start}+RB_{offset})\bmod N_{BWP}^{size} & n_s^\mu\bmod 2=1\end{cases}\qquad\text{Equation 4}$$

In Equation 4, $$n_s^\mu$$

denotes the current slot number during multi-slot PUSCH transmission, and RBstart denotes the start RB inside a UL BWP and may be calculated from a frequency resource allocation method. RBoffset may denote a frequency offset between two hops through an upper layer parameter.

The inter-repetition frequency hopping method supported in PUSCH repetition type B transmission is a method in which resources allocated in the frequency domain regarding one or multiple actual repetitions in each nominal repetition are moved by a configured frequency offset and then transmitted. The index RBstart (n) of the start RB in the frequency domain regarding one or multiple actual repetitions in the nth nominal repetition may follow Equation 5 below.

$$RB_{start}(n)=\begin{cases}RB_{start} & n\bmod 2=0\\ (RB_{start}+RB_{offset})\bmod N_{BWP}^{size} & n\bmod 2=1\end{cases}\qquad\text{Equation 5}$$

In Equation 5, n denotes the index of nominal repetition, and RBoffset denotes an RB offset between two hops through an upper layer parameter.

[PUSCH: Related to Transmission Power]

Hereinafter, a method for determining transmission power of an uplink data channel in a 5G system is specifically described.

In the 5G system, transmission power of an uplink data channel may be determined through the following Equation 6.

Equation 6

$$P_{PUSCH,b,f,c}(i,j,q_d,l) = \min\left\{\begin{array}{c} P_{CMAX,f,c}(i), \\ P_{O\_PUSCH,b,f,c}(j) + 10\log_{10}\left(2^{\mu}\cdot M^{PUSCH}_{RB,b,f,c}(i)\right) + \\ \alpha_{b,j,c}(j)\cdot PL_{b,f,c}(q_d) + \Delta_{TF,b,f,c}(i) + f_{b,f,c}(i,l)) \end{array}\right\}$$

In Equation 6, j indicates a grant type of a PUSCH, specifically, j=0 indicates a PUSCH grant for a random access response, j=1 indicates a configured grant, and j € {2,3, . . . J−1} indicates a dynamic grant. $P_{CMAX,f,c}(i)$ indicates the maximum output power configured to the UE for carrier f of support cell c for PUSCH transmission occasion i. $P_{O\_PUSCH,b,f,c}(j)$ is a parameter consisting of the sum of $P_{O\_NORAMAL\_PUSCH,f,c}(j)$, which is configured as a higher layer parameter, and $P_{O\_UE\_PUSCH,b,f,c}(j)$, which may be determined through a higher layer configuration and SRI (in case of a dynamic grant PUSCH).

$$M^{PUSCH}_{RB,b,f,c}(i)$$

indicates a bandwidth for resource allocation expressed as the number of resource blocks for PUSCH transmission occasion i, and $\Delta_{TF,b,f,c}(i)$ indicates a value determined depending on the type of information transmitted via a PUSCH and a modulation coding scheme (MCS) (for example, whether UL-SCH is included or CSI is included, or the like). $\alpha_{b,f,c}(j)$ indicates a value which may be determined (in case of a dynamic grant PUSCH) through a higher layer configuration and an SRS resource indicator (SRI) as a value for compensating for path loss. $PL_{b,f,c}(q_d)$ indicates a downlink path loss estimate estimated by the UE through a reference signal, a reference signal index of which is qd, and the reference signal index qd may be determined by the UE through a higher layer configuration and an SRI (in case of a dynamic grant PUSCH or a configured grant PUSCH based on ConfiguredGrantConfig that does not include a higher layer configuration rrc-ConfiguredUplinkGrant (type 2 configured grant PUSCH)) or through a higher layer configuration. $f_{b,f,c}(i, l)$ is a closed loop power adjustment value, and may be supported in both accumulation and absolute manners. If a higher layer parameter tpc-Accumulation is not configured for the UE, the closed loop power adjustment value may be determined in the accumulation manner. In this case, between a KPUSCH(i-i0)-1 symbol for transmitting PUSCH transmission occasion i-i0 and a KPUSCH (i) symbol for transmitting PUSCH transmission occasion i, added to the closed loop power adjustment value for the previous PUSCH transmission occasion i-i0, $f_{b,f,c}(i, l)$ is determined as $$f_{b,f,c}(i-i_0,l) + \sum_{m=0}^{c(D_i)-1}\delta_{PUSCH,b,f,c}(m,l)$$

which is the sum of TPC command values for closed loop index 1 received through DCI. If the higher layer parameter tpc-Accumulation is configured for the UE, $f_{b,f,c}(i, l)$ is determined as a TPC command value $\delta_{PUSCH,b,f,c}(i, l)$ for the closed loop index 1 received through the DCI. If a higher layer parameter two PUSCH-PC-AdjustmentStates is configured for the UE, the closed loop index I may be configured to be 0 or 1 and the value may be determined through the higher layer configuration and the SRI (in case of a dynamic grant PUSCH). A mapping relationship between a TPC command field and a TPC value $\delta_{PUSCH,b,f,c}$ in the DCI according to the accumulation manner and the absolute manner may be defined as shown in Table 33 below.

TABLE 33

| TPC command field | Accumulated $\delta_{PUSCH,b,f,c}$ [dB] | Absolute $\delta_{PUSCH,b,f,c}$ [dB] |
|---|---|---|
| 0 | −1 | −4 |
| 1 | 0 | −1 |
| 2 | 1 | 1 |
| 3 | 3 | 4 |

[Regarding UE Capability Report]

In LTE and NR, a UE may perform a procedure in which, while being connected to a serving base station, the UE may report capability supported by the UE to the corresponding base station. In the following description, the above-described procedure will be referred to as a UE capability report.

According to an embodiment of the disclosure, the base station may transfer a UE capability enquiry message to the UE in a connected state so as to request a capability report. The message may include a UE capability request with regard to each radio access technology (RAT) type of the base station. The RAT type-specific request may include supported frequency band combination information and the like. In addition, in the case of the UE capability enquiry message, UE capability with regard to multiple RAT types may be requested through one RRC message container transmitted by the base station, or the base station may transfer a UE capability enquiry message including multiple UE capability requests with regard to respective RAT types. For example, a capability enquiry may be repeated multiple times in one message, and the UE may configure a UE capability information message corresponding thereto and report the same multiple times.

According to an embodiment of the disclosure, in next-generation mobile communication systems, a UE capability request may be made regarding multi-RAT dual connectivity (MR-DC), such as NR, LTE, E-UTRA-NR dual connectivity (EN-DC). The UE capability enquiry message may be transmitted initially after the UE is connected to the base station, in general, but may be requested in any condition if needed by the base station.

According to an embodiment of the disclosure, upon receiving the UE capability report request from the base station, the UE may configure UE capability according to band information and RAT type requested by the base station. The method in which the UE configures UE capability in an NR system is summarized below:

1. If the UE receives a list regarding LTE and/or NR bands from the base station at a UE capability request, the UE may construct band combinations (BCs) regarding EN-DC and NR standalone (SA). For example, the UE may configure a candidate list of BCs regarding EN-DC and NR SA, based on bands received from the base station at a request through FreqBandList. In addition, bands may have priority in the order described in FreqBandList.

2. If the base station has set "eutra-nr-only" flag or "eutra" flag and requested a UE capability report, the UE may remove everything related to NR SA BCs from the configured BC candidate list. Such an operation may occur only if an LTE base station (eNB) requests "eutra" capability.

3. The UE may then remove fallback BCs from the BC candidate list configured in the above step. As used herein, a fallback BC may refer to a BC that can be obtained by removing a band corresponding to at least one SCell from a specific BC, and since a BC before removal of the band corresponding to at least one SCell can already cover a fallback BC, the same may be omitted. This step is applied in MR-DC as well, that is, LTE bands are also applied. BCs remaining after the above step constitute the final "candidate BC list".

4. The UE may select BCs appropriate for the requested RAT type from the final "candidate BC list" and select BCs to report. In this step, the UE may configure supportedBandCombinationList in a determined order. For example, the UE configures BCs and UE capability to report according to a preconfigured rat-Type order. (nr→eutra-nr→eutra). In addition, the UE may configure featureSetCombination regarding the configured supportedBandCombinationList, and configure a list of "candidate feature set combinations" from a candidate BC list from which a list regarding fallback BCs (including capability of the same or lower step) is removed. The "candidate feature set combinations" may include all feature set combinations regarding NR and EUTRA-NR BCs, and may be acquired from feature set combinations of containers of UE-NR-Capabilities and UE-MRDC-Capabilities.

5. If the requested RAT type is eutra-nr and has an influence, featureSetCombinations may be included on both containers of UE-MRDC-Capabilities and UE-NR-Capabilities. However, the feature set of NR may be included only in UE-NR-Capabilities.

According to an embodiment of the disclosure, after the UE capability is configured, the UE may transfer a UE capability information message including the UE capability to the base station. The base station may perform scheduling and transmission/reception management appropriate for the UE, based on the UE capability received from the UE.

[Related to NC-JT]

According to an embodiment of the disclosure, non-coherent joint transmission (NC-JT) may be used for a UE to receive a PDSCH from multiple TRPs.

According to an embodiment of the disclosure, unlike the existing communication system, a 5G wireless communication system may support not only a service requiring a high transmission rate, but also both a service having a very short transmission latency and a service requiring high connection density. Cooperative communication (coordinated transmission) between each cell, transmission and reception point (TRP), and/or beam in a wireless communication network including multiple cells, TRPs, or beams may satisfy various service requirements by increasing the strength of a signal received by the UE or by efficiently controlling interference between each cell, TRP, and/or beam.

According to an embodiment of the disclosure, joint transmission (JT) is a representative transmission technology for the above-mentioned cooperative communication, and is a technology for transmitting a signal to one UE through multiple different cells, TRPs, and/or beams so as to increase the strength or throughput of a signal received by the UE. In this case, the characteristics of a channel between each cell, TRP, and/or beam and the UE may be significantly different, and more particularly, in the case of non-coherent joint transmission (NC-JT) that supports non-coherent precoding between each cell, TRP, and/or beam, individual precoding, MCS, resource allocation, TCI indication, or the like may be necessary depending on the channel characteristics for each link between each cell, TRP, and/or beam and the UE.

The above-described NC-JT transmission may be applied to at least one channel among a downlink data channel (PDSCH), a downlink control channel (PDCCH), an uplink data channel (PUSCH), and an uplink control channel (PUCCH). During PDSCH transmission, transmission information, such as precoding, MCS, resource allocation, and/or TCI, may be indicated through DL DCI. For NC-JT transmission, the transmission information is required to be indicated independently for each cell, TRP, and/or beam. This is a main factor for increasing payload required for DL DCI transmission, and may adversely affect reception performance of a PDCCH for transmitting DCI. Therefore, it is necessary to carefully design a tradeoff between a DCI amount and control information reception performance for JT support of a PDSCH.

Figure 14:
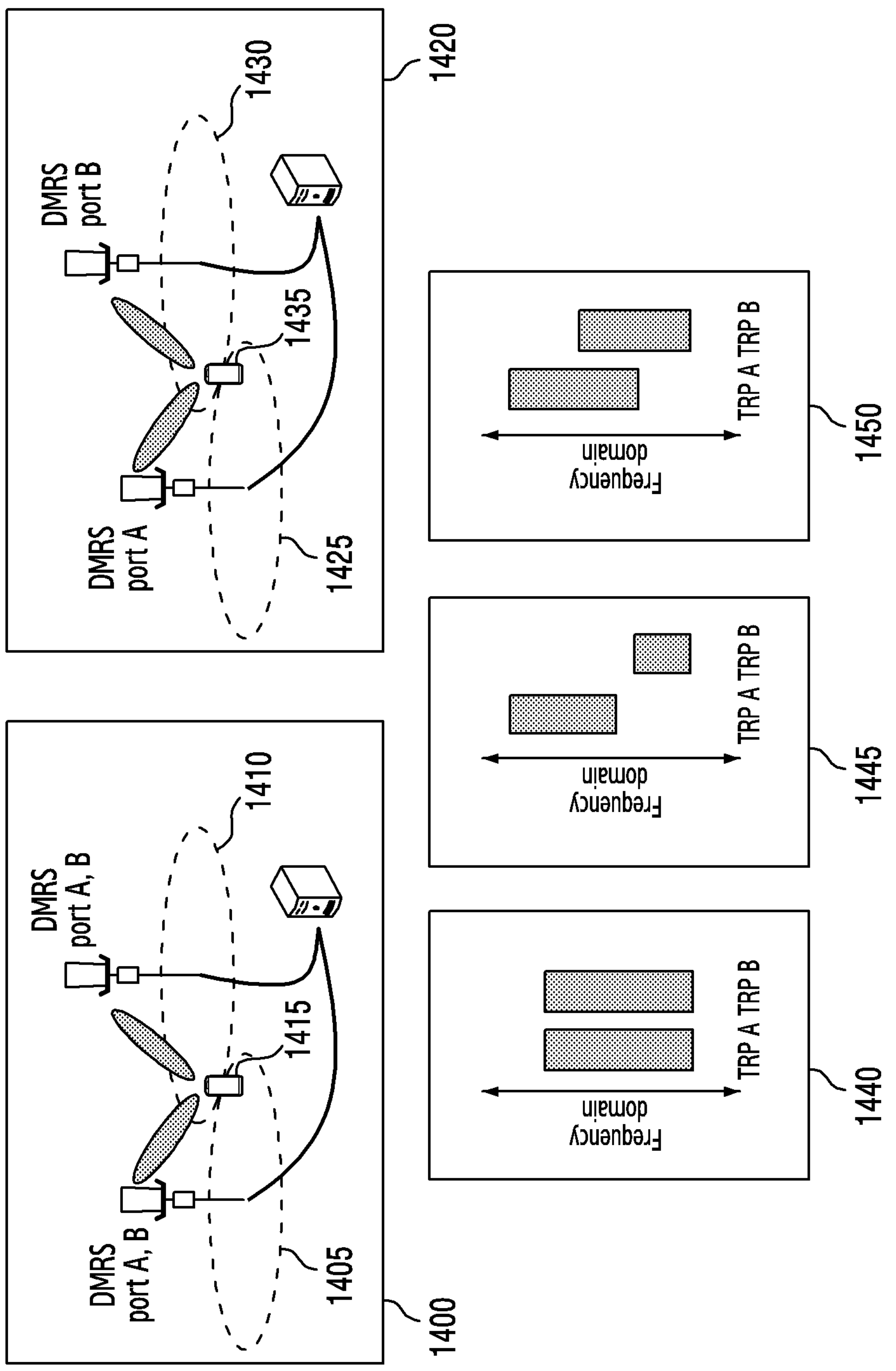
FIG. 14 illustrates an antenna port configuration and resource allocation for cooperative communication in a wireless communication system according to an embodiment of the disclosure.

FIG. 14 illustrates an antenna port configuration and resource allocation for transmitting a PDSCH by using cooperative communication in a wireless communication system according to an embodiment of the disclosure.

Referring to FIG. 14, an example for PDSCH transmission is described for each technique of joint transmission (JT), and examples for allocating a radio resource for each TRP are illustrated.

Referring to FIG. 14, an example 1400 of coherent joint transmission (C-JT) supporting coherent precoding between cells, TRPs, and/or beams is illustrated.

According to an embodiment of the disclosure, in the case of C-JT, single piece of data (PDSCH) is transmitted by TRP A 1405 and TRP B 1410 to a UE 1415, and multiple TRPs may perform joint precoding. This may indicate that a DMRS is transmitted through the same DMRS ports so that the TRP A 1405 and the TRP B 1410 transmit the same PDSCH. For example, each of the TRP A 1405 and the TRP B 1410 may transmit a DMRS to the UE through DMRS port A and DMRS port B. In this case, the UE may receive one piece of DCI for receiving one PDSCH demodulated based on the DMRS transmitted through the DMRS port A and DMRS port B.

FIG. 14 illustrates an example 1420 of non-coherent joint transmission (NC-JT) supporting non-coherent precoding between cells, TRPs, and/or beams for PDSCH transmission according to an embodiment.

According to an embodiment of the disclosure, in the case of NC-JT, a PDSCH is transmitted to a UE 1435 for each cell 1425 or 1430, TRP, and/or beam, and individual precoding may be applied to each PDSCH. Each cell, TRP, and/or beam may transmit, to the UE, different PDSCHs or different PDSCH layers, so as to improve throughput compared to transmission via a single cell, TRP, and/or beam. In addition, each cell, TRP, and/or beam may repeatedly transmit the same PDSCH to the UE, so as to improve reliability compared to transmission via a single cell, TRP, and/or beam. For convenience of description, hereinafter, a cell, a TRP, and/or a beam are collectively referred to as a TRP.

In this case, various radio resource allocations may be considered for the PDSCH transmission, such as a case 1440 where frequency and time resources used in multiple TRPs are all the same, a case 1445 where frequency and time resources used in multiple TRPs do not overlap at all, and a case 1450 where frequency and time resources used in multiple TRPs partially overlap.

For support of NC-JT, pieces of DCIs of various forms, structures, and relationships may be considered to simultaneously allocate multiple PDSCHs to one UE.

Figure 15:
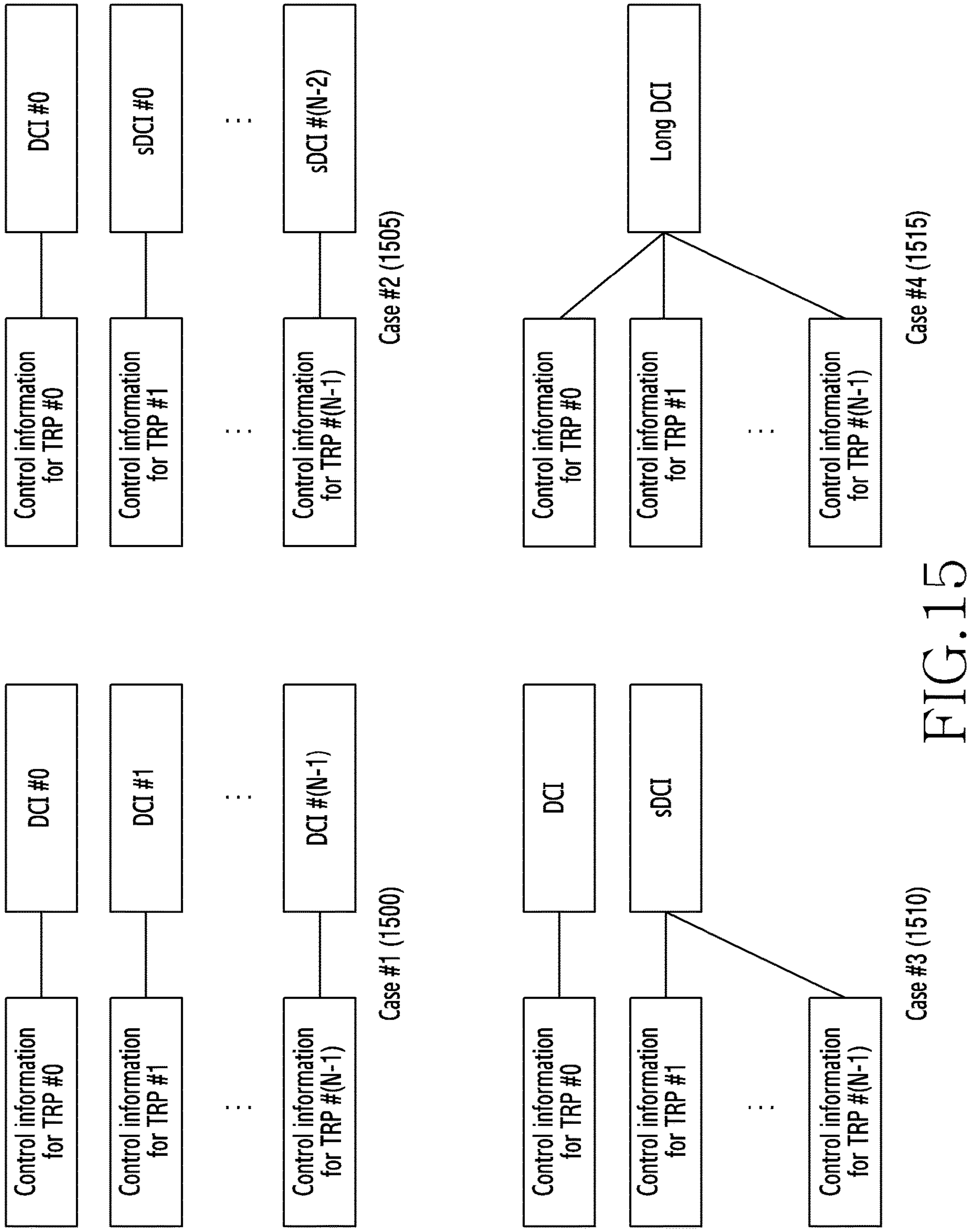
FIG. 15 illustrates a downlink control information (DCI) configuration for cooperative communication in a wireless communication system according to an embodiment of the disclosure.

FIG. 15 illustrates a configuration of downlink control information (DCI) for NC-JT in which each TRP transmits a different PDSCH or a different PDSCH layer to a UE in a wireless communication system according to an embodiment of the disclosure.

Referring to FIG. 15, case #1 1500 according to an embodiment is an example in which, while different N−1 PDSCHs are transmitted from additional N−1 TRPs (TRP #1 to TRP #(N−1)) in addition to a serving TRP (TRP #0) used for single PDSCH transmission, control information regarding the PDSCHs transmitted from the additional N−1 TRPs is transmitted independently from control information regarding a PDSCH transmitted from the serving TRP. In other words, a UE may obtain control information regarding the PDSCHs transmitted from the different TRPs (TRP #0 to TRP #(N−1)), via independent pieces of DCI (DCI #0 to DCI #(N−1)). Formats of the independent pieces of DCI may be the same as or different from each other, and payloads of the pieces of DCI may also be the same as or different from each other. In case #1 described above, control of each PDSCH or the degree of freedom of allocation may be fully guaranteed, but reception performance may deteriorate due to an occurrence of coverage difference for each piece of DCI when the pieces of DCI are transmitted from different TRPs.

According to an embodiment of the disclosure, case #2 1505 shows an example in which, while different N−1 PDSCHs are transmitted from additional N−1 TRPs (TRP #1 to TRP #(N−1)) in addition to a serving TRP (TRP #0) used for single PDSCH transmission, each of pieces of control information (DCI) regarding PDSCHs of the additional N−1 TRPs is transmitted, and each of the pieces of DCI is dependent on control information regarding a PDSCH transmitted from the serving TRP.

For example, DCI #0 that is control information regarding a PDSCH transmitted from the serving TRP (TRP #0) includes all information elements of DCI format 1_0, DCI format 1_1, and DCI format 1_2, but shortened DCI (hereinafter, sDCI) (sDCI #0 to sDCI #(N−2)) that is control information regarding PDSCHs transmitted from cooperative TRPs (TRP #1 to TRP #(N−1)) may include some of the information elements of DCI format 1_0, DCI format 1_1, or DCI format 1_2. Accordingly, since the sDCI for transmitting the control information regarding the PDSCHs transmitted from the cooperative TRPs has a small payload compared to normal DCI (nDCI) for transmitting the control information regarding the PDSCH transmitted from the serving TRP, the sDCI may include reserved bits compared to the nDCI.

According to an embodiment of the disclosure, in case #2, control of each PDSCH or the degree of freedom of allocation may be limited depending on the content of the information elements included in the sDCI, but reception performance of the sDCI is excellent compared to the nDCI, and thus, a probability in which a coverage difference for each piece of DCI occurs may be reduced.

According to an embodiment of the disclosure, case #3 1510 shows an example in which, while different N−1 PDSCHs are transmitted from additional N−1 TRPs (TRP #1 to TRP #(N−1)) in addition to a serving TRP (TRP #0) used for single PDSCH transmission, one piece of control information regarding the PDSCHs of the additional N−1 TRPs is transmitted and the DCI is dependent on control information regarding a PDSCH transmitted from the serving TRP.

For example, DCI #0 that is control information regarding a PDSCH transmitted from the serving TRP (TRP #0) may include all information elements of DCI format 1_0, DCI format 1_1, and DCI format 1_2. In the case of control information regarding PDSCHs transmitted from cooperative TRPs (TRP #1 to TRP #(N−1)), only some of the information elements of DCI format 1_0, DCI format 1_1, or DCI format 1_2 may be collected in one piece of "secondary" DCI (sDCI) and transmitted. For example, the sDCI may include at least one piece of information of the cooperative TRPs, among pieces of HARQ-related information, such as frequency domain resource assignment, time domain resource assignment, and an MCS. In addition, information not included in the sDCI, such as a bandwidth part (BWP) indicator or a carrier indicator, may be determined based on the DCI (DCI #0, normal DCI, nDCI) of the serving TRP.

According to an embodiment of the disclosure, in case #3 1510, control of each PDSCH or the degree of freedom of allocation may be limited depending on the content of the information elements included in the sDCI, but it is possible to adjust reception performance of the sDCI, and the complexity of DCI blind decoding of the UE may be reduced compared to case #1 1500 or case #2 1505.

According to an embodiment of the disclosure, case #4 1515 is an example in which, while different N−1 PDSCHs are transmitted from additional N−1 TRPs (TRP #1 to TRP #(N−1)) in addition to a serving TRP (TRP #0) used for single PDSCH transmission, control information regarding the PDSCHs transmitted from the additional N−1 TRPs is transmitted on the same DCI (long DCI) as control information regarding a PDSCH transmitted from the serving TRP. In other words, the UE may obtain, through a single piece of DCI, the control information regarding the PDSCHs transmitted from the different TRPs (TRP #0 to TRP #(N−1)). In case #4 1515, the complexity of DCI blind decoding of the UE may not be increased, but control of a PDSCH or the degree of freedom of allocation may be low, for example, the number of cooperative TRPs may be limited, according to long DCI payload restriction.

In the description and embodiments of the disclosure below, the sDCI may denote various types of auxiliary DCI, such as shortened DCI, secondary DCI, and normal DCI (the DCI format 1_0 to 1_1 described above) including PDSCH control information transmitted from a cooperative TRP, and unless a limitation is specifically stated, the description may be similarly applied to the various types of auxiliary DCI.

In the description and embodiments of the disclosure below, the above-described case #1 1500, case #2 1505, and case #3 1510, in which one or more pieces of DCI (PDCCHs) are used to support NC-JT, may be distinguished as multiple PDCCH-based NC-JT. The above-described case #4 1515, in which a single piece of DCI (PDCCH) is used to support NC-JT, may be distinguished as single PDCCH-based NC-JT. In multiple PDCCH-based PDSCH transmission, a CORESET in which DCI of a serving TRP (TRP #0) is scheduled and a CORESET in which pieces of DCI of cooperative TRPs (TRP #1 to TRP #(N−1)) are scheduled may be distinguished. A method of distinguishing CORESETs may include a method of distinguishing CORESETs via a higher layer indicator for each CORESET, a method of distinguishing CORESETs via a beam configuration for each CORESET, or the like. In addition, in the single PDCCH-based NC-JT, a single piece of DCI schedules a single PDSCH having multiple layers instead of scheduling multiple PDSCHs, and the above-described multiple layers may be transmitted from multiple TRPs. In this case, a connection relationship between a layer and a TRP transmitting the layer may be indicated via a transmission configuration indicator (TCI) indication regarding the layer.

In embodiments of the disclosure, a "cooperative TRP" may be replaced by any one of various terms, such as a "cooperative panel" or a "cooperative beam", when actually applied.

In embodiments of the disclosure, the phrase "when NC-JT is applied" may be variously interpreted depending on a situation, for example, "when the UE receives one or more PDSCHs at the same time in one BWP", "when the UE receives a PDSCH based on two or more TCI indications at the same time in one BWP", and "when a PDSCH received by the UE is associated with at least one DMRS port group", but one expression is used for convenience of description.

In the disclosure, a radio protocol structure for NC-JT may be variously used depending on a TRP deployment scenario. For example, when there is no or small backhaul delay between cooperative TRPs, a method (CA-like method) using a structure based on MAC layer multiplexing similar to S10 of FIG. 4 is possible. On the other hand, when the backhaul delay between the cooperative TRPs is too large to be ignored (for example, at least 2 ms of time is required to exchange information, such as CSI, scheduling, and HARQ-ACK, between the cooperative TRPs), a method (DC-like method) of ensuring robust characteristics against delay by using an independent structure for each TRP from an RLC layer is possible similar to S20 of FIG. 4.

According to an embodiment of the disclosure, the UE supporting C-JT/NC-JT may receive, from a higher layer configuration, a C-JT and/or NC-JT-related parameter or setting value, and set an RRC parameter of the UE, based on the C-JT and/or NC-JT-related parameter or setting value. For the higher layer configuration, the UE may use a UE capability parameter, for example, tci-StatePDSCH. For example, the UE capability parameter (e.g., tci-StatePDSCH) may define TCI states for the purpose of PDSCH transmission. The number of TCI states may be configured to be 4, 8, 16, 32, 64, or 128 in FR1, and may be configured to be 64 or 128 in FR2. Among the configured number, up to 8 states that may be indicated by 3 bits of a TCI field of DCI may be configured through an MAC CE message. The maximum value 128 may be referred to as a value indicated by maxNumberConfiguredTCIstatesPerCC in the parameter tci-StatePDSCH included in capability signaling of the UE. As such, a series of configuration processes from a higher layer configuration to an MAC CE configuration may be applied to a beamforming indication or beamforming change command for at least one PDSCH in one TRP.

[Related to SBFD (XDD)]

In a 5G mobile communication service, additional coverage extension technology has been introduced compared to an LTE communication service, but in an actual 5G mobile communication service, a TDD system suitable for a service having a high proportion of downlink traffic may be generally used. In addition, as a center frequency increases to expand a frequency band, the coverage of a base station and a UE decreases, and thus coverage enhancement may be a core requirement for the 5G mobile communication service. More particularly, in order to support a service in which a transmission power of the UE is generally lower than a transmission power of the base station and the proportion of downlink traffic is high, and since the ratio of a downlink is higher than that of an uplink in a time domain, coverage enhancement of an uplink channel may be important. Examples of a method of physically enhancing the coverage of an uplink channel between a base station and a UE may include a method of increasing a time resource of the uplink channel, a method of lowering a center frequency, and a method of increasing transmission power of the UE. However, changing a frequency may have a limitation since a frequency band is determined for each network operator. In addition, increasing a maximum transmission power of the UE to enhance coverage may have a limitation since a maximum transmission power of the UE is regulated to reduce interference.

Therefore, for coverage enhancement of the base station and the UE, uplink and downlink resources may be not only divided in a time domain according to traffic proportions of uplink and downlink as in a TDD system but also divided in a frequency domain as in an FDD system. In an embodiment of the disclosure, a system for flexibly dividing uplink and downlink resources in a time domain and a frequency domain may be referred to as an XDD system, a flexible TDD system, a hybrid TDD system, a TDD-FDD system, or a hybrid TDD-FDD system, and for convenience of description, the system is described as an XDD system in the disclosure. According to an embodiment of the disclosure, X in XDD may denote a time or a frequency.

Figure 16:
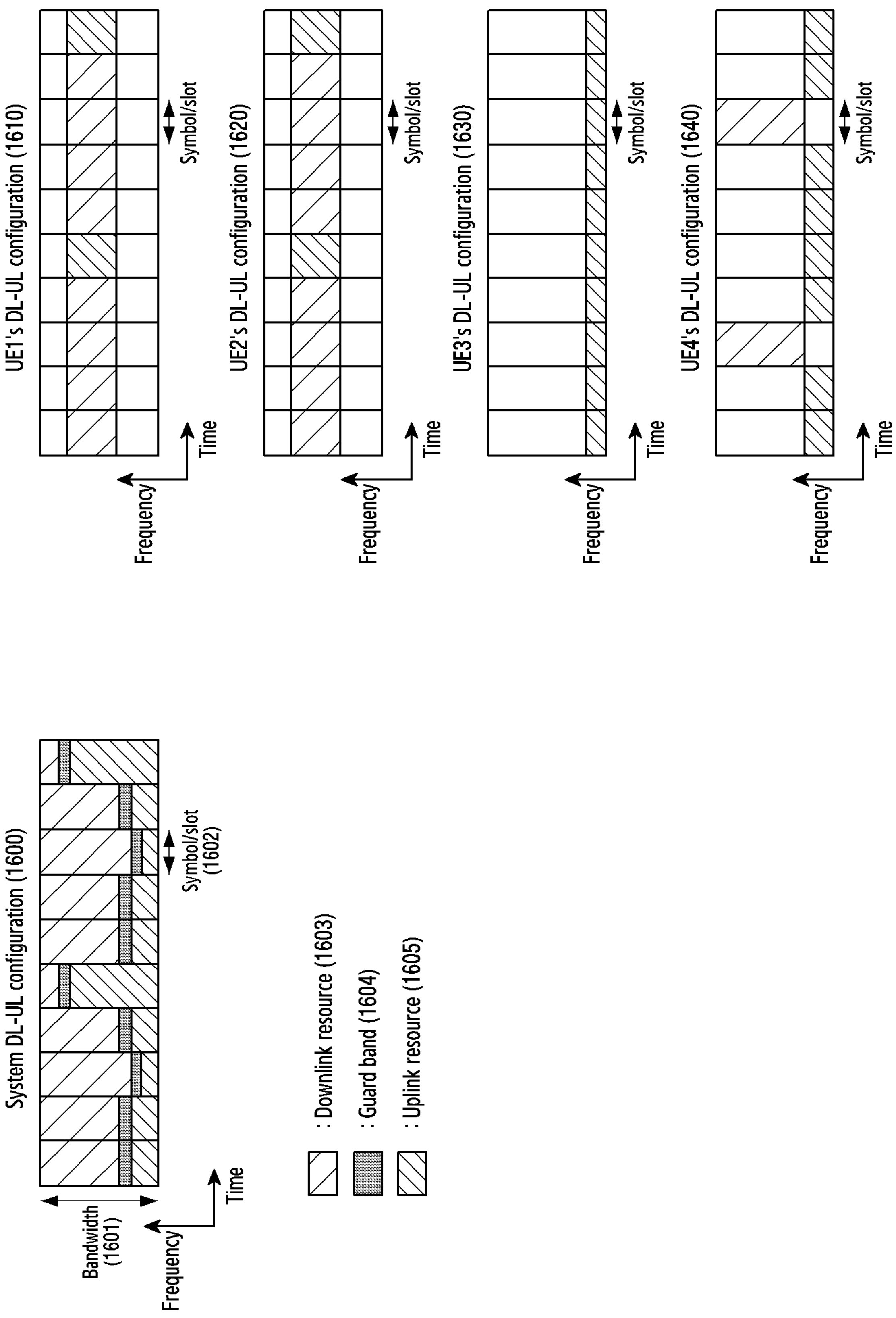
FIG. 16 illustrates an uplink-downlink resource configuration of an XDD system in which uplink and downlink resources are flexibly distributed in time and frequency domains according to an embodiment of the disclosure.

FIG. 16 illustrates an uplink-downlink resource configuration of an XDD system in which uplink and downlink resources are flexibly divided in time and frequency domains according to an embodiment of the disclosure.

Referring to FIG. 16, from the viewpoint of a base station, in an overall uplink-downlink configuration 1600 of an XDD system, in an entire frequency band 1601, a resource may be flexibly allocated for each symbol or slot 1602, according to traffic proportions of uplink and downlink. However, this is merely an example, and in the disclosure, a unit in which a resource is allocated is not limited to the symbol or slot 1602, and a resource may be flexibly allocated according to a unit, such as a mini-slot. In this case, a guard band 1604 may be allocated in a frequency band between a downlink resource 1603 and an uplink resource 1605. The guard band 1604 may be allocated to reduce interference in uplink channel or signal reception due to out-of-band emission occurring when the base station transmits a downlink channel or signal in the downlink resource 1603. In this case, for example, a UE 1 1610 and a UE 2 1620 generally having more downlink traffic than uplink traffic may be allocated a downlink and uplink resource ratio of 4:1 in a time domain by a configuration of the base station. At the same time, a UE 3 1630 operating at a cell edge and lacking uplink coverage may be allocated only an uplink resource in a specific time interval by a configuration of the base station. In addition, a UE 4 1640 operating at a cell edge and lacking uplink coverage but having relatively large downlink and uplink traffic may be allocated a lot of uplink resources in a time domain and a lot of downlink resources in a frequency band for uplink coverage. As in the above example, more downlink resources in a time domain may be allocated to UEs that operate relatively at the cell center and have large downlink traffic, and more uplink resources in a time domain may be allocated to UEs that operate relatively at a cell edge and lack uplink coverage.

Figure 17:
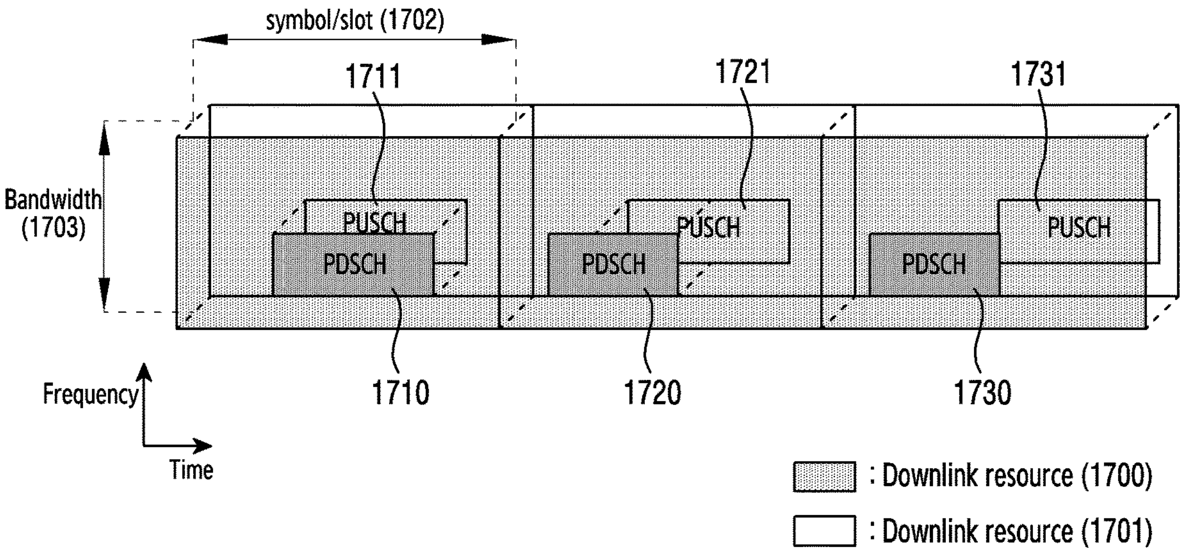
FIG. 17 illustrates an uplink-downlink resource configuration of a full duplex communication system in which uplink and downlink resources are flexibly distributed in time and frequency domains according to an embodiment of the disclosure.

FIG. 17 illustrates an uplink-downlink resource configuration of a full-duplex communication system in which uplink and downlink resources are flexibly divided in time and frequency domains according to an embodiment of the disclosure.

Referring to FIG. 17, a downlink resource 1700 and an uplink resource 1701 may be configured to entirely or partially overlap each other in time and frequency domains. In an area configured as the downlink resource 1700, downlink transmission may be performed from a base station to a UE, and in an area configured as the uplink resource 1701, uplink transmission may be performed from the UE to the base station.

In an example of FIG. 17, a downlink resource 1710 and an uplink resource 1711 may be configured to entirely overlap each other in a time resource corresponding to a symbol or a slot 1702 and a frequency resource corresponding to a bandwidth 1703. In this case, since the downlink resource 1710 and the uplink resource 1711 overlap each other in time and frequency, downlink and uplink transmission and reception of the base station or the UE may be simultaneously performed in the same time and frequency resource.

In another example of FIG. 17, a downlink resource 1720 and an uplink resource 1721 may be configured to partially overlap each other in a time resource corresponding to a symbol or slot and a frequency resource corresponding to the bandwidth 1703. In this case, downlink and uplink transmission and reception of the base station or the UE may be simultaneously performed in a partial area where the downlink resource 1720 and the uplink resource 1721 overlap each other.

In still another example of FIG. 17, a downlink resource 1730 and an uplink resource 1731 may be configured not to overlap each other in a time resource corresponding to a symbol or slot and a frequency resource corresponding to the bandwidth 1703.

Figure 18:
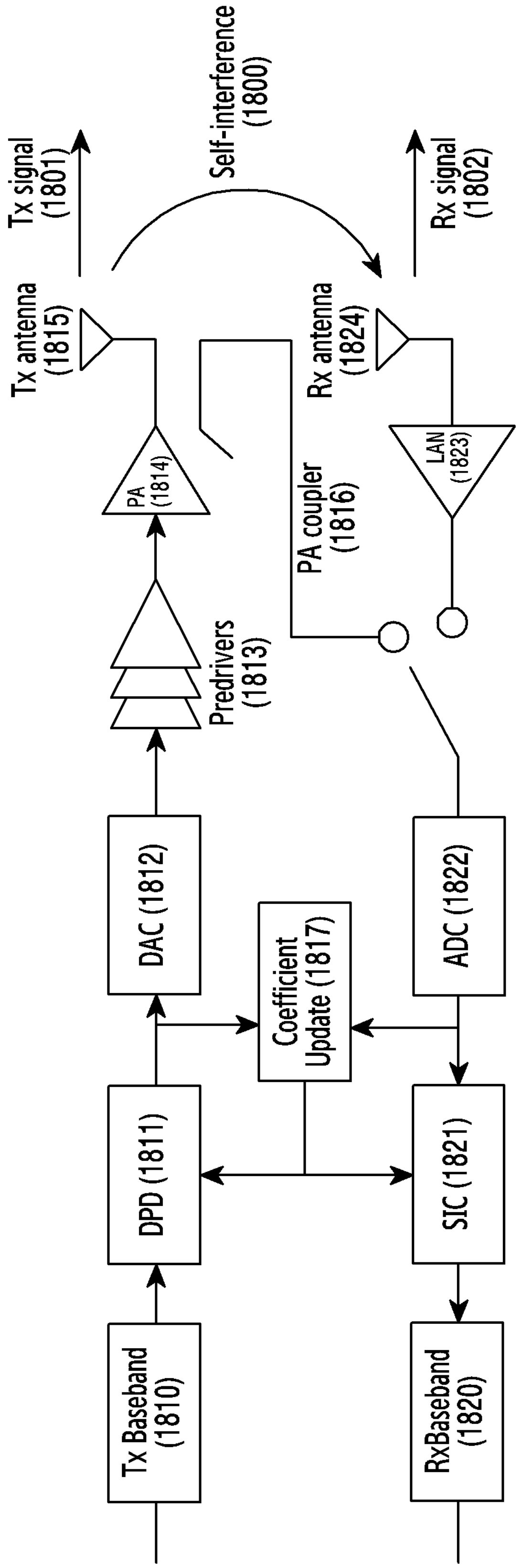
FIG. 18 illustrates a transmission and reception structure for a duplex scheme according to an embodiment of the disclosure.

FIG. 18 illustrates a transmission/reception structure for a duplex scheme according to an embodiment of the disclosure.

Referring to FIG. 18, a transmission/reception structure may be used in a base station device or a UE device. According to the transmission/reception structure of FIG. 18, a transmitting end may include blocks, such as a transmission (Tx) baseband block 1810, a digital pre-distortion (DPD) block 1811, a digital-to-analog converter (DAC) 1812, a pre-driver 1813, a power amplifier (PA) 1814, and a transmission antenna (Tx antenna) 1815. Each block may perform the following function.

Tx baseband block 1810: a digital processing block for a transmission signal DPD block 1811: pre-distort a digital transmission signal DAC 1812: convert a digital signal into an analog signal Pre-driver 1813: gradually amplify power of an analog transmission signal PA 1814: amplify power of an analog transmission signal Tx antenna 1815: an antenna for signal transmission According to the transmission/reception structure, a receiving end may include blocks, such as a reception (Rx) antenna 1824, a low noise amplifier (LNA) 1823, an analog-to-digital converter (ADC) 1822, a successive interference canceller (SIC) 1821, and a reception (Rx) baseband block 1820. Each block may perform the following function.

Rx antenna 1824: an antenna for signal reception

LNA 1823: amplify power of an analog reception signal and minimize amplification of noise ADC 1822: convert an analog signal into a digital signal Successive interference canceller 1821: an interference canceller for a digital signal Rx baseband block 1820: a digital processing block for a reception signal According to the transmission/reception structure of FIG. 18, a power amplifier coupler (PA coupler) 1816 and a coefficient update block 1817 may be provided for additional signal processing between the transmitting end and the receiving end. Each block may perform the following function.

(1) PA coupler 1816: a block for observing a waveform of an analog transmission signal having passed through the power amplifier, at the receiving end (2) Coefficient update block 1817: update various coefficients required for digital domain signal processing of the transmitting end and the receiving end, wherein the calculated coefficients may be used to set various parameters in the DPD block 1811 of the transmitting end and the SIC 1821 of the receiving end.

When transmission and reception operations are simultaneously performed in the base station device or the UE device, the transmission/reception structure of FIG. 18 may be used to effectively control interference between a transmission signal and a reception signal. For example, when transmission and reception are simultaneously performed in a predetermined device, a transmission signal 1801 transmitted through the Tx antenna 1815 of the transmitting end may be received through the Rx antenna 1824 of the receiving end, and in this case, the transmission signal 1801 received by the receiving end may interfere (indicated by reference numeral 1800) with a reception signal 1802 intended to be received by the receiving end. Interference between the transmission signal 1801 received by the receiving end and the reception signal 1802 is referred to as self-interference 1800.

For example, when the base station device simultaneously performs downlink transmission and uplink reception, a downlink signal transmitted by the base station may be received by the receiving end of the base station, and thus, at the receiving end of the base station, interference may occur between the downlink signal transmitted by the base station and an uplink signal intended to be received by the receiving end of the base station. When the UE device simultaneously performs downlink reception and uplink transmission, an uplink signal transmitted by the UE may be received by the receiving end of the UE and thus, at the receiving end of the UE, interference may occur between the uplink signal transmitted by the UE and a downlink signal intended to be received by the receiving end of the UE. As such, interference between links of different directions, that is, a downlink signal and an uplink signal, in the base station device and the UE device is referred to as cross-link interference.

In an embodiment of the disclosure, self-interference between a transmission signal (or a downlink signal) and a reception signal (or an uplink signal) may occur in a system where transmission and reception may be simultaneously performed.

For example, self-interference may occur in the above-described XDD system.

Figure 19:
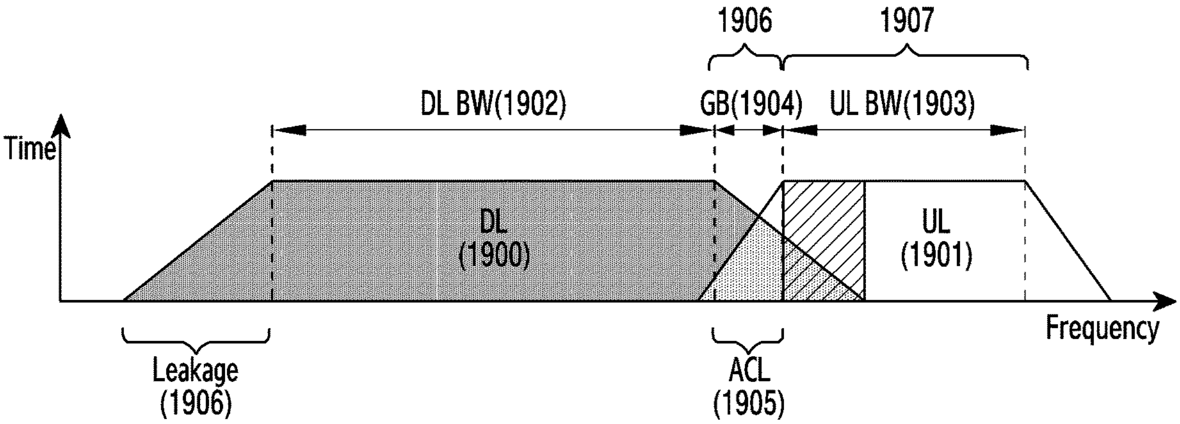
FIG. 19 explains a downlink and uplink resource configuration in an XDD system according to an embodiment of the disclosure.

FIG. 19 illustrates a downlink and uplink resource configuration in an XDD system according to an embodiment of the disclosure.

Referring to FIG. 19, in XDD, in a frequency domain, a downlink resource 1900 and an uplink resource 1901 may be distinguished, and in this case, a guard band (GB) 1904 may exist between the downlink resource 1900 and the uplink resource 1901. Actual downlink transmission may be performed in a downlink bandwidth 1902, and actual uplink transmission may be performed in an uplink bandwidth 1903. In this case, leakage 1906 may occur outside an uplink or downlink transmission band. Interference due to the leakage (which may be referred to as adjacent carrier leakage (ACL) 1905) may occur in an area where the downlink resource 1900 and the uplink resource 1901 are adjacent to each other.

FIG. 19 illustrates that an ACL 1905 occurs from the downlink resource 1900 to the uplink resource 1901. As a distance between the downlink bandwidth 1902 and the uplink bandwidth 1903 decreases, the influence of signal interference due to the ACL 1905 may increase, thereby resulting in performance degradation. For example, as shown in FIG. 19, in a partial resource area 1906 in the uplink band 1903 which is adjacent to the downlink band 1902, the influence of interference due to the ACL 1905 may be large. In a partial resource area 1907 in the uplink band 1903 which is relatively far from the downlink band 1902, the influence of interference due to the ACL 1905 may be small. For example, in the uplink band 1903, there may be the resource area 1906 that is relatively more affected by interference and the resource area 1907 that is relatively less affected by interference.

In order to reduce performance degradation due to the ACL 1905, the GB 1904 may be inserted between the downlink bandwidth 1902 and the uplink bandwidth 1903. As the size of the GB 1904 increases, the influence of interference due to the ACL 1905 between the downlink bandwidth 1902 and the uplink bandwidth 1903 may decrease, but as the size of the GB 1904 increases, resources that may be used for transmission/reception may decrease, thereby reducing resource efficiency. In contrast, as the size of the GB 1904 decreases, resources that may be used for transmission/reception may increase and thus resource efficiency may be improved, but the influence of interference due to the ACL 1905 between the downlink bandwidth 1902 and the uplink bandwidth 1903 may increase. Therefore, it may be important to determine an appropriate size of the GB 1904 by considering a tradeoff.

Meanwhile, In 3GPP, subband non-overlapping full duplex (SBFD) is being discussed as a new duplex scheme based on the NR. SBFD is a technology of using a part of a downlink resource as an uplink resource in a TDD band (spectrum) of a frequency of 6 GHZ or below or a frequency of 6 GHz or above, to receive, from a UE, uplink transmission as much as the amount of increased uplink resources so as to expand uplink coverage of the UE, and receive a feedback for downlink transmission from the UE in the increased uplink resources so as to reduce feedback delay. In the disclosure, a UE capable of receiving, from a base station, information on whether SBFD is supported, and performing uplink transmission in a part of a downlink resource may be referred to as an SBFD UE (SBFD-capable UE) for convenience. The SBFD scheme may be defined in the standard, and the following scheme may be considered for the SBFD UE to determine whether the SBFD is supported in a specific cell (or a frequency or a frequency band).

First scheme. In addition to a frame structure type of an unpaired spectrum (or time division duplex (TDD)) or paired spectrum (or frequency division duplex (FDD)) of the related art, another frame structure type (e.g., frame structure type 2) may be introduced in order to define the SBFD. The frame structure type 2 may be defined as being supported in the specific frequency or frequency band, or a base station may indicate whether SBFD is supported, to a UE by using system information. The SBFD UE may receive the system information including whether SBFD is supported, and determine whether SBFD is supported in the specific cell (or frequency or frequency band).

Second scheme. Without defining a new frame structure type, whether the SBFD is additionally supported in a specific frequency or frequency band of an unpaired spectrum (or TDD) of the related art may be indicated. The second scheme may define whether the SBFD is additionally supported in a specific frequency or frequency band of an unpaired spectrum of the related art, or a base station may indicate whether SBFD is supported, to a UE by using system information. The SBFD UE may receive the system information including whether SBFD is supported, and determine whether SBFD is supported in the specific cell (or frequency or frequency band).

The information on whether SBFD is supported in the first and second schemes may be information (for example, SBFD resource configuration information in FIGS. 20A to 20D described below) indirectly indicating whether SBFD is supported, by additionally configuring a part of a downlink resource as an uplink resource, in addition to configuring TDD uplink (UL)-downlink (DL) resource configuration information indicating a downlink slot (or symbol) resource and an uplink slot (or symbol) resource in TDD, or may be information directly indicating whether SBFD is supported.

In the disclosure, the SBFD UE may receive a synchronization signal block in an initial cell access for accessing a cell (or a base station), so as to obtain cell synchronization. A process of obtaining the cell synchronization may be the same as for an SBFD UE and the existing TDD UE. Thereafter, the SBFD UE may determine whether the cell supports SBFD, through MIB acquisition, SIB acquisition, or a random access process.

The system information for transmitting information on whether SBFD is supported may be system information distinguished from and transmitted separately from system information for a UE (e.g., the existing TDD UE) supporting a different version of the standard in a cell, and the SBFD UE may obtain the entirety or a part of the system information transmitted separately from the system information for the existing TDD UE, so as to determine whether SBFD is supported. When the SBFD UE obtains only the system information for the existing TDD UE or obtains system information indicating that SBFD is not supported, the SBFD UE may determine that the cell (or base station) supports only TDD.

When the information on whether SBFD is supported is included in system information for a UE (e.g., the existing TDD UE) supporting a different version of the standard, the information on whether SBFD is supported may be inserted in the last part of the system information not to affect acquisition of the system information of the existing TDD UE. When the SBFD UE fails to obtain the information on whether SBFD is supported, which is inserted in the last part, or obtains information indicating that SBFD is not supported, the SBFD UE may determine that the cell (or base station) supports only TDD.

When the information on whether SBFD is supported is included in system information for a UE (e.g., the existing TDD UE) supporting a different version of the standard, the information on whether SBFD is supported may be transmitted through a separate PDSCH so as not to affect acquisition of the system information of the existing TDD UE. For example, a non-SBFD-supporting UE may receive a first SIB (or SIB1) including existing TDD-related system information from a first PDSCH. A SBFD-supporting UE may receive the first SIB (or SIB) including the existing TDD-related system information from the first PDSCH, and may receive a second SIB including SBFD-related system information from a second PDSCH. Here, the first PDSCH and the second PDSCH may be scheduled by a first PDCCH and a second PDCCH, and a cyclic redundancy code (CRC) of the first PDCCH and the second PDCCH may be scrambled with the same RNTI (e.g., SI-RNTI). A search space for monitoring the second PDCCH may be acquired from system information of the first PDSCH, and if the same is not acquired (that is, if the system information of the first PDSCH does not include information on the search space), the second PDCCH may be received in the same search space as a search space of the first PDCCH.

As described above, when the SBFD UE determines that the cell (or base station) supports only TDD, the SBFD UE may perform a random access procedure and transmission or reception of a data/control signal like the existing TDD UE.

A base station may configure a separate random access resource for each of the existing TDD UE or an SBFD UE (e.g., an SBFD UE supporting duplex communication and an SBFD UE supporting half-duplex communication), and transmit configuration information (e.g., control information or configuration information indicating a time-frequency resource available for a physical random access channel (PRACH)) on the random access resource to the SBFD UE through system information. The system information for transmitting information on the random access resource may be system information distinguished from and transmitted separately from system information for a UE (e.g., the existing TDD UE) supporting a different version of the standard in a cell.

The base station configures a separate random access resource for each of the SBFD UE and the TDD UE supporting the different version of the standard, thereby being able to distinguish whether the TDD UE supporting the different version of the standard performs a random access or the SBFD UE performs a random access. For example, the separate random access resource configured for the SBFD UE may be a resource that the existing TDD UE determines as a downlink time resource, and the SBFD UE may perform a random access through an uplink resource (or separate random access resource) configured in some frequencies of the downlink time resource, so that the base station may determine that the UE which has attempted the random access in the uplink resource is an SBFD UE.

Alternatively, the base station may not configure a separate random access resource for the SBFD UE, and may configure a common random access resource for all UEs in a cell. In this case, configuration information on the random access resource may be transmitted to all the UEs in the cell through system information, and the SBFD UE having received the system information may perform a random access in the random access resource. Thereafter, the SBFD UE may complete a random access process to enter an RRC connection mode for transmission or reception of data with the cell. After the RRC connection mode, the SBFD UE may receive, from the base station, a higher or physical signal enabling determination that a partial frequency resource of the downlink time resource is configured as an uplink resource, and transmit an uplink signal in the uplink resource as, for example, an SBFD operation.

When the SBFD UE determines that the cell supports SBFD, the SBFD UE transmits, to the base station, capability information including at least one of whether the UE supports SBFD, whether the UE supports full-duplex communication or half-duplex communication, and the number of transmission or reception antennas included in (or supported), thereby notifying the base station that the UE attempting to access is an SBFD UE. Alternatively, when support of half-duplex communication is necessarily implemented for the SBFD UE, whether half-duplex communication is supported may be omitted from the capability information. A report of the SBFD UE on the capability information may be reported to the base station through a random access process, may be reported to the base station after completion of the random access process, or may be reported to the base station after entering an RRC connection mode for transmission or reception of data with the cell.

The SBFD UE may support half-duplex communication in which only one of uplink transmission and downlink reception is performed at one time like the existing TDD UE, or may support full-duplex communication in which both uplink transmission and downlink reception are performed at one time. Therefore, the SBFD UE may report, to the base station through capability reporting, whether half-duplex communication or full-duplex communication is supported, and after the reporting, the base station may configure, for the SBFD UE, whether the SBFD UE is to use half-duplex communication for transmission or reception or to use full-duplex communication for transmission or reception. When the SBFD UE reports the capability of half-duplex communication to the base station, since a duplexer generally does not exist, a switching gap for changing an RF between transmission and reception may be required in a case of operating in FDD or TDD.

FIGS. 20A, 20B, 20C, and 20D illustrate that an SBFD is operated in a TDD band of a wireless communication system to which the disclosure is applied according to various embodiments of the disclosure.

Figure 20A:
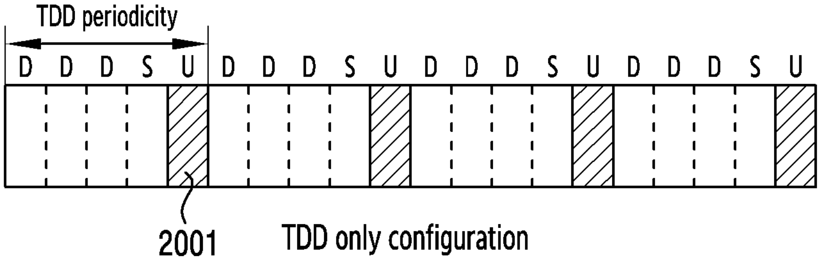
FIGS. 20A, 20B, 20C, and 20D illustrate operating subband non-overlapping full duplex (SBFD) in a time division duplex (TDD) band of a wireless communication system to which the disclosure is applied according to various embodiments of the disclosure.

Referring to FIG. 20A, it illustrates a case in which TDD is operated in a specific frequency band. In a cell operating the TDD, a base station may transmit or receive, to or from the existing TDD UE or an SBFD UE, a signal including data/control information in a downlink slot (or symbol), an uplink slot (or symbol) 2001 or 2021 or 2031, and a flexible slot (or symbol), based on a configuration of TDD UL-DL resource configuration information indicating a downlink slot (or symbol) resource and an uplink slot (or symbol) resource of the TDD.

Referring to FIGS. 20A, 20B, 20C, and 20D, it may be assumed that a DDDSU slot format is configured according to the TDD UL-DL resource configuration information. Here, "D" is a slot consisting entirely of downlink symbols, "U" is a slot consisting entirely of uplink symbols, and "S" is a slot that is neither "D" nor "U", that is, a slot including a downlink symbol, an uplink symbol, or a flexible symbol. Here, for convenience, S may be assumed to include 12 downlink symbols and 2 flexible symbols. Further, the DDDSU slot format may be repeated according to the TDD UL-DL resource configuration information. For example, a repetition period of a TDD configuration is 5 slots (5 ms for 15 kHz SCS, 2.5 ms for 30 kHz SCS, or the like).

Figure 20B:
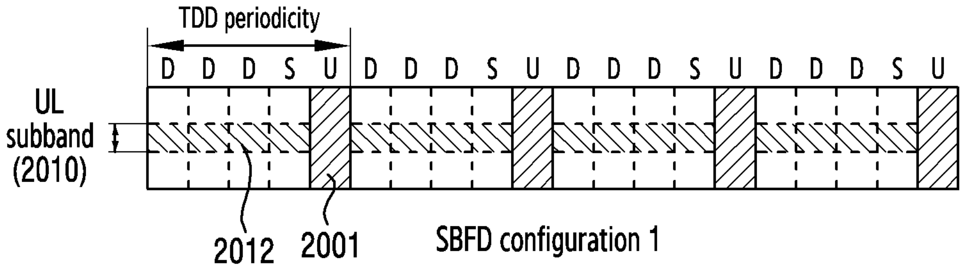
Figure 20C:
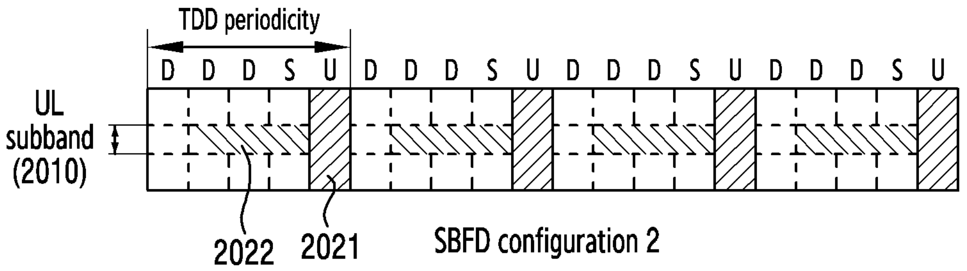
Figure 20D:
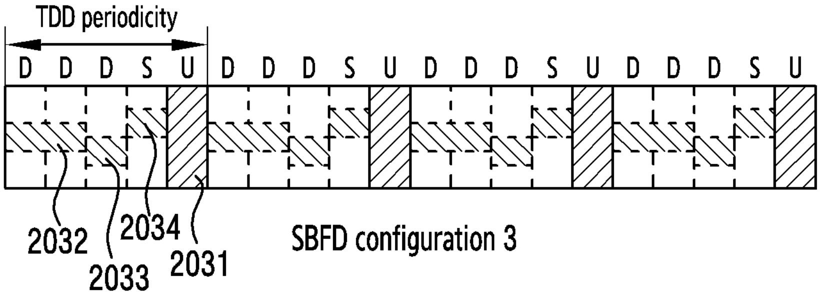

Next, FIGS. 20B, 20C, and 20D illustrate a case where SBFD is operated together with TDD in a specific frequency band.

Referring to FIG. 20B, a UE may receive a configuration of a part of frequency bands of a cell as a frequency band 2010 available for uplink transmission. This band may be referred to as an uplink subband (UL subband). Further, the uplink subband (UL subband) may be applied to all symbols of all slots. The UE may transmit an uplink channel or signal scheduled for all symbols 2012 within the subband (UL subband). However, the UE is not able to transmit an uplink channel or signal in a band other than the subband (UL subband).

Referring to FIG. 20C, the UE may receive a configuration of a part of frequency bands of a cell as a frequency band 2020 available for uplink transmission, and may receive a configuration of a time area in which the frequency band is activated. Here, this frequency band may be referred to as an uplink subband (UL subband). In FIG. 20C, the uplink subband (UL subband) is deactivated in a first slot, and the uplink subband (UL subband) may be activated in the remaining slots. Therefore, the UE may transmit an uplink channel or signal in an uplink subband (UL subband) 2022 of the remaining slots. Therefore, the uplink subband (UL subband) is activated in the unit of a slot here, but whether the uplink subband is activated may be configured in the unit of a symbol.

Referring to FIG. 20D, the UE may receive a configuration of a time-frequency resource available for uplink transmission. The UE may receive a configuration of one or more time-frequency resources as a time-frequency resource available for uplink transmission. For example, a partial frequency band 2032 of a first slot and a second slot may be configured as time-frequency resources available for uplink transmission. In addition, a partial frequency band 2033 of a third slot and a partial frequency band 2034 of a fourth slot may be configured as time-frequency resources available for uplink transmission.

In the following description, a time-frequency resource available for uplink transmission within a downlink symbol or slot may be referred to as an SBFD resource. In addition, a symbol in which an uplink subband is configured within a downlink symbol may be referred to as an SBFD symbol. In addition, a time-frequency resource available for downlink reception within an uplink symbol or slot may be referred to as an SBFD resource. In addition, a symbol in which a downlink subband is configured within an uplink symbol may be referred to as an SBFD symbol.

For convenience, in this disclosure, a band available for downlink channel or signal reception, excluding an uplink subband, is referred to as a downlink subband. The UE may configure up to one uplink subband and up to two downlink subbands in one symbol. For example, the UE may receive a configuration of one of {uplink subband, downlink subband}, {downlink subband, uplink subband}, and {first downlink subband, uplink subband, second downlink subband} in a frequency domain.

Figure 21:
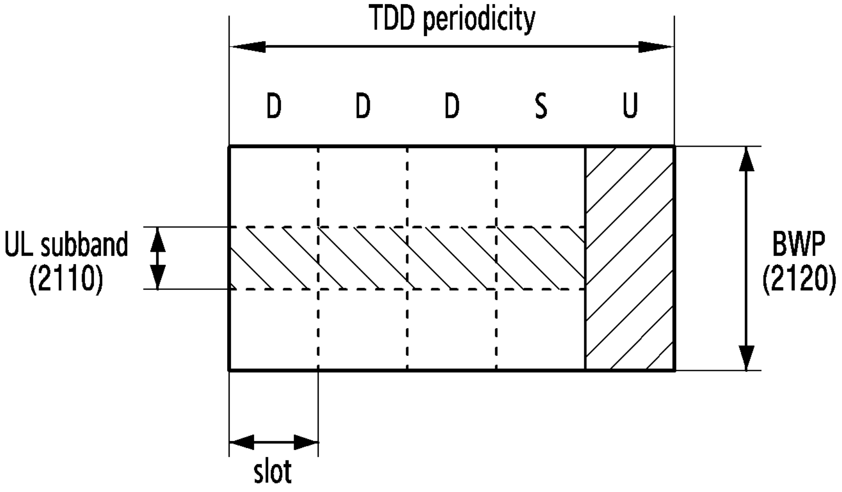
FIG. 21 illustrates an SBFD configuration according to an embodiment of the disclosure.

FIG. 21 illustrates an SBFD configuration according to an embodiment of the disclosure.

Referring to FIG. 21, a UE may receive a configuration of an uplink symbol, a downlink symbol, or a flexible symbol according to a TDD configuration. Here, all symbols of a "D" slot are downlink symbols. All symbols of a "U" slot are uplink symbols. An "S" slot is a slot that is neither a "D" slot nor a "U" slot. The UE may receive a configuration of a UL BWP 2120. Further, the UE may receive a configuration of a UL subband 2110 within a DL symbol. In addition, the UE may receive a configuration of a slot or symbol to which the UL subband 2110 is to be applied. Referring to FIG. 21, the UL subband may be applied only to some symbols among DL symbols having a TDD periodicity. The DL symbols of a second slot and a third slot may have a UL subband applied, but the other DL symbols may not have a UL subband applied. Here, an SBFD symbol may indicate a symbol to which the UL subband is applied.

A base station may configure a guard frequency interval between a DL subband and a UL subband in the UE. When the guard frequency interval is configured for the UE, frequency resources in a frequency domain may be divided into a UL subband, a guard frequency interval, and a DL subband. For the purpose of description of this embodiment of the disclosure, it is assumed that the guard frequency interval is included in the UL subband. For example, in the following description, the expression "when "X" overlaps with a UL subband" may be interpreted as "when "X" overlaps with a UL subband or a guard frequency interval". In addition, the expression "when "X" overlaps with a UL subband" may be interpreted as "when "X" does not overlap with a DL subband".

The expression "when "X" does not overlap with a UL subband" may be interpreted as "when "X" does not overlap with a UL subband and a guard frequency interval". In addition, the expression "when "X" does not overlap with a UL subband" may be interpreted as "when "X" overlaps with a DL subband".

Hereinafter, embodiments of the disclosure will be described in conjunction with the accompanying drawings. The contents of the disclosure may be applied to FDD and TDD systems. As used herein, upper signaling (or upper layer signaling) is a method for transferring signals from a base station to a UE by using a downlink data channel of a physical layer, or from the UE to the base station by using an uplink data channel of the physical layer, and may also be referred to as "RRC signaling", "PDCP signaling", or "medium access control (MAC) control element (MAC CE)".

Hereinafter, determining priority between A and B may be variously described as, for example, selecting an entity having a higher priority according to a predetermined priority rule and performing an operation corresponding thereto, or omitting or dropping operations regarding an entity having a lower priority.

Hereinafter, the above examples may be described through several embodiments of the disclosure, but they are not independent of each other, and one or more embodiments may be applied simultaneously or in combination.

Hereinafter, for the sake of descriptive convenience, a cell, a transmission point, a panel, a beam, and/or a transmission direction which can be distinguished through an upper layer/L1 parameter, such as a TCI state or spatial relation information, a cell ID, a TRP ID, or a panel ID may be described as a TRP, a beam, or a TCI state as a whole. Therefore, in actual applications, a TRP, a beam, or a TCI state may be appropriately replaced with one of the above terms.

As used herein, the UE may use various methods to determine whether or not to apply cooperative communication, for example, PDCCH(s) that allocates a PDSCH to which cooperative communication is applied have a specific format, or PDCCH(s) that allocates a PDSCH to which cooperative communication is applied include a specific indicator indicating whether or not to apply cooperative communication, or PDCCH(s) that allocates a PDSCH to which cooperative communication is applied are scrambled by a specific RNTI, or cooperative communication application is assumed in a specific range indicated by an upper layer. Hereinafter, it will be assumed for the sake of descriptive convenience that NC-JT case refers to a case in which the UE receives a PDSCH to which cooperative communication is applied, based on conditions similar to those described above.

Hereinafter, embodiments of the disclosure will be described in conjunction with the accompanying drawings. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. In the following description of embodiments of the disclosure, a 5G system will be described by way of example, but the embodiments of the disclosure may also be applied to other communication systems having similar technical backgrounds or channel types. Examples of such communication systems may include LTE or LTE-A mobile communication systems and mobile communication technologies developed beyond 5G. Therefore, embodiments of the disclosure are also applicable to other communication systems through some modifications without substantially departing from the scope of the disclosure as deemed by those skilled in the art. The contents of the disclosure may be applied to FDD and TDD systems.

Furthermore, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description of the disclosure, upper layer signaling may refer to signaling corresponding to at least one signaling among the following signaling, or a combination of one or more thereof.

Master information block (MIB)

System information block (SIB) or SIB X (X=1, 2, . . . )

Radio resource control (RRC)

Medium access control (MAC) control element (CE)

In addition, L1 signaling may refer to signaling corresponding to at least one signaling method among signaling methods using the following physical layer channels or signaling, or a combination of one or more thereof.

Physical downlink control channel (PDCCH)

Downlink control information (DCI)

UE-specific DCI

Group common DCI

Common DCI

Scheduling DCI (for example, DCI used for the purpose of scheduling downlink or uplink data)

Non-scheduling DCI (for example, DCI not used for the purpose of scheduling downlink or uplink data)

Physical uplink control channel (PUCCH)

Uplink control information (UCI)

Hereinafter, determining priority between A and B may be variously described as, for example, selecting an entity having a higher priority according to a predetermined priority rule and performing an operation corresponding thereto, or omitting or dropping operations regarding an entity having a lower priority.

As used herein, the term “slot” may generally refer to a specific time unit corresponding to a transmit time interval (TTI), may specifically refer to a slot used in a 5G NR system, or may refer to a slot or a subframe used in a $4^{th}$ generation (4G) LTE system.

Hereinafter, the above examples may be described through multiple embodiments of the disclosure, but they are not independent of each other, and one or more embodiments may be applied simultaneously or in combination.

First Embodiment: a Method for Configuring and Indicating a Frequency Resource Unit of PUSCH Precoding Hereinafter, a frequency resource unit of precoding (frequency domain precoding resource unit) applicable to PUSCH transmission by a UE during PUSCH transmission of the UE according to an embodiment of the disclosure is described. This embodiment may operate in combination with other embodiments described in the disclosure. For example, the definition of the frequency resource unit of precoding applicable during PUSCH transmission defined in the first embodiment may be applied (substantially) identically to other embodiments.

The frequency resource unit of precoding applicable to PUSCH transmission by the UE during PUSCH transmission of the UE may be largely divided into two types. Firstly, the frequency resource unit of precoding applicable to PUSCH transmission by the UE during PUSCH transmission of the UE is wideband, and the entire frequency resources through which the UE receives a scheduling of PUSCH transmission may be a frequency resource unit of precoding. For example, the UE may apply the same precoding to all frequency resource areas in which a PUSCH is transmitted. Secondly, the frequency resource through which the UE receives a scheduling of PUSCH transmission during PUSCH transmission of the UE is divided into two or more parts, and a frequency resource unit corresponding to each of the two or more divided parts (for example, it may be configured by one or more RBs) may be a frequency resource unit of precoding. For example, during single PUSCH transmission, the UE may apply different precodings to different frequency resources of the corresponding PUSCH transmission.

More specifically, the UE may consider a configuration/indication from a base station for a combination of at least one of the following methods for a frequency resource unit of precoding applicable by the UE during PUSCH transmission of the UE.

[Method 1-1]

According to an embodiment of the disclosure, a UE may receive a configuration of a frequency resource unit of PUSCH precoding from a base station through higher-layer signaling. For example, the UE may receive a configuration of at least one of the frequency resource unit of PUSCH precoding as wideband or the number of RBs corresponding to a predetermined natural number, such as 2, 4, 6, 8, 16, 32, or 64 through higher-layer signaling from the base station. When a configuration value for the frequency resource unit of PUSCH precoding configured by the base station is wideband, the UE may consider the frequency resource unit of PUSCH precoding for the entire frequency resources scheduled by the base station for PUSCH transmission. When a configuration value for the frequency resource unit of PUSCH precoding configured by the base station is 2, the UE may apply the frequency resource unit of PUSCH precoding by dividing the frequency resource scheduled by the base station for PUSCH transmission in units of 2 RBs. For example, the UE divides the frequency resource scheduled by the base station for PUSCH transmission in units of 2 RBs, the divided unit of 2 RB is used as a frequency resource unit of precoding, and precoding may be applied to each precoding frequency resource unit of 2 RBs. In this case, the frequency resource unit of PUSCH precoding may be applied based on CRB0, or may be considered from a start RB in a bandwidth part. In the case of applying the frequency resource unit of PUSCH precoding based on CRB0, when a resource for PUSCH transmission includes an RB having a lowest index of the bandwidth part (BWP) (that is, a first PRB in the bandwidth part) or an RB having a highest index (that is, the last PRB in the bandwidth part), depending on how far a start RB of an activated BWP scheduled for PUSCH transmission is from the CRB0, the UE may apply the same precoding to RBs smaller than or equal to the frequency resource unit of PUSCH precoding. In the case of considering the frequency resource unit of PUSCH precoding from the start RB of the bandwidth part, when the frequency resource unit of PUSCH precoding is not a divisor of the size of the bandwidth part, and when a resource for PUSCH transmission includes an RB of the highest index of the bandwidth part (that is, the last PRB in the bandwidth part), the same precoding may be applied to RBs smaller than or equal to the frequency resource unit of PUSCH precoding.

According to an embodiment of the disclosure, in a case where [Method 1-1] is used/applied, when the frequency resource unit of PUSCH precoding is not wideband, for the UE and the base station, the number of frequency resource units of PUSCH precoding may be semi-statically determined according to the size of each bandwidth part configured for the UE (for example, which may be expressed as the number of RBs) and the frequency resource unit of PUSCH precoding (for example, which may be expressed as the number of RBs corresponding to a specific natural number, such as 2 RBs). In this case, the UE may expect that as many TPMI fields and/or SRI fields as frequency resource units of PUSCH precoding exist in DCI format 0_1 or DCI format 0_2 that may be received from the base station within a specific bandwidth part. In this case, when multiple TPMI fields and/or SRI fields in DCI format 0_1 or 0_2 received by the UE indicate different pieces of information, the UE may perform PUSCH transmission by applying information indicated through DCI to each frequency resource unit of PUSCH precoding. For example, when the size of the bandwidth part configured for the UE is 10 RBs and the size of the frequency resource unit is 2 RBs, the bandwidth part may include 5 (10RB/2RB=5) frequency resource units, and the UE may expect that a TPMI field and/or an SRI field exists for each of the 5 frequency resource units included in the bandwidth part.

According to an embodiment of the disclosure, when multiple TPMI fields and/or SRI fields in DCI format 0_1 or 0_2 received by the UE all indicate the same information, the UE may perform PUSCH transmission by applying the same information to the entire frequency resources allocated during PUSCH transmission.

[Method 1-2]

According to an embodiment of the disclosure, a UE may determine the size of a frequency resource unit of PUSCH precoding according to the size of a bandwidth part configured for the UE. The UE and a base station may define multiple ranges of a bandwidth part size and determine different sizes of a frequency resource unit of PUSCH precoding for each of the defined ranges of the bandwidth part size. As shown in Table 34 below, the ranges of the bandwidth part size are defined into four types, and the UE may determine the size of the frequency resource unit of PUSCH precoding for each range. In this case, the UE may receive a configuration of one of a second column to a fourth column of Table 34 below through higher-layer signaling from the base station, and determine the size of the frequency resource unit of PUSCH precoding depending on a configuration through higher-layer signaling and the configured size of the bandwidth part. For example, when the size of the bandwidth part configured by the UE from the base station is 1-36 RB and configuration 1 of Table 34 below is configured, the size of the frequency resource unit of precoding applied by the UE for PUSCH transmission may be determined as 4 RBs. In summary, N (N is a positive integer) ranges of a bandwidth part size may be defined, and M (M is a positive integer) configurations for the size of the frequency resource unit of precoding according to a range of the bandwidth part size may be defined.

According to an embodiment of the disclosure, instead of selecting one of the second column to the fourth column of Table 34 below through higher-layer signaling as described above, the UE and the base station may also fixedly define one of the second column to the fourth column without configuring higher-layer signaling. For example, when the size of the bandwidth part of the UE is 30 RBs, the UE and the base station may define a frequency resource unit of PUSCH precoding by fixedly using the second column of Table 34 below, and in this case, the UE may determine the frequency resource unit of PUSCH precoding as 4 RBs within a corresponding bandwidth part. In summary, N (N is a positive integer) ranges of a bandwidth part size may be defined, and M (M is a positive integer) possible configurations for the size of the frequency resource unit of precoding according to a range of the bandwidth part size may be defined, and one configuration for the size of the frequency resource unit among the configurations may be fixedly applied.

As described above using Table 34 as an example, this is merely an example for convenience of description and does not limit the scope to which the method described in the disclosure may be applied.

TABLE 34

| Bandwidth part size | Configuration 1 | Configuration 2 | Configuration 3 |
|---|---|---|---|
| 1-36 | 4 | 8 | 16 |
| 37-72 | 8 | 16 | 32 |
| 73-144 | 16 | 32 | 64 |
| 145-275 | 32 | 64 | 128 |

When defining a frequency resource unit of PUSCH precoding within a corresponding bandwidth part, the UE may apply the frequency resource unit based on CRB0 or consider the frequency resource unit from a start RB of the bandwidth part. In the case of applying the frequency resource unit of PUSCH precoding based on CRB0, when a resource for PUSCH transmission includes an RB having a lowest index of the bandwidth part (BWP) (that is, a first PRB in the bandwidth part) or an RB having a highest index (that is, the last PRB in the bandwidth part), depending on how far a start RB of an activated BWP scheduled for PUSCH transmission is from the CRB0, the UE may apply the same precoding to RBs smaller than or equal to the frequency resource unit of PUSCH precoding. In the case of considering the frequency resource unit of PUSCH precoding from the start RB of the bandwidth part, when the frequency resource unit of PUSCH precoding is not a divisor of the size of the bandwidth part, and when a resource for PUSCH transmission includes an RB of the highest index of the bandwidth part (that is, the last PRB in the bandwidth part), the same precoding may be applied to RBs smaller than or equal to the frequency resource unit of PUSCH precoding.

According to an embodiment of the disclosure, when [Method 1-2] is used/applied, the UE may determine a frequency resource unit of PUSCH precoding according to the size of a specific bandwidth part, and determine the number of frequency resource units of PUSCH precoding within the corresponding bandwidth part. In this case, the UE may expect that as many TPMI fields and/or SRI fields as frequency resource units of PUSCH precoding exist in DCI format 0_1 or DCI format 0_2 that may be received from the base station within a specific bandwidth part. In this case, when multiple TPMI fields and/or SRI fields in DCI format 0_1 or 0_2 received by the UE indicate different pieces of information, the UE may perform PUSCH transmission by applying information indicated through DCI to each frequency resource unit of PUSCH precoding. For example, when the size of the bandwidth part configured for the UE is 10 RBs and the UE determines the size of the frequency resource unit to be 2 RBs according to the configured size of the bandwidth part, the bandwidth part may include 5 (10RB/2RB=5) frequency resource units, and the UE may expect that a TPMI field and/or an SRI field exists for each of the 5 frequency resource units included in the bandwidth part.

According to an embodiment of the disclosure, when multiple TPMI fields and/or SRI fields in DCI format 0_1 or 0_2 received by the UE all indicate the same information, the UE may perform PUSCH transmission by applying the same information to the entire frequency resources allocated during PUSCH transmission.

[Method 1-3]

According to an embodiment of the disclosure, a UE may receive a configuration of a maximum value for the number of frequency resource units of PUSCH precoding from a base station through higher-layer signaling, and the UE may expect that multiple TPMI fields and/or multiple SRI fields corresponding to the maximum value exist in DCI. In addition, the UE may receive an indication of an actual number of frequency resource units of PUSCH precoding that may be applied to a PUSCH scheduled through the DCI. Accordingly, the UE may interpret multiple TPMI fields and/or multiple SRI fields equal to the actual number of frequency resource units indicated to the UE (that is, the same number as the number of frequency resource units), and individually apply precoding to each frequency resource unit of PUSCH precoding to perform PUSCH transmission.

According to an embodiment of the disclosure, the UE may receive a configuration of a maximum value for the number of frequency resource units of PUSCH precoding as 4 from the base station, and the UE may expect that a total of 4 TPMI fields and/or 4 SRI fields exists in DCI. The UE may receive an indication of the number of frequency resource units to be actually used among a maximum of 4 frequency resource units through the corresponding DCI, and the indication of the number of frequency resource units to be actually used may be made explicitly through an additional field within the DCI and may also be made implicitly through multiple TPMI fields and/or multiple SRI fields.

When the UE receives an indication of the number of frequency resource units to be actually used among the entire frequency resource units through a new/separate field explicitly added to the DCI, the UE may interpret information of TPMI fields and/or SRI fields equal to the number indicated through the field added to the DCI, and apply the information at the time of transmitting a PUSCH scheduled through the corresponding DCI. In this case, the UE may use TPMI fields and/or SRI fields equal to the number of frequency resource units to be actually used, starting from a first TPMI field and/or a first SRI field, and may expect to receive the remaining TPMI fields and/or SRI fields as reserved values, expect all bits to be indicated as 0, or ignore the same.

When the UE implicitly receives an indication of the number of frequency resource units to be actually used among the entire frequency resource units through the existing fields in the DCI (for example, multiple TPMI fields and/or multiple SRI fields), the UE may expect to receive an indication of a code point that is not a reserved code point, for TPMI fields and/or SRI fields equal to the number of frequency resource units to be actually used, starting from the first TPMI field and/or the first SRI field, and may expect to receive the remaining TPMI fields and/or SRI fields as reserved values.

According to an embodiment of the disclosure, when [Method 1-3] is used/applied, the maximum number of frequency resource units of PUSCH precoding may be semi-statically configured for the UE. In this case, the UE may expect that as many TPMI fields and/or SRI fields as the maximum value thereof exist in DCI format 0_1 or DCI format 0_2 that may be received from the base station within a specific bandwidth part. In this case, when multiple TPMI fields and/or SRI fields in DCI format 0_1 or 0_2 received by the UE indicate different pieces of information, the UE may perform PUSCH transmission by applying information indicated through DCI to each frequency resource unit of PUSCH precoding.

According to an embodiment of the disclosure, when multiple TPMI fields and/or SRI fields in DCI format 0_1 or 0_2 received by the UE all indicate the same information, the UE may perform PUSCH transmission by applying the same information to the entire frequency resources allocated during PUSCH transmission. Alternatively, when the UE receives an indication of the number of frequency resource units to be actually used among the entire frequency resource units through a new field that may be explicitly included in DCI format 0_1 or 0_2 received by the UE, and if a corresponding value is 1, the UE may perform PUSCH transmission by equally applying information obtainable through the first TPMI field and/or the first SRI field to the entire frequency resources allocated for PUSCH transmission.

[Method 1-4]

According to an embodiment of the disclosure, a UE may determine the size of a frequency resource unit allocated at the time of PUSCH transmission according to a frequency resource allocation scheme for PUSCH transmission.

According to an embodiment of the disclosure, the UE may determine the size and number of frequency resource units allocated at the time of PUSCH transmission, depending on whether frequency resource allocation for PUSCH transmission is continuous or discontinuous.

2) More specifically, when the UE receives scheduling of continuous frequency resource allocation for PUSCH transmission, the UE may apply the same precoding to all frequency resources. For example, when the same precoding is applied to all frequency resources, the number of frequency resource units may be 1, and the size of a frequency resource unit may correspond to a frequency resource allocation amount for PUSCH transmission.

2) Alternatively, when the UE receives scheduling of discontinuous frequency resource allocation for PUSCH transmission, the UE may apply individual precoding to each continuous frequency resource among the entire frequency resource allocation areas. For example, when the UE receives scheduling of a first to a fifth RB and an eleventh to a twentieth RB in a specific bandwidth part as frequency resource allocation areas, the UE may apply first precoding to the first to fifth RBs and second precoding to the eleventh to twentieth RBs, and the first precoding and the second precoding may be the same as or different from each other.

For example, the number of frequency resource units may be determined as the number of continuous frequency resource parts among the entire frequency resource allocation, and the size of a frequency resource unit may be determined as the size of each continuous frequency resource part. When the UE receives scheduling of the first to fifth RBs and the eleventh to twentieth RBs within a specific bandwidth part as frequency resource allocation areas, the number of frequency resource units is 2, and the size of the frequency resource unit may be 5 RBs for a first continuous frequency resource part to which the first precoding may be applied, and may be 10 RBs for a second continuous frequency resource part to which the second precoding may be applied. In this case, the first precoding and the second precoding may be the same precoding or different precodings. Additionally, in this method, the base station may configure, through separate signaling, whether the UE applies different precodings or the same precoding to each of different precoding frequency parts.

1) According to an embodiment of the disclosure, the UE may determine the size and number of frequency resource units allocated to the UE at the time of PUSCH transmission according to a frequency resource allocation amount for PUSCH transmission. The UE may be notified of one or more reference values for a frequency resource allocation amount by the base station through a combination of at least one of higher-layer signaling, MAC-CE, and L1 signaling, or may use one or more values fixedly defined in the standard. For example, a reference value for a frequency resource allocation amount can be a total of three, and these values may be 36 RBs, 72 RBs, and 144 RBs, as considered in a first column of Table 34 above. When the UE receives frequency resource allocation information less than 36 RBs for PUSCH transmission, the UE may consider the number of frequency resource units as 1. When the UE receives frequency resource allocation information greater than or equal to 36 RBs and less than 72 RBs for PUSCH transmission, the UE may consider the number of frequency resource units as 2. When the UE receives frequency resource allocation information greater than or equal to 72 RBs and less than 144 RBs for PUSCH transmission, the UE may consider the number of frequency resource units as 4. When the UE receives frequency resource allocation information greater than or equal to 144 RBs and less than 275 RBs for PUSCH transmission, the UE may consider the number of frequency resource units as 8.

In the case of [Method 1-4], the UE may be notified of the maximum number of frequency resource units by the base station through a combination of at least one of higher-layer signaling, MAC-CE, and L1 signaling, or may use a value fixedly defined in the standard. The UE may not expect to receive, from the base station, frequency resource allocation information from which the number of frequency resource units exceeding the maximum number of frequency resource units is derived. In this case, the UE may expect that as many TPMI fields and/or SRI fields as the maximum value thereof exist in DCI format 0_1 or DCI format 0_2 that may be received from the base station within a specific bandwidth part, and according to the number of frequency resource units determined through the frequency resource allocation information, the UE may interpret fields equal to the number of frequency resource units from a first TPMI field and/or a first SRI field, and apply each TPMI field and/or each SRI field to each frequency resource unit. For example, when the maximum number of frequency resource units is 4, and the number of frequency resource units determined based on the frequency resource allocation information is 2, the UE may expect that 4 TPMI fields and/or 4 SRI fields exist in DCI format 0_1 or 0_2, and may apply information obtainable through a first and a second TPMI field and/or a first and a second SRI field among the fields to a first and a second frequency resource unit, respectively.

According to an embodiment of the disclosure, the UE may be notified by the base station through a combination of at least one of higher-layer signaling, MAC-CE, and L1 signaling to use a combination of at least one of [Method 1-1] to [Method 1-4], or a combination of at least one thereof may be fixedly defined in the standard. For example, the UE may define [Method 1-1] as a method fixed in the standard as a method for determining a frequency resource unit of PUSCH precoding. For another example, the UE may be notified by the base station of one of [Method 1-1], [Method 1-3], and [Method 1-4] through a combination of at least one of higher-layer signaling, MAC-CE, and L1 signaling. The above-described content for a combination of at least one of [Method 1-1] to [Method 1-4] may be merely an example for the convenience of description, and various combinations of at least one of [Method 1-1] to [Method 1-4] are possible.

According to an embodiment of the disclosure, when the UE is defined in the standard to use a method in which at least one of [Method 1-1] to [Method 1-4] is combined, and when the combined method is not notified to the UE by the base station through a combination of at least one of higher-layer signaling, MAC-CE, and L1 signaling, the UE may use another method in which at least one of [Method 1-1] to [Method 1-4] is combined.

According to an embodiment of the disclosure, the UE may transmit, to the base station, a UE capability report indicating support for at least one of [Method 1-1] to [Method 1-4], and higher-layer signaling corresponding thereto at the base station may exist to support a corresponding function, or higher-layer signaling corresponding thereto at the base station may not exist. When higher-layer signaling corresponding to the UE capability reported by the UE exists, the UE may determine a frequency resource unit of PUSCH precoding, based on a combination of at least one of [Method 1-1] to [Method 1-4] when the corresponding higher-layer signaling is not configured by the base station, or may use a combination of at least one of [Method 1-1] to [Method 1-4] that is fixedly defined. In addition, when higher-layer signaling corresponding to the UE capability reported by the UE does not exist, the UE may expect the base station to perform an operation corresponding to the UE capability when the UE reports the UE capability.

According to an embodiment of the disclosure, with respect to [Method 1-1] to [Method 1-4], when the UE accesses a cell operating with SBFD, the UE may be notified by the base station of a combination of at least one of higher-layer signaling, MAC-CE, and L1 signaling for an uplink subband. In this case, for each of a cell operating with SBFD and a cell not operating with SBFD, the UE may consider a combination of at least one of [Method 1-1] to [Method 1-4] for determining a frequency resource unit of PUSCH precoding, the at least one being the same as or different from each other. In addition, for each of an SBFD slot or symbol and an uplink slot or symbol in a cell operating with SBFD, the UE may consider a combination of at least one of [Method 1-1] to [Method 1-4] for determining a frequency resource unit of PUSCH precoding, the at least one being the same as or different from each other.

Second Embodiment: a Partial Band Precoding Method for PUSCH Transmission by Considering Frequency Hopping Hereinafter, according to an embodiment of the disclosure, a partial band precoding method for PUSCH transmission by considering frequency hopping, based on the determination of the size and number of PUSCH precoding frequency resource units described above, is described. This embodiment may operate in combination with other embodiments described in the disclosure.

According to an embodiment of the disclosure, when a UE determines the number of PUSCH precoding frequency resource units as 1 and applies the same precoding to the entire frequency resources for PUSCH transmission, a precoding method in which the same precoding is applied to the entire frequency resources may be referred to/named as wideband precoding in the disclosure, or may be referred to/named in various forms within a range that is interpreted identically/similarly thereto. In addition, when the UE determines the number of PUSCH precoding frequency resource units as 2 or more and applies individual precoding to two or more different parts of the frequency resource for PUSCH transmission, a precoding method in which individual precoding is applied to two or more different parts of the frequency resource may be referred to/named as partial band (subband) precoding in the disclosure, or may be referred to/named in various forms within a range that is interpreted identically/similarly thereto.

According to an embodiment of the disclosure, the UE may receive a frequency hopping flag field from a base station through DCI format 0_0, and the frequency hopping flag field may always consist of 1 bit, and when a value of the frequency hopping flag field is 0, a scheduled PUSCH may be transmitted from the UE without frequency hopping applied, and when the value of the frequency hopping flag field is 1, frequency hopping may be applied. Alternatively, the opposite may also be possible.

According to an embodiment of the disclosure, the UE may receive a frequency hopping flag field from the base station through DCI format 0_1 or 0_2, and the frequency hopping flag field may be 0 bits or 1 bit. When the UE receives a configuration of only frequency resource allocation type 0 or frequencyHopping, which is higher-layer signaling, is not configured, the frequency hopping flag field may be 0 bits, otherwise, the frequency hopping flag field may be 1 bit. In a case where the frequency hopping flag field consists of 1 bit, when a value of the hopping flag field is 0, a scheduled PUSCH may be transmitted from the UE without frequency hopping applied, and when the value of the hopping flag field is 1, frequency hopping may be applied. Alternatively, the opposite may also be possible.

According to an embodiment of the disclosure, when the size of an activated bandwidth part is smaller than 50 RBs, the UE may receive a configuration of two frequency hopping offset values through frequencyHoppingOffsetLists which is higher-layer signaling. According to an embodiment of the disclosure, when the size of the activated bandwidth part is larger than or equal to 50 RBs, the UE may receive a configuration of four frequency hopping offset values through frequencyHoppingOffsetLists which is higher-layer signaling. In this case, frequencyHoppingOffsetLists which is higher-layer signaling may be configured in pusch-Config which is higher-layer signaling, and a pusch-Config parameter may be applied to PUSCHs dynamically scheduled by DCI formats 0_0, 0_1, and 0_2, or may be applied to a type 2 configured grant-based PUSCH. For a Type 1 configured grant-based PUSCH, one frequency hopping offset value included in frequencyHoppingOffset which is higher-layer signaling, which may be configured in rrc-configuredUplinkGrant which is higher-layer signaling, may be applied to PUSCH transmission.

According to an embodiment of the disclosure, the UE may additionally receive frequency hopping-related information through a frequency resource allocation field included in DCI formats 0_0, 0_1, and 0_2. When frequency resource allocation type 1 is used for the UE, NUL_hop number of most significant bits (MSBs) in the total bit length of the frequency resource allocation field may be used to indicate a frequency hopping offset, and the remaining bit length of the frequency resource allocation field may be used to indicate frequency resource allocation information. When the UE receives a configuration of two frequency hopping offset values in frequencyHoppingOffsetLists which is higher-layer signaling, a NUL_hop value may be 1. For example, the UE may receive an indication of one of two frequency hopping offsets through a NUL_hop=1 bit. When the UE receives a configuration of four frequency hopping offset values in frequencyHoppingOffsetLists which is higher-layer signaling, a NUL_hop value may be 2. For example, the UE may receive an indication of one of four frequency hopping offsets through a NUL_hop=2 bit.

When the UE performs frequency hopping during PUSCH transmission, the number of symbols of a first hop may be represented as $$\lfloor N_{symb}^{PUSCH,s}/2 \rfloor,$$

and the number of symbols of a second hop may be represented as $$N_{symb}^{PUSCH,s} - \lfloor N_{symb}^{PUSCH,s}/2 \rfloor.$$

$$N_{symb}^{PUSCH,s}$$

indicates the length of PUSCH transmission within one slot, and is represented as the number of OFDM symbols. In this case, a location of a DMRS symbol in each hop may be determined as shown in Table 35 below. In this case, la in Table 35 below may refer to the symbol length of PUSCH per hop.

TABLE 35

| $l_d$ in symbols | DM-RS positions $\bar{l}$ | | | | | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | pos0 | | pos1 | | pos0 | | pos1 | | pos0 | | pos1 | |
| | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop | $1^{st}$ hop | $2^{nd}$ hop |
| ≤3 | — | — | — | — | — | — | — | — | — | — | — | — |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

Figure 22:
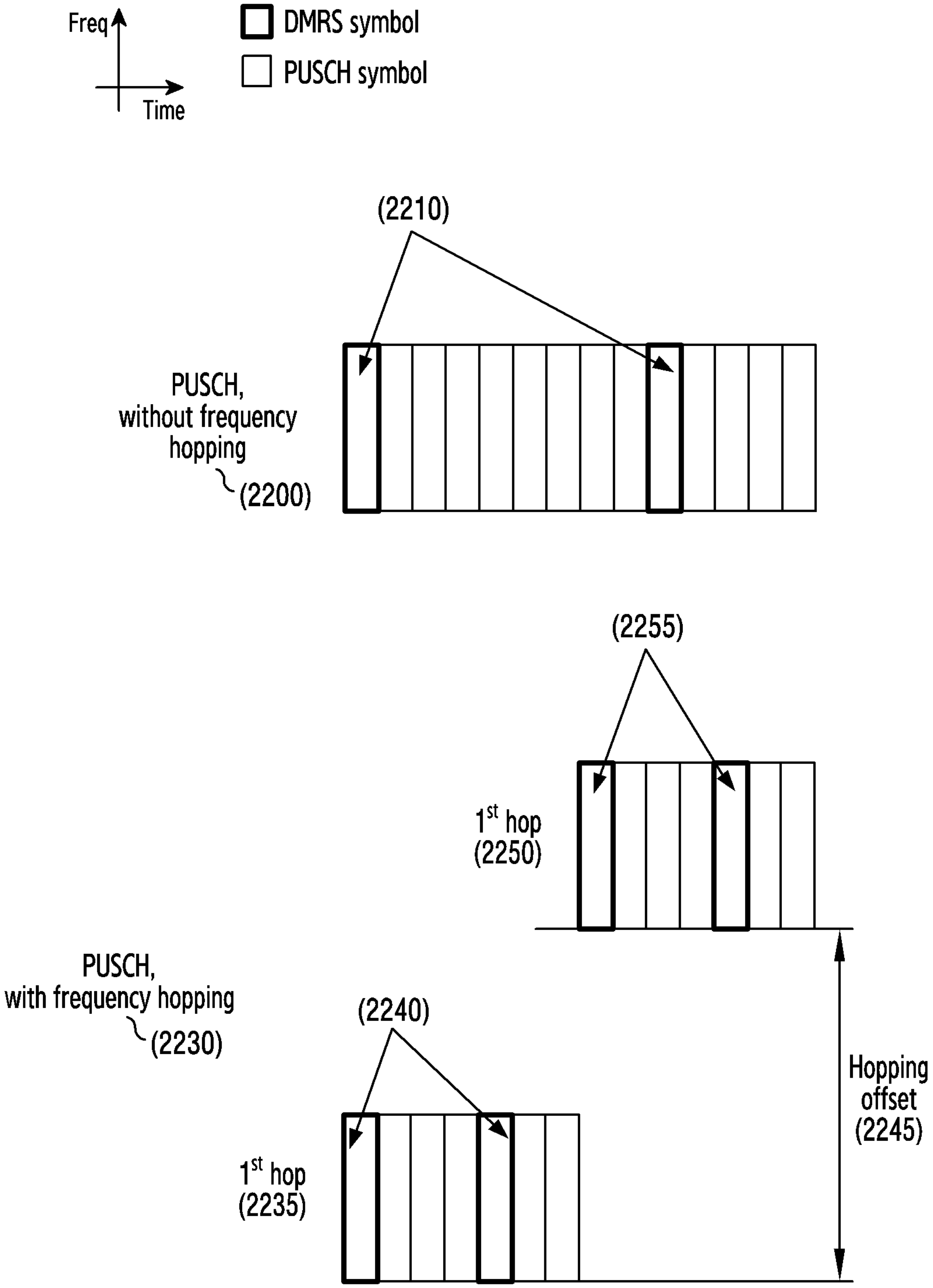
FIG. 22 illustrates resource allocation and a demodulation reference signal (DMRS) location during frequency hopping according to an embodiment of the disclosure.

FIG. 22 illustrates resource allocation and a DMRS location during frequency hopping according to an embodiment of the disclosure.

Referring to FIG. 22, when a UE receives scheduling of a PUSCH of 14 symbols and frequency hopping is not applied to PUSCH transmission (indicated by reference numeral 2200), the UE may transmit a PUSCH in a first symbol to a fourteenth symbol in a slot and may transmit a PUSCH DMRS in the first symbol and the tenth symbol (indicated by reference numeral 2210). When the UE receives scheduling of a PUSCH of 14 symbols and frequency hopping is applied to PUSCH transmission (indicated by reference numeral 2230), a symbol length of each of a first hop 2235 and a second hop 2250 may be 7. In this case, when the UE has received a configuration of dmrs-AdditionalPosition, which is higher-layer signaling, as pos1 and in the case of PUSCH mapping type B, the UE may transmit a PUSCH in the first symbol to the seventh symbol in the slot for the first hop, and the first symbol and the fifth symbol in the slot may be symbols in which a PUSCH DMRS is transmitted (indicated by reference numeral 2240), and a PUSCH corresponding to the first hop may be transmitted in a frequency resource indicated through frequency resource allocation information. In addition, the UE may transmit a PUSCH in the eighth symbol to the fourteenth symbol in the slot for the second hop, and the eighth symbol and the twelfth symbol in the slot may be symbols in which a PUSCH DMRS is transmitted (indicated by reference numeral 2255), and a PUSCH corresponding to the second hop may be transmitted in a frequency resource location that is spaced a frequency hopping offset 2245 apart from the frequency resource indicated through the frequency resource allocation information.

As described above, the UE receives an indication from a base station on whether frequency hopping is applied for PUSCH transmission. In the case of a PUSCH to which frequency hopping is applied, the UE may perform PUSCH transmission on two different frequency resources during PUSCH transmission. In a case where the base station indicates the UE to use one precoder and simultaneously indicates frequency hopping, the base station lacks information on a channel other than a frequency resource allocation location indicated to the UE for PUSCH transmission, and the channel is frequency selective, when the UE applies the same one precoder to both the first and second hops while performing frequency hopping, the base station may secure a diversity gain in a frequency resource at the time of receiving a corresponding PUSCH. However, such a situation in which the base station may secure a diversity gain in a frequency resource may be valid only for a case in which the base station lacks information on a specific frequency resource. In a case where the channel characteristics of a frequency resource pre-secured by the base station are selective, when the base station indicates a different precoder to be used in each hop while simultaneously indicating frequency hopping to the UE, scheduling may be performed so as to maximize reception performance while offsetting a channel effect of each frequency resource.

According to an embodiment of the disclosure, for a PUSCH transmission method to which wideband or partial band precoding considering frequency hopping is applied, the UE may additionally receive an indication on whether partial band precoding is applied, while receiving a frequency hopping indication from the base station. In this case, the UE may be notified by the base station of whether partial band precoding is applied, based on a combination of at least one of higher-layer signaling, MAC-CE signaling, and L1 signaling, or may be applied through a method fixedly defined in the standard.

Figure 23:
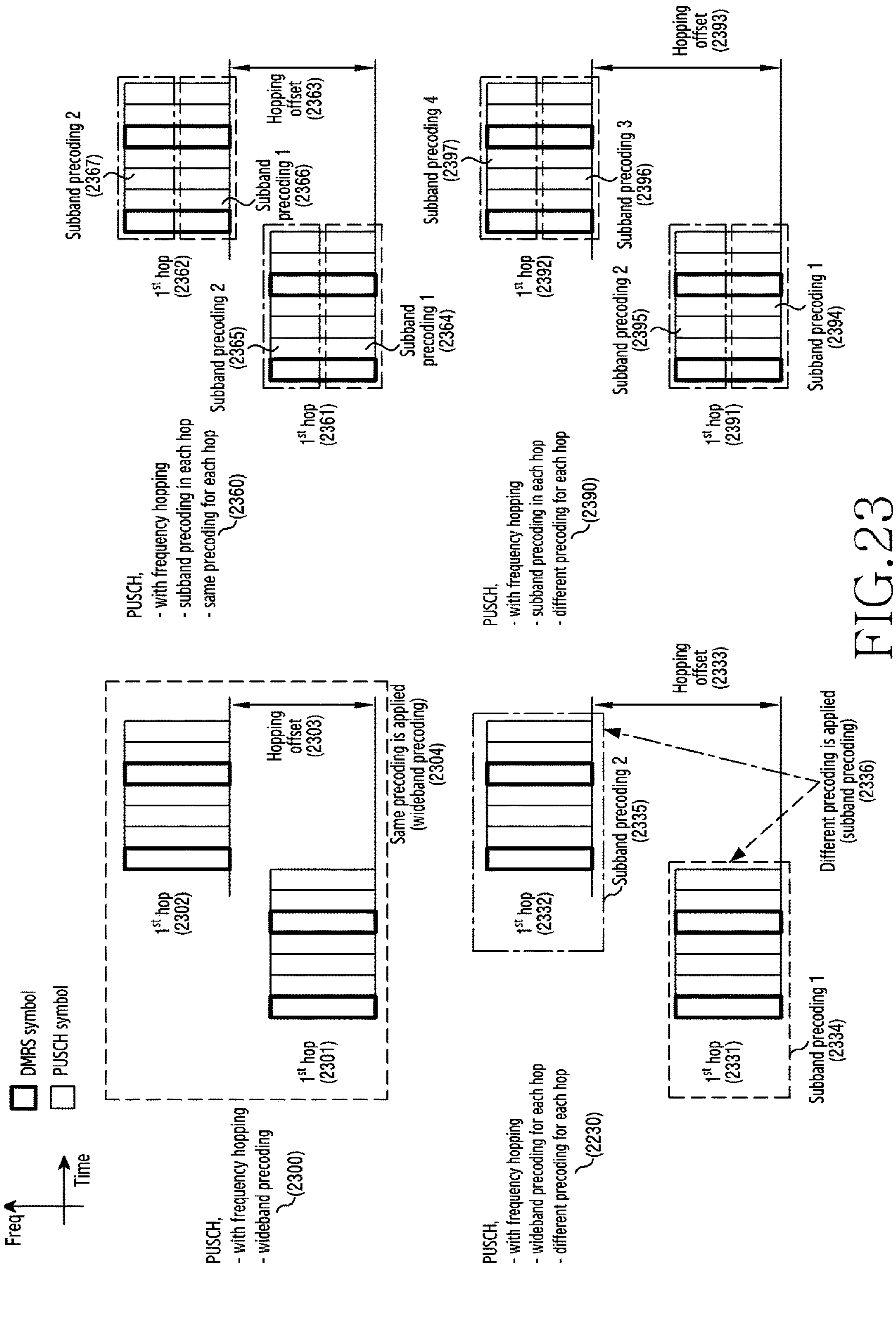
FIG. 23 illustrates a partial band precoding method considering frequency hopping according to an embodiment of the disclosure.

FIG. 23 illustrates a partial band precoding method considering frequency hopping according to an embodiment of the disclosure.

Referring to FIG. 23, various embodiments of a partial band precoding method considering frequency hopping are described.

[Method 2-1]

According to an embodiment of the disclosure, referring to FIG. 23, a UE may receive an indication of frequency hopping from a base station, and perform PUSCH transmission to which wideband precoding is applied, based on the indicated frequency hopping (indicated by reference numeral 2300). In this case, with respect to a first hop 2301 and a second hop 2302, the UE may apply the same precoder to the first hop 2301 and the second hop 2302 even when the first hop 2301 and the second hop 2302 are transmitted at locations spaced from each other by a frequency hopping offset 2303 (indicated by reference numeral 2304).

[Method 2-2]

According to an embodiment of the disclosure, referring to FIG. 23, a UE may receive an indication of frequency hopping from a base station, and perform PUSCH transmission to which partial band precoding is applied, based on the indicated frequency hopping (indicated by reference numeral 2330). In this case, with respect to a first hop 2331 and a second hop 2332 transmitted at locations spaced from each other by a frequency hopping offset 2333, the UE may apply a first partial band precoder 2334 to the first hop 2331 and a second partial band precoder 2335 to the second hop 2332 (indicated by reference numeral 2336).

To support [Method 2-1] and [Method 2-2] described above, the UE may receive a configuration of higher-layer signaling from the base station, and the higher-layer signaling configured for the UE by the base station may mean/be configured to mean that the UE may apply different precodings for each hop when frequency hopping is indicated.

When the UE receives, from the base station, a configuration of higher-layer signaling representing/indicating that the UE may apply different precodings for each hop during frequency hopping, the UE may receive, from the base station, an indication of either wideband precoding or partial band precoding scheme through a frequency hopping flag field that may be indicated through DCI, and may apply the scheme indicated through the frequency hopping flag field to PUSCH transmission. When the UE receives an indication of frequency hopping in a state in which higher-layer signaling representing/indicating that the UE may apply different precodings for each hop during frequency hopping is configured, the UE may receive an indication of two TPMI fields and/or SRI fields within the same DCI as DCI that indicates frequency hopping, and each TPMI field and/or SRI field may transmit the same or different information.

According to an embodiment of the disclosure, in a case where the UE receives DCI including scheduling information for codebook-based PUSCH transmission from the base station, when multiple TPMIs in the DCI include the same information, the UE may apply the same precoder to each hop even when frequency hopping is indicated. For example, the UE may apply the same precoder to each hop as in [Method 2-1]. When multiple TPMIs in the DCI including the scheduling information for codebook-based PUSCH transmission include different information, the UE may apply an individual precoder to each hop when frequency hopping is indicated. More specifically, the UE may apply a precoder indicated by a first TPMI field during PUSCH transmission in the first hop, and may apply a precoder indicated by a second TPMI field during PUSCH transmission in the second hop. For example, the UE may apply a different precoder to each hop as in [Method 2-2]. In this case, two TPMIs included in the DCI may have the same bit length. Alternatively, among the two TPMIs included in the DCI, while the first TPMI field may have a bit length that may indicate a precoder corresponding to all ranks, the second TPMI field may have a bit length that may represent a precoder within a rank value obtained through the first TPMI field, based on rank information that may be obtained through the first TPMI field. For example, the second TPMI field may have a bit length that may represent the largest number of precoders defined for each rank value, and rank information may not be indicated. For example, in uplink transmission based on 4port codebook, when the UE may support uplink transmission of rank 1 to rank 4, if the number of precoders included in a codebook for 4port rank 1 uplink transmission is 28, the number of precoders included in a codebook for 4port rank 2 uplink transmission is 22, the number of precoders included in a codebook for 4port rank 3 uplink transmission is 7, and the number of precoders included in a codebook for 4port rank 4 uplink transmission is 5, among the two TPMI fields included in the DCI, the first TPMI field may be configured to have a length of 6 bits, which is the number of bits that may indicate (28+22+7+5=62) number of precoders. Meanwhile, the second TPMI field may be configured to have a length of 5 bits, which is the number of bits that may indicate all 28, which is the largest value among 28, 22, 7, and 5, which are the numbers of precoders included in the codebooks for uplink transmission of 4port rank 1, rank 2, rank 3, and rank 4, respectively. In this case, the second TPMI field may be interpreted by assuming a rank value that may be indicated through the first TPMI field. When the first TPMI field has a TPMI value indicating a precoder included in the codebook for 4port rank 1 uplink transmission, among 32 code points that may be expressed in 5 bits in the second TPMI field, 28 code points may have one TPMI value among 28 precoders included in the codebook for 4port rank 1 uplink transmission, and the remaining 4 code points may have reserved values. In addition, when the first TPMI field has a TPMI value indicating a precoder included in the codebook for 4port rank 2 uplink transmission, among 32 code points that may be expressed in 5 bits in the second TPMI field, 22 code points may have one TPMI value among 22 precoders included in the codebook for 4port rank 2 uplink transmission, and the remaining 10 code points may have reserved values. In addition, when the first TPMI field has a TPMI value indicating a precoder included in the codebook for 4port rank 3 uplink transmission, among 32 code points that may be expressed in 5 bits in the second TPMI field, 7 code points may have one TPMI value among 7 precoders included in the codebook for 4port rank 3 uplink transmission, and the remaining 25 code points may have reserved values. In addition, when the first TPMI field has a TPMI value indicating a precoder included in the codebook for 4port rank 4 uplink transmission, among 32 code points that may be expressed in 5 bits in the second TPMI field, 5 code points may have one TPMI value among 5 precoders included in the codebook for 4port rank 4 uplink transmission, and the remaining 27 code points may have reserved values.

According to an embodiment of the disclosure, in a case where the UE receives DCI including scheduling information for non-codebook-based PUSCH transmission from the base station, when multiple SRIs in the DCI including the scheduling information for non-codebook-based PUSCH transmission include the same information, the UE may apply a precoder corresponding to a combination of the same SRS resources to each hop even when frequency hopping is indicated. For example, the UE may apply the same precoder to each hop as in [Method 2-1]. When multiple SRIs in the DCI including the scheduling information for non-codebook-based PUSCH transmission include different information, the UE may apply a precoder corresponding to a combination of individual SRS resources to each hop when frequency hopping is indicated, apply a precoder corresponding to a combination of SRS resources indicated by a first SRI field during PUSCH transmission in the first hop, and apply a precoder corresponding to a combination of SRS resources indicated by a second SRI field during PUSCH transmission in the second hop. For example, the UE may apply a different precoder to each hop as in [Method 2-2]. In this case, two SRIs included in the DCI may have the same bit length. Alternatively, among the two SRIs included in the DCI, while the first SRI field has a bit length that may indicate a precoder corresponding to a combination of SRS resources corresponding to all ranks, the second SRI field may have a bit length that may represent a precoder corresponding to a combination of SRS resources within a rank value obtained based on rank information that may be obtained through the first SRI field. For example, the second SRI field may have a bit length that may represent the largest number of precoders defined for each rank value, and rank information may not be indicated.

According to an embodiment of the disclosure, [Method 2-1] may be a method capable of obtaining frequency diversity while applying the same precoder to each hop when the base station lacks channel information for a specific frequency band, similar to the existing frequency hopping.

According to an embodiment of the disclosure, in [Method 2-2], when the UE applies a different precoder at each hop while performing frequency hopping, the UE may apply only one precoder to the entire frequency resources of a PUSCH transmitted at each hop, and thus while maintaining the existing operation that does not perform an operation that requires applying different precoders to different frequency resources within the same time resource, the advantages of partial band precoding can be secured in combination with a frequency hopping operation. Meanwhile, in the case of [Method 2-2], since the purpose is for the UE to maintain a scheme of using wideband precoding for frequency resources of all PUSCH transmissions in a specific time resource as before, partial band precoding for up to two partial bands may be possible in a case in which the UE does not perform frequency hopping, but partial band precoding may not be possible within each hop in a case in which the UE performs frequency hopping. In such a case, the base station may identify frequency selectivity of a channel so that partial band precoding within each hop is not required, and perform frequency resource allocation of a PUSCH within a bandwidth size in which the channel is maintained, which may cause a base station scheduling constraint.

[Method 2-3]

According to an embodiment of the disclosure, a UE may receive an indication of frequency hopping from a base station, and may perform PUSCH transmission using partial band precoding applied for each hop, based on the indicated frequency hopping (indicated by reference numeral 2360). In this case, with respect to a first hop 2361 and a second hop 2362 which are transmitted at locations spaced from each other by a frequency hopping offset 2363, a first partial band precoder 2364 and a second partial band precoder 2365 may be applied in the first hop, and a first partial band precoder 2366 and a second partial band precoder 2367, which are the same as in the first hop, may be applied in the second hop. For example, the UE may apply a partial band precoder at each hop, and may apply the same precoder for each partial band of the first hop and the second hop. When the base station has identified frequency selectivity information for channels at different frequency locations within the first hop, but lacks channel information for the second hop, such a method may be used to secure frequency diversity gain by using each partial band precoder from the first hop equally in the second hop.

According to an embodiment of the disclosure, the UE may receive an additional indicator for distinguishing between [Method 2-2] and [Method 2-3] from the base station, and the additional indicator may be notified by/transmitted from the base station to the UE in a combination of at least one of higher-layer signaling, MAC-CE signaling, and L1 signaling. For example, the UE may assume that a frequency hopping flag field is defined as 2 bits in DCI under a condition in which specific higher-layer signaling is configured. In this case, the UE may assume that among four code points (e.g., 00, 01, 10, and 11) that may be indicated by a 2-bit frequency hopping flag field, a first code point (e.g., 00) signifies that frequency hopping is not performed, a second code point (e.g., 01) signifies that partial band precoding is not performed within each hop while frequency hopping is performed, a third code point (e.g., 10) signifies that partial band precoding is performed even within each hop while frequency hopping is performed, and a fourth code point (e.g., 11) is a reserved code point. In this case, when the UE receives an indication of the second code point through the frequency hopping flag field, the UE may expect that different precoding is applied for each hop while partial band precoding is not applied within each hop as in [Method 2-2]. In addition, when the UE receives an indication of the third code point through the frequency hopping flag field, the UE may expect that the same precoding is applied to each partial band within each hop while partial band precoding is applied within each hop as in [Method 2-3]. Therefore, the UE may expect that there are up to two TPMI fields and/or up to two SRI fields within the DCI. [Method 2-4].

According to an embodiment of the disclosure, a UE may receive an indication of frequency hopping from a base station, and may perform PUSCH transmission using partial band precoding applied for each hop, based on the indicated frequency hopping (indicated by reference numeral 2390). In this case, with respect to a first hop 2391 and a second hop 2392 which are transmitted at locations spaced from each other by a frequency hopping offset 2393, a first partial band precoder 2394 and a second partial band precoder 2395 may be applied in the first hop, and a third partial band precoder 2396 and a fourth partial band precoder 2397, which are different from those in the first hop, may be applied in the second hop. For example, the UE may apply a partial band precoder at each hop, and may apply a different precoder for each partial band of the first hop and the second hop. Such a method may enable the base station to identify frequency selectivity information for channels at different frequency locations for both the first hop and the second hop, and individually indicate all partial band precoders to maximize reception performance.

According to an embodiment of the disclosure, the UE may receive an additional indicator for distinguishing between [Method 2-2] to [Method 2-4] from the base station, and the additional indicator may be notified by/transmitted from the base station to the UE in a combination of at least one of higher-layer signaling, MAC-CE signaling, and L1 signaling. For example, the UE may assume that a frequency hopping flag field is defined as 2 bits in DCI under a condition in which specific higher-layer signaling is configured. In this case, the UE may assume that among four code points (e.g., 00, 01, 10, and 11) that may be indicated by a 2-bit frequency hopping flag field, a first code point (e.g., 00) signifies that frequency hopping is not performed, a second code point (e.g., 01) signifies that partial band precoding is not performed within each hop while frequency hopping is performed, a third code point (e.g., 10) signifies that partial band precoding is performed within each hop while frequency hopping is performed, and that the same precoding is applied to each partial band within each hop, and a fourth code point (e.g., 11) signifies that partial band precoding is performed even within each hop while frequency hopping is performed, and that different precoding is applied to each partial band within each hop. In this case, when the UE receives an indication of the second code point through the frequency hopping flag field, the UE may expect that different precoding is applied for each hop while partial band precoding is not applied within each hop as in [Method 2-2]. In addition, when the UE receives an indication of the third code point through the frequency hopping flag field, the UE may expect that the same precoding is applied to each partial band within each hop while partial band precoding is applied within each hop as in [Method 2-3]. In addition, when the UE receives an indication of the fourth code point through the frequency hopping flag field, the UE may expect that different precoding is applied to each partial band within each hop while partial band precoding is applied within each hop as in [Method 2-4]. Therefore, the UE may expect that there are up to four TPMI fields and/or up to four SRI fields within the DCI, and may receive an indication of up to four pieces of partial band precoder information by considering frequency hopping through up to four TPMI fields and up to four SRI fields, and apply the information to a partial band within each hop.

According to an embodiment of the disclosure, when the frequency hopping flag field indicates the second code point, the UE may interpret only information of first two TPMI fields and/or first two SRI fields among four TPMI fields and/or four SRI fields. In this case, the UE may expect that among the first two TPMI fields and/or the first two SRI fields, precoder information indicated through a first TPMI field and/or a first SRI field is applied to the first hop, and precoder information indicated through a second TPMI field and/or a second SRI field is applied to the second hop, and the remaining TPMI fields and/or the remaining SRI fields are ignored or indicated as reserved values. Through this, the UE may perform PUSCH transmission to which frequency hopping is applied, by applying a different precoder for each hop, and may expect that the same precoder is applied to all frequency resources within each hop.

According to an embodiment of the disclosure, when the frequency hopping flag field indicates the third code point, the UE may interpret only information of first two TPMI fields and/or first two SRI fields among four TPMI fields and/or four SRI fields. In this case, the UE may expect that among the first two TPMI fields and/or the first two SRI fields, precoder information indicated through a first TPMI field and/or a first SRI field is applied to first partial bands of the first and second hops, and precoder information indicated through a second TPMI field and/or a second SRI field is applied to second partial bands of the first and second hops, and the remaining TPMI fields and/or the remaining SRI fields are ignored or indicated as reserved values.

According to an embodiment of the disclosure, the UE may expect that the UE interprets only information of a first and a third TPMI field and/or a first and a third SRI field among four TPMI fields and/or four SRI fields, applies precoder information indicated through the first TPMI field and/or the first SRI field to the first partial bands of the first and second hops, and applies precoder information indicated through the third TPMI field and/or the third SRI field to the second partial bands of the first and second hops, and the remaining TPMI fields and/or the remaining SRI fields are ignored or indicated as reserved values. Through this, the UE may apply partial band precoding within each hop for PUSCH transmission to which frequency hopping is applied, and may perform PUSCH transmission by applying the same precoder to the same partial band within each hop.

According to an embodiment of the disclosure, when the frequency hopping flag field indicates the fourth code point, the UE may apply a first, a second, a third, and a fourth TPMI field and/or a first, a second, a third, and a fourth SRI field, among four TPMI fields and/or four SRI fields, to the first partial band of the first hop, the second partial band of the first hop, the first partial band of the second hop, and the second partial band of the second hop, respectively. Through this, the UE may apply partial band precoding within each hop for PUSCH transmission to which frequency hopping is applied, and may perform PUSCH transmission by applying a different precoder to the same partial band within each hop.

The above-mentioned descriptions have considered only a case where the UE receives an indication of frequency hopping with 2 hops for convenience of description, but wideband precoding or partial band precoding may be similarly applied for frequency hopping considering three or more hops.

According to an embodiment of the disclosure, the UE may be notified by the base station through a combination of at least one of higher-layer signaling, MAC-CE, and L1 signaling to use a combination of at least one of [Method 2-1] to [Method 2-4], or a combination of at least one thereof may be fixedly defined in the standard. For example, the UE may define [Method 2-1] as a method fixed in the standard as a method for non-codebook-based PUSCH transmission to which partial band or wideband precoding is applied. For another example, the UE may be notified by the base station of one of [Method 2-1] and [Method 2-4] through a combination of at least one of higher-layer signaling, MAC-CE, and L1 signaling. The above-described content for a combination of at least one of [Method 2-1] to [Method 2-4] may be merely an example for the convenience of description, and various combinations of at least one of [Method 1-1] to [Method 1-4] are possible.

According to an embodiment of the disclosure, when the UE is defined in the standard to use a method in which at least one of [Method 2-1] to [Method 2-4] is combined, and when the combined method is not notified to the UE by the base station through a combination of at least one of higher-layer signaling, MAC-CE, and L1 signaling, the UE may use another method in which at least one of [Method 2-1] to [Method 2-4] is combined.

According to an embodiment of the disclosure, the UE may transmit, to the base station, a UE capability report indicating support for at least one of [Method 2-1] to [Method 2-4], and higher-layer signaling corresponding thereto at the base station may exist to support a corresponding function, or higher-layer signaling corresponding thereto at the base station may not exist. When higher-layer signaling corresponding to the UE capability reported by the UE exists, the UE may determine a frequency resource unit of PUSCH precoding, based on a combination of at least one of [Method 2-1] to [Method 2-4] when the corresponding higher-layer signaling is not configured by the base station, or may use a combination of at least one of [Method 2-1] to [Method 2-4] fixedly defined. In addition, when higher-layer signaling corresponding to the UE capability reported by the UE does not exist, the UE may expect the base station to perform an operation corresponding to the UE capability when the UE reports the UE capability.

Figure 24:
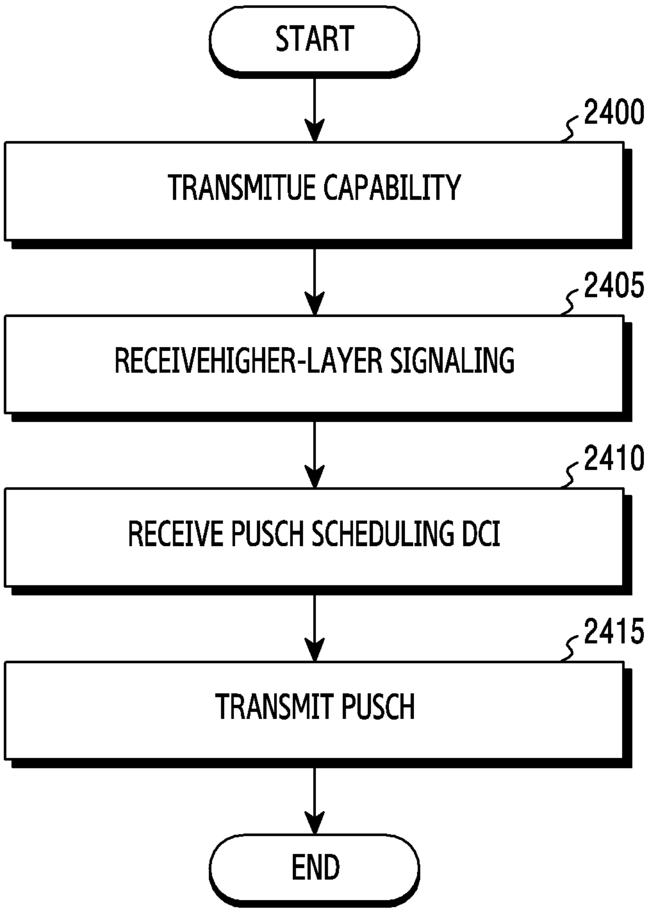
FIG. 24 illustrates an operation of a terminal according to an embodiment of the disclosure.

FIG. 24 illustrates an operation of a UE according to an embodiment of the disclosure.

Referring to FIG. 24, in operation 2400, a UE may transmit UE capability to a base station. In this case, UE capability signaling that may be reported may be for a combination of at least one of UE capability related to PUSCH transmission, UE capability related to frequency hopping during PUSCH transmission, and UE capability indicating whether [Method 1-1] to [Method 1-4] and [Method 2-1] to [Method 2-4] are supported. The operation 2400 may be omitted.

In operation 2405, the UE may receive higher-layer signaling from the base station according to the reported UE capability. In this case, the UE may define, from the base station, a higher layer parameter for a combination of at least one of [Method 1-1] to [Method 1-4] and [Method 2-1] to [Method 2-4], higher-layer signaling related to frequency hopping during PUSCH transmission, and higher-layer signaling related to PUSCH transmission, and use one of them.

In operation 2410, the UE may receive DCI for scheduling PUSCH transmission from the base station. The DCI for scheduling PUSCH transmission may include a frequency hopping related field, a frequency resource allocation field, and one or more pieces of precoder information for applying wideband or partial band precoding.

In operation 2415, the UE may perform PUSCH transmission according to PUSCH scheduling information of the base station that may be obtained through the DCI. In this case, according to the information in the DCI, the UE may perform PUSCH transmission by considering PUSCH transmission with or without frequency hopping applied, whether the same or different precoders are applied at each hop when frequency hopping is applied, and whether partial band precoding is performed in each hop.

The above-described flowchart illustrates a method that may be implemented according to the principle of the disclosure, and various changes may be made to the method shown in the flowchart herein. For example, although illustrated as a series of operations, various operations in each drawing may overlap, occur in parallel, occur in a different order, or occur multiple times. In another example, an operation may be omitted or replaced with another operation.

Figure 25:
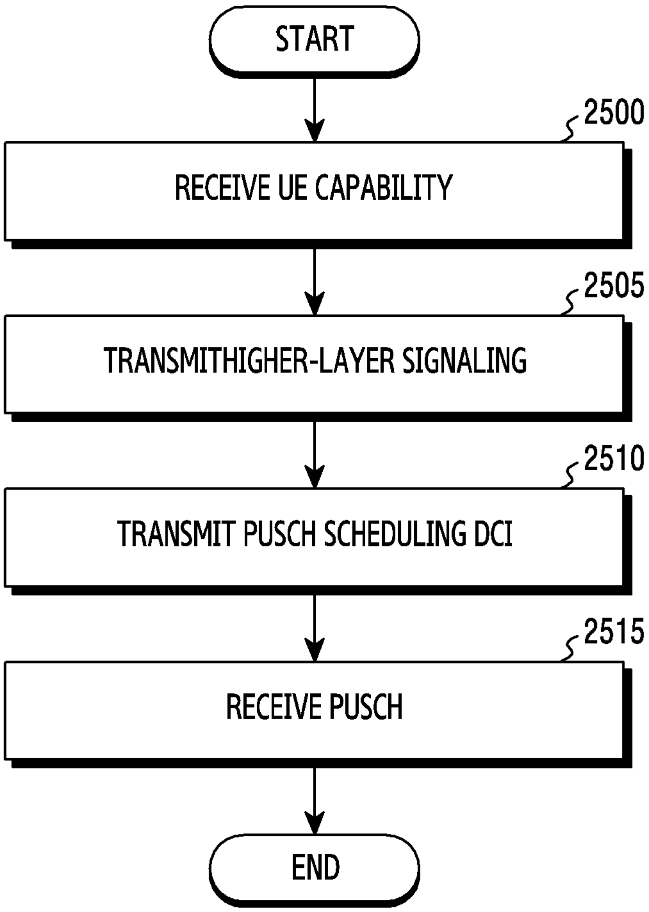
FIG. 25 illustrates an operation of a base station according to an embodiment of the disclosure.

FIG. 25 illustrates an operation of a base station according to an embodiment of the disclosure.

Referring to FIG. 25, in operation 2500, a base station may receive UE capability from a UE. In this case, UE capability signaling that may be reported may be for a combination of at least one of UE capability related to PUSCH transmission, UE capability related to frequency hopping during PUSCH transmission, and UE capability indicating whether [Method 1-1] to [Method 1-4] and [Method 2-1] to [Method 2-4] are supported. The operation 2500 may be omitted.

In operation 2505, the base station may transmit higher-layer signaling to the UE according to the UE capability reported by the UE. In this case, the base station may define a higher layer parameter for a combination of at least one of [Method 1-1] to [Method 1-4] and [Method 2-1] to [Method 2-4], higher-layer signaling related to frequency hopping during PUSCH transmission, and higher-layer signaling related to PUSCH transmission, and transmit one of them to the UE.

In operation 2510, the base station may transmit DCI for scheduling PUSCH transmission to the UE. The DCI for scheduling PUSCH transmission may include a frequency hopping related field, a frequency resource allocation field, and one or more pieces of precoder information for applying wideband or partial band precoding.

In operation 2515, the base station may receive a PUSCH to be transmitted according to PUSCH scheduling information of the base station that may be obtained through the DCI. In this case, according to the information in the DCI, the UE may receive the PUSCH by considering PUSCH transmission with or without frequency hopping applied, whether the same or different precoders are applied at each hop when frequency hopping is applied, and whether partial band precoding is performed in each hop.

The above-described flowchart illustrates a method that may be implemented according to the principle of the disclosure, and various changes may be made to the method shown in the flowchart herein. For example, although illustrated as a series of operations, various operations in each drawing may overlap, occur in parallel, occur in a different order, or occur multiple times. In another example, an operation may be omitted or replaced with another operation.

Figure 26:
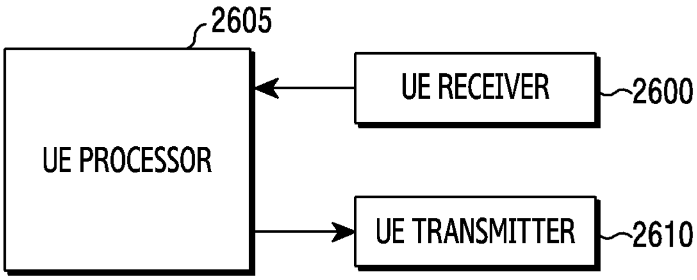
FIG. 26 illustrates a structure of a UE in a wireless communication system according to an embodiment of the disclosure.

FIG. 26 illustrates a structure of a UE in a wireless communication system according to an embodiment of the disclosure.

Referring to FIG. 26, the UE may include a transceiver, which refers to a UE receiver 2600 and a UE transmitter 2610 as a whole, memory (not illustrated), and a UE processor 2605 (or UE controller or processor). The UE receiver 2600 and the UE transmitter 2610, the memory, and the UE processor 2605 may operate according to the above-described communication methods of the UE. However, components of the base station are not limited to the above-described example. For example, the UE may include a larger or smaller number of components than the above-described components. Furthermore, the transceiver, the memory, and the processor may be implemented in the form of a single chip.

The transceiver may transmit/receive signals with the base station. The signals may include control information and data. To this end, the transceiver may include an RF transmitter configured to up-convert and amplify the frequency of transmitted signals, an RF receiver configured to low-noise-amplify received signals and down-convert the frequency thereof, and the like. However, this is only an embodiment of the transceiver, and the components of the transceiver are not limited to the RF transmitter and the RF receiver.

In addition, the transceiver may receive signals through a radio channel, output the same to the processor, and transmit signals output from the processor through the radio channel.

The memory may store programs and data necessary for operations of the UE. In addition, the memory may store control information or data included in signals transmitted/received by the UE. The memory may include storage media, such as ROM, RAM, hard disk, CD-ROM, and a DVD, or a combination of storage media. In addition, the memory may include multiple memories.

Furthermore, the processor may control a series of processes such that the UE can operate according to the above-described embodiments. For example, the processor may control components of the UE to receive DCI configured in two layers so as to simultaneously receive multiple PDSCHs. The processor may include multiple processors, and the processor may perform operations of controlling the components of the UE by executing programs stored in the memory.

Figure 27:
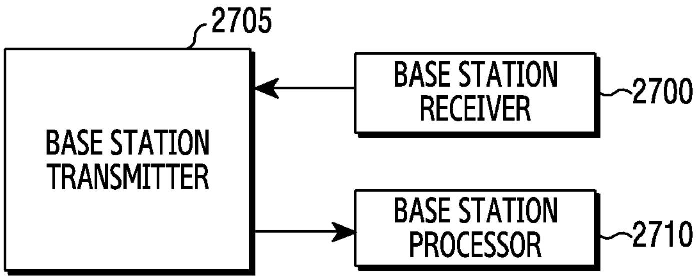
FIG. 27 illustrates a structure of a base station in a wireless communication system according to an embodiment of the disclosure.

FIG. 27 illustrates a structure of a base station in a wireless communication system according to an embodiment of the disclosure.

Referring to FIG. 27, the base station may include a transceiver, which refers to a base station receiver 2700 and a base station processor 2710 as a whole, memory (not illustrated), and a base station transmitter 2705 (or base station controller or processor). The base station receiver 2700 and the base station processor 2710, the memory, and the base station transmitter 2705 may operate according to the above-described communication methods of the base station. However, components of the base station are not limited to the above-described example. For example, the base station may include a larger or smaller number of components than the above-described components. Furthermore, the transceiver, the memory, and the processor may be implemented in the form of a single chip.

The transceiver may transmit/receive signals with the UE. The signals may include control information and data. To this end, the transceiver may include an RF transmitter configured to up-convert and amplify the frequency of transmitted signals, an RF receiver configured to low-noise-amplify received signals and down-convert the frequency thereof, and the like. However, this is only an embodiment of the transceiver, and the components of the transceiver are not limited to the RF transmitter and the RF receiver.

In addition, the transceiver may receive signals through a radio channel, output the same to the processor, and transmit signals output from the processor through the radio channel.

The memory may store programs and data necessary for operations of the base station. In addition, the memory may store control information or data included in signals transmitted/received by the base station. The memory may include storage media, such as ROM, RAM, hard disk, CD-ROM, and DVD, or a combination of storage media. In addition, the memory may include multiple memories.

The processor may control a series of processes such that the base station can operate according to the above-described embodiments of the disclosure. For example, the processor may control components of the base station to configure DCI configured in two layers including allocation information regarding multiple PDSCHs and to transmit the same. The processor may include multiple processors, and the processor may perform operations of controlling the components of the base station by executing programs stored in the memory.

Methods disclosed in the claims and/or methods according to the embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program includes instructions that cause the electronic device to perform the methods according to various embodiments of the disclosure as defined by the appended claims and/or disclosed herein.

These programs (software modules or software) may be stored in non-volatile memories including random access memory and flash memory, read only memory (ROM), electrically erasable programmable read only memory (EEPROM), magnetic disc storage device, compact disc-ROM (CD-ROM), digital versatile discs (DVDs), or other type optical storage devices, or a magnetic cassette. Alternatively, any combination of some or all of them may form memory in which the program is stored. In addition, a plurality of such memories may be included in the electronic device.

Furthermore, the programs may be stored in an attachable storage device which can access the electronic device through communication networks, such as the Internet, Intranet, local area network (LAN), wide LAN (WLAN), and storage area network (SAN) or a combination thereof. Such a storage device may access the electronic device via an external port. In addition, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. For example, it will be apparent to those skilled in the art that other variants based on the technical idea of the disclosure may be implemented. In addition, the above respective embodiments may be employed in combination, as necessary. For example, a part of one embodiment of the disclosure may be combined with a part of another embodiment to operate a base station and a terminal. As an example, a part of a first embodiment of the disclosure may be combined with a part of a second embodiment to operate a base station and a terminal. Moreover, although the above embodiments have been described based on the FDD LTE system, other variants based on the technical idea of the embodiments may also be implemented in other communication systems, such as TDD LTE, and 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

In addition, in methods of the disclosure, some or all of the contents of each embodiment may be implemented in combination without departing from the essential spirit and scope of the disclosure.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a base station, downlink control information (DCI) scheduling a physical uplink shared channel (PUSCH) transmission, the DCI including information on a frequency resource for the PUSCH transmission and information indicating whether frequency hopping is applied to the PUSCH transmission;

determining that the information indicating whether the frequency hopping is applied for the PUSCH transmission indicates a value indicating that the frequency hopping is applied and a precoding is a wideband based precoding; and transmitting, to the base station, a PUSCH, based on the precoding applied according to a predetermined resource unit based on the frequency resource for the PUSCH transmission, wherein based on the determination:

for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined resource unit configured to a size equal to the frequency resource which is frequency hopped.

2. The method of claim 1, wherein the DCI includes a first field associated with the first precoding and a second field associated with the second precoding.

3. A method performed by a base station in a wireless communication system, the method comprising:

transmitting, to a user equipment (UE), downlink control information (DCI) scheduling a physical uplink shared channel (PUSCH) transmission, the DCI including information on a frequency resource for the PUSCH transmission and information indicating whether frequency hopping is applied to the PUSCH transmission; and receiving, from the UE, a PUSCH, based on precoding applied according to a predetermined resource unit based on the frequency resource for the PUSCH transmission, wherein, the information indicating whether the frequency hopping is applied for the PUSCH transmission indicates a value indicating that the frequency hopping is applied and the precoding is a wideband based precoding, wherein, for the frequency resource for the PUSCH transmission, a first precoding is applied according to the predetermined resource unit configured to a size equal to the frequency resource for the PUSCH transmission, and wherein, for a frequency resource which is frequency hopped from the frequency resource for the PUSCH transmission, a second precoding different from the first precoding is applied according to the predetermined resource unit configured to a size equal to the frequency resource which is frequency hopped.

4. The method of claim 3, wherein the DCI includes a first field associated with the first precoding and a second field associated with the second precoding.

5. A user equipment (UE) in a wireless communication system, the UE comprising:

a transceiver; and a controller coupled with the transceiver and configured to:

receive, from a base station, downlink control information (DCI) scheduling a physical uplink shared channel (PUSCH) transmission, the DCI including information on a frequency resource for the PUSCH transmission and information indicating whether frequency hopping is applied to the PUSCH transmission, determine that the information indicating whether the frequency hopping is applied for the PUSCH transmission indicates a value indicating that the frequency hopping is applied and a precoding is a wideband based precoding, and transmit, to the base station, a PUSCH, based on precoding applied according to a predetermined resource unit based on the frequency resource for the PUSCH transmission, wherein based on the determination:

for the frequency resource for the PUSCH transmission, a first precoding is applied according to the predetermined resource unit configured to a size equal to the frequency resource for the PUSCH transmission, and for a frequency resource which is frequency hopped from the frequency resource for the PUSCH transmission, a second precoding different from the first precoding is applied according to the predetermined resource unit configured to a size equal to the frequency resource which is frequency hopped.

6. The UE of claim 5, wherein the DCI includes a first field associated with the first precoding and a second field associated with the second precoding.

7. A base station in a wireless communication system, the base station comprising:

a transceiver; and a controller coupled with the transceiver and configured to:

transmit, to a user equipment (UE), downlink control information (DCI) scheduling a physical uplink shared channel (PUSCH) transmission, the DCI including information on a frequency resource for the PUSCH transmission and information indicating whether frequency hopping is applied to the PUSCH transmission, and receive, from the UE, a PUSCH, based on precoding applied according to a predetermined resource unit based on the frequency resource for the PUSCH transmission, wherein, the information indicating whether the frequency hopping is applied for the PUSCH transmission indicates a value indicating that the frequency hopping is applied and the precoding is a wideband based precoding, wherein for the frequency resource for the PUSCH transmission, a first precoding is applied according to the predetermined resource unit configured to a size equal to the frequency resource for the PUSCH transmission, and wherein for a frequency resource which is frequency hopped from the frequency resource for the PUSCH transmission, a second precoding different from the first precoding is applied according to the predetermined resource unit configured to a size equal to the frequency resource which is frequency hopped.

8. The base station of claim 7, wherein the DCI includes a first field associated with the first precoding and a second field associated with the second precoding.

* * * * *